(12) United States Patent
McCrossan et al.

(10) Patent No.: US 8,452,165 B2
(45) Date of Patent: May 28, 2013

(54) RECORDING MEDIUM, PLAYBACK APPARATUS, METHOD AND PROGRAM

(75) Inventors: Joseph McCrossan, Simi Valley, CA (US); Wataru Ikeda, Osaka (JP); Tomoyuki Okada, Nara (JP); Yoshio Kawakami, Osaka (JP)

(73) Assignee: Panasonic Corporation, Osaka (JP)

( * ) Notice: Subject to any disclaimer, the term of this patent is extended or adjusted under 35 U.S.C. 154(b) by 701 days.

(21) Appl. No.: 11/997,290

(22) PCT Filed: Aug. 8, 2006

(86) PCT No.: PCT/JP2006/315991
§ 371 (c)(1),
(2), (4) Date: Aug. 18, 2009

(87) PCT Pub. No.: WO2007/018308
PCT Pub. Date: Feb. 15, 2007

(65) Prior Publication Data
US 2010/0092156 A1 Apr. 15, 2010

Related U.S. Application Data

(60) Provisional application No. 60/706,871, filed on Aug. 9, 2005, provisional application No. 60/706,897, filed on Aug. 9, 2005, provisional application No. 60/706,937, filed on Aug. 9, 2005, provisional application No. 60/707,066, filed on Aug. 9, 2005.

(30) Foreign Application Priority Data

May 1, 2006 (JP) .................................. 2006-127502

(51) Int. Cl.
*H04N 9/80* (2006.01)
*H04N 5/917* (2006.01)

(52) U.S. Cl.
USPC ............................................ 386/348; 386/330

(58) Field of Classification Search
USPC ..................... 386/348, 326–330, 337
See application file for complete search history.

(56) References Cited

U.S. PATENT DOCUMENTS 5,712,950 A   1/1998   Cookson et al.
5,778,136 A   7/1998   Hirayama et al.
(Continued)

FOREIGN PATENT DOCUMENTS

CN   1136200   11/1996
CN   1234583   11/1999
(Continued)

OTHER PUBLICATIONS

Blu-Ray Disc: White paper Blu-ray Disc Format: 2.B Audio Visual Application Format Specifications for BD-ROM, Mar. 2005, 35 pages.

(Continued)

*Primary Examiner* — Thai Tran
*Assistant Examiner* — Nigar Chowdhury

(57) ABSTRACT

A plurality of video streams and STN_table are recorded in the local storage 200. Each of the plurality of video streams is a secondary video stream to be played together with a primary video stream, and includes picture data representing a child image to be displayed in Picture in Picture that is composed of a parent image and the child image. In the STN_table, entries of secondary video streams that are permitted to be played are described in the order of priority.

9 Claims, 67 Drawing Sheets

U.S. PATENT DOCUMENTS

| | | | |
|---|---|---|---|
| 5,907,658 A | 5/1999 | Murase et al. | |
| 5,926,608 A | 7/1999 | Moon et al. | |
| 5,999,690 A | 12/1999 | Ro | |
| 6,148,140 A | 11/2000 | Okada et al. | |
| 6,181,870 B1 | 1/2001 | Okada et al. | |
| 6,185,365 B1 | 2/2001 | Murase et al. | |
| 6,222,925 B1 | 4/2001 | Shiels et al. | |
| 6,226,446 B1 | 5/2001 | Murase et al. | |
| 6,330,392 B1 | 12/2001 | Nakatani et al. | |
| 6,356,707 B1 | 3/2002 | Murase et al. | |
| 6,366,732 B1 | 4/2002 | Murase et al. | |
| 6,643,298 B1 * | 11/2003 | Brunheroto et al. | 370/537 |
| 6,753,928 B1 | 6/2004 | Gospel et al. | |
| 7,756,398 B2 | 7/2010 | Yoo et al. | |
| 7,945,930 B2 | 5/2011 | Mears et al. | |
| 2002/0129374 A1 | 9/2002 | Freeman et al. | |
| 2002/0196939 A1 * | 12/2002 | Unger et al. | 380/216 |
| 2003/0012558 A1 | 1/2003 | Kim et al. | |
| 2003/0161615 A1 | 8/2003 | Tsumagari et al. | |
| 2003/0215224 A1 | 11/2003 | Yoo et al. | |
| 2004/0022524 A1 | 2/2004 | Bak et al. | |
| 2004/0033057 A1 | 2/2004 | Kojo et al. | |
| 2004/0234245 A1 | 11/2004 | Jung et al. | |
| 2004/0255336 A1 | 12/2004 | Logan et al. | |
| 2005/0053360 A1 | 3/2005 | Jung et al. | |
| 2005/0060745 A1 | 3/2005 | Riedl et al. | |
| 2005/0084248 A1 | 4/2005 | Yoo et al. | |
| 2005/0117886 A1 | 6/2005 | Kang et al. | |
| 2006/0098936 A1 | 5/2006 | Ikeda et al. | |
| 2006/0140079 A1 | 6/2006 | Hamada et al. | |
| 2006/0291806 A1 | 12/2006 | Ikeda et al. | |
| 2007/0003221 A1 | 1/2007 | Hamada et al. | |
| 2007/0036517 A1 | 2/2007 | Ikeda et al. | |
| 2007/0160350 A1 | 7/2007 | Ikeda et al. | |
| 2008/0131085 A1 | 6/2008 | Ikeda et al. | |
| 2008/0131094 A1 | 6/2008 | Ikeda et al. | |
| 2008/0267588 A1 | 10/2008 | Iwase et al. | |
| 2008/0285948 A1 | 11/2008 | Iwase et al. | |

FOREIGN PATENT DOCUMENTS

| | | |
|---|---|---|
| CN | 1199156 | 4/2005 |
| EP | 0 291 934 | 11/1988 |
| EP | 0 903 742 | 3/1999 |
| EP | 0 903 743 | 3/1999 |
| EP | 0 903 744 | 3/1999 |
| EP | 1 524 669 | 4/2005 |
| EP | 1 553 769 | 7/2005 |
| EP | 1 603 335 | 12/2005 |
| EP | 1 638 327 | 3/2006 |
| EP | 1 675 395 | 6/2006 |
| JP | 2813245 | 8/1998 |
| JP | 2004-295947 | 10/2004 |
| JP | 2005/123775 | 5/2005 |
| JP | 2007-104516 | 4/2007 |
| JP | 2007-104615 | 4/2007 |
| JP | 2007-116649 | 5/2007 |
| TW | 200416670 | 12/2008 |
| WO | 01/72035 | 9/2001 |
| WO | 01/72036 | 9/2001 |
| WO | 03/036460 | 5/2003 |
| WO | 2004/029960 | 4/2004 |
| WO | 2004/030356 | 4/2004 |
| WO | 2004/053869 | 6/2004 |
| WO | 2004/075547 | 9/2004 |
| WO | 2004/081806 | 9/2004 |
| WO | 2004/114658 | 12/2004 |
| WO | 2005/011273 | 2/2005 |
| WO | 2005/039177 | 4/2005 |
| WO | 2005/052940 | 6/2005 |

OTHER PUBLICATIONS

European Patent Application No. 09174858.2 Office Action dated Oct. 1, 2010, 17 pages.

European Patent Application No. 09174608.1 Office Action dated Sep. 21, 2010, 16 pages.

European Patent Application No. 09174606.5 Office Action dated Sep. 21, 2010, 16 pages.

European Patent Application No. 09174601.6 Office Action dated Sep. 20, 2010, 14 pages.

European Patent Application No. 09174600.8 Office Action dated Sep. 21, 2010, 14 pages.

Taiwan Patent Application No. 95129036 Office Action dated Aug. 7, 2012, 6 pages.

Chinese Patent Application No. 200910209044.4 Notice of Allowance dated Sep. 5, 2012, 4 pages.

* cited by examiner

FIG. 7

| RANGE OF PID | STREAM ALLOCATED FOR THE RANGE |
|---|---|
| 0x0100 | program_map |
| 0x1001 | PCR |
| 0x1011 | Primary VIDEO STREAM |
| 0x1100~0x111F | Primary AUDIO STREAM |
| 0x1200~0x121F | PG STREAM |
| 0x1400~0x141F | IG STREAM |
| 0x1B00~0x1B1F | In_MUX_Secondary VIDEO STREAM |

LEVEL 1: PICTURE SEQUENCE IN ORDER OF DISPLAY

LEVEL 2: MainClip TIME AXIS

LEVEL 3: EP_map

LEVEL 4: Source PACKET SEQUENCE

FIG. 15

| RANGE OF PID | STREAM ALLOCATED FOR THE RANGE |
|---|---|
| 0x0100 | program_map |
| 0x1001 | PCR |
| 0x1200~0x121F | PG STREAM |
| 0x1400~0x141F | IG STREAM |
| 0x1800 | textST STREAM |
| 0x1A00~0x1A1F | Secondary AUDIO STREAM |
| 0x1B00~0x1B1F | Secondary VIDEO STREAM |

FIG. 25A

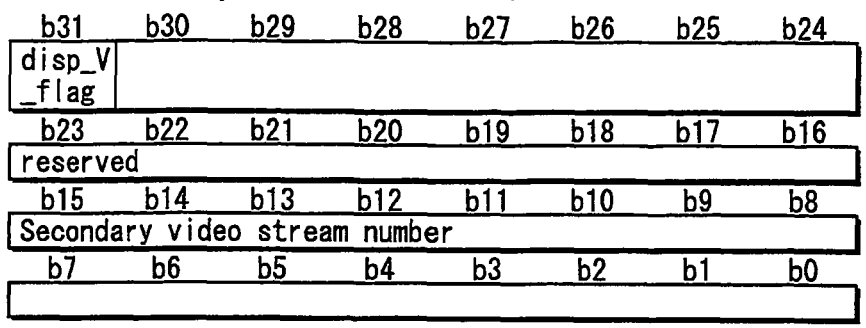

disp_V_flag ···  0b:Presentation of Secondary video is disable
1b:Presentation of Secondary video is enable Secondary video stream
number    ···  0:Reserved
1 to 32:Secondary video stream number
0xFF:Secondary video stream is not selected
    or no Secondary video stream
Others:reserved

FIG. 25B

PSR29:Player Capability for Video
The PSR29 register represents the Video capability of the Player. Navigation commands and BD-J application cannot directly change the value contained in PSR29.

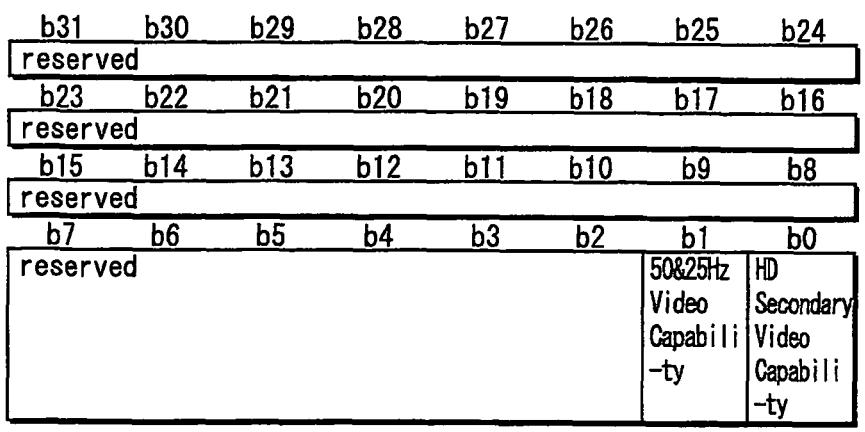

HD Secondary Video
Capability ···  0b:HD Secondary Video incapable
1b:HD Secondary Video capable 50&25Hz Video
Capability ···  0b:50Hz and 25Hz Video incapable
1b:50Hz and 25Hz Video capable Note1: The last value of PSR is maintained when
       the state is changed from "Valid" to "Invalid"
Note2: The value of PSR is simply overwritten when
       the state is in "Invalid"

FIG. 42A

PSR1:Primary Audio Stream Number

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| reserved | | | | | | | |

| b7 | b6 | b5 | b4 | b3 | b2 | b1 | b0 |
|---|---|---|---|---|---|---|---|
| Primary audio stream number | | | | | | | |

Primary audio stream
number ··· 0:Reserved
1 to 32:Primary audio stream number
0xFF:Primary audio stream is not selected
or no Primary audio stream

FIG. 42B

PSR14:Secondary Audio Stream Number

| b31 | b30 | b29 | b28 | b27 | b26 | b25 | b24 |
|---|---|---|---|---|---|---|---|
| disp_V_flag | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| Secondary video stream number | | | | | | | |

| b7 | b6 | b5 | b4 | b3 | b2 | b1 | b0 |
|---|---|---|---|---|---|---|---|
| Secondary audio stream number | | | | | | | |

Secondary audio stream
number ··· 0:Reserved
1 to 32:Secondary audio stream number
0xFF:Secondary audio stream is not selected
or no Secondary audio stream
Others:reserved FIG. 46 — Procedure when stream change is requested (entry OF Secondary Audio STREAM IS PRESENT IN STN_table)

S131: JUDGE WHETHER CONDITION (A) IS SATISFIED
(A) WHEN Secondary Audio STREAM NUMBER SPECIFIED IN Comb_info_Secondary_video_Secondary_audio IS COMPARED WITH Secondary Audio STREAM NUMBER SPECIFIED BY NUMBER X, COMBINATION OF Secondary Audio STREAM HAVING THE NUMBER AND CURRENT Secondary Video STREAM IS ALLOWED S132: NUMBER X ≦ THE NUMBER OF ENTRIES IN STN_table, AND CONDITION (A) IS SATISFIED?
 — YES → S142: SELECT Secondary Audio STREAM SPECIFIED BY NUMBER X AND SET NUMBER X IN PSR14
 — NO → S133: NUMBER X = 0xFF?
   — NO → S143: MAINTAIN CURRENT NUMBER OF PSR14 → (A)
   — YES → S134: REPEAT CHECKING FOR ALL Secondary Audio STREAM entries IN STN_table

S136: (A)

CHECK WHETHER GIVEN Secondary Audio STREAM i SATISFIES THE FOLLOWING CONDITIONS (a) AND (b):
(a) WHEN Secondary Audio STREAM NUMBER SPECIFIED IN Comb_info_Secondary_video_Secondary_audio () IS COMPARED WITH Secondary Audio STREAM NUMBER i, COMBINATION OF Secondary Video STREAM AND Secondary Audio STREAM IS ALLOWED
(b) audio_language_code of CURRENT Primary Audio STREAM AND Secondary Audio STREAM i MATCH EACH OTHER S135: REPEAT CHECKING FOR ALL Secondary Audio STREAM entries IN STN_table S137: AT LEAST ONE Secondary Audio STREAM SATISFYING CONDITIONS (a) AND (b) IS PRESENT?
 — YES → S138: FROM AMONG Secondary Audio STREAMS SATISFYING CONDITIONS (a) AND (b), ONE WHOSE ENTRY IS LOCATED AT THE BEGINNING → PSR14
 — NO → S139: Secondary Audio STREAM SATISFYING CONDITION (a) IS PRESENT?
   — YES → S140: FROM AMONG Secondary Audio STREAMS SATISFYING CONDITION (a), ONE WHOSE ENTRY IS LOCATED AT THE BEGINNING → PSR14
   — NO → S141: MAINTAIN CURRENT NUMBER OF PSR14

→ (A) RETURN

FIG. 48A

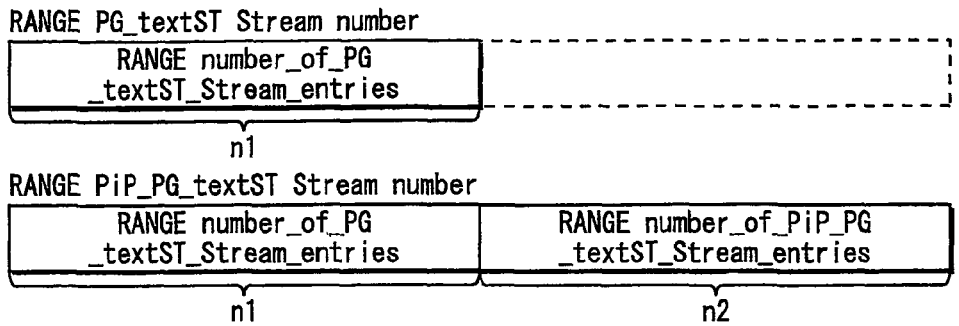

FIG. 48B

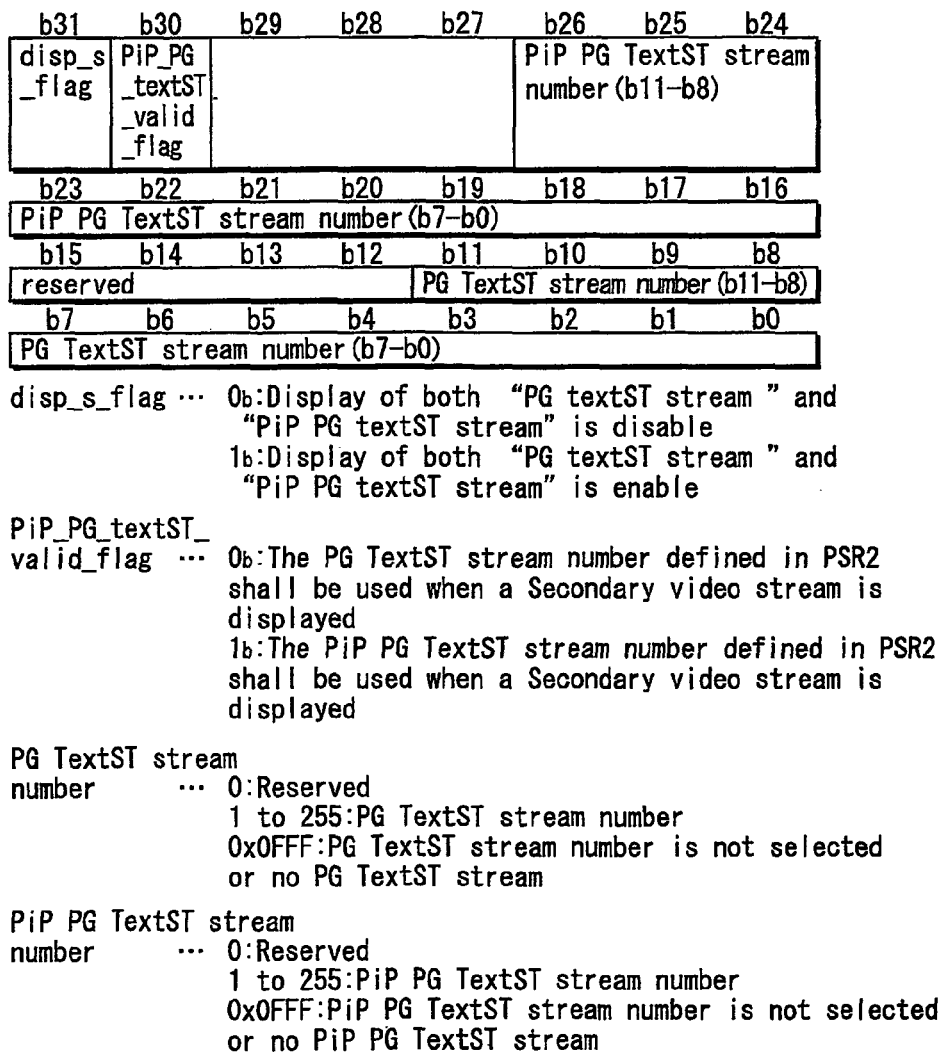

disp_s_flag ···  0b:Display of both "PG textST stream" and
"PiP PG textST stream" is disable
1b:Display of both "PG textST stream" and
"PiP PG textST stream" is enable PiP_PG_textST_
valid_flag ··· 0b:The PG TextST stream number defined in PSR2
shall be used when a Secondary video stream is
displayed
1b:The PiP PG TextST stream number defined in PSR2
shall be used when a Secondary video stream is
displayed PG TextST stream
number ··· 0:Reserved
1 to 255:PG TextST stream number
0x0FFF:PG TextST stream number is not selected
or no PG TextST stream PiP PG TextST stream
number ··· 0:Reserved
1 to 255:PiP PG TextST stream number
0x0FFF:PiP PG TextST stream number is not selected
or no PiP PG TextST stream Note1: The last value of PSR is maintained when the state is changed from "Valid" to "Invalid".
Note2: The value of PSR is simply overwritten when the state is in "Invalid".

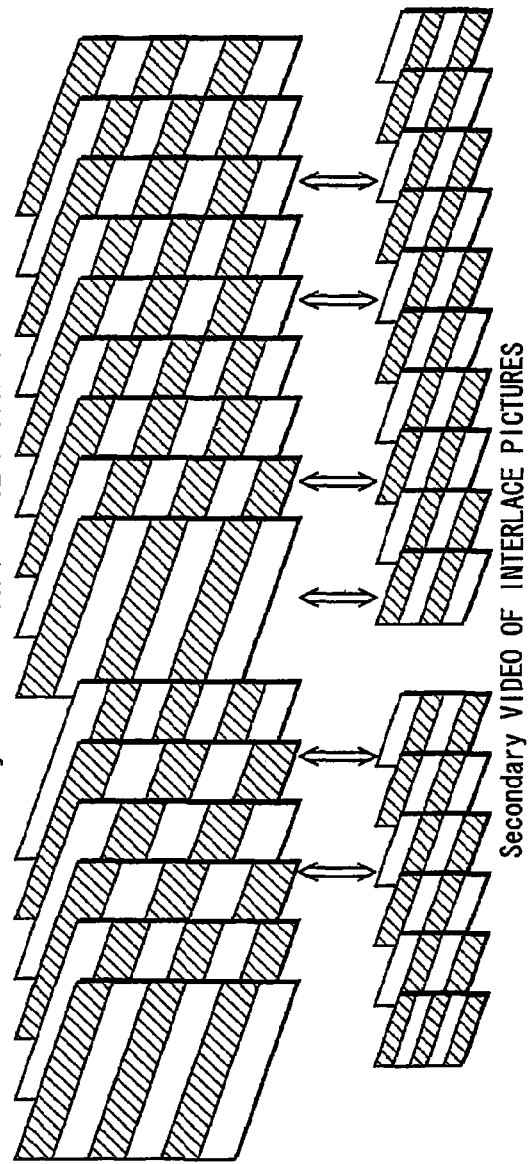
FIG. 61A
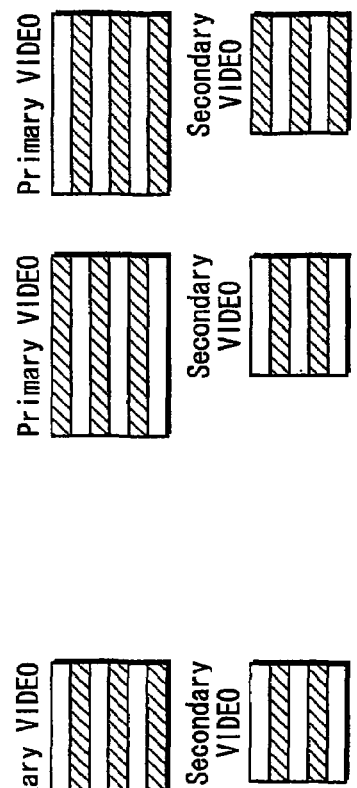
FIG. 61B COMBINATIONS FOR IN-PHASE
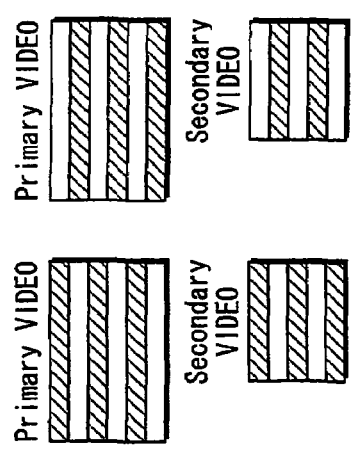
FIG. 61C COMBINATIONS FOR ANTIPHASE FIG. 62
PLAYABLE COMPOSITE PATTERN
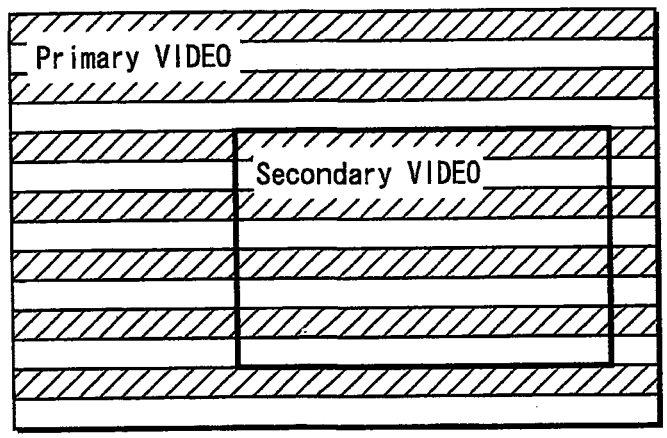
UNPLAYABLE COMPOSITE PATTERN
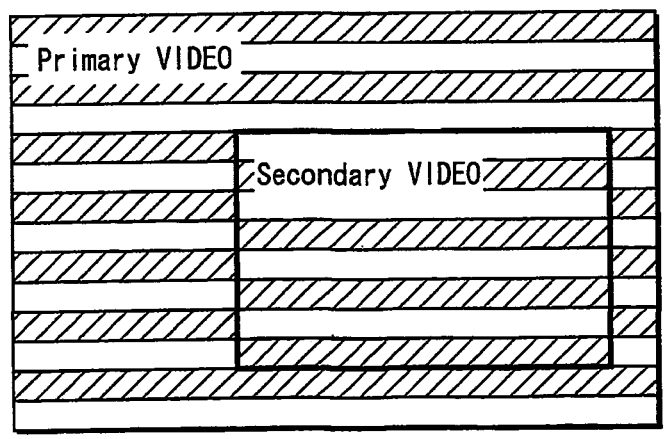

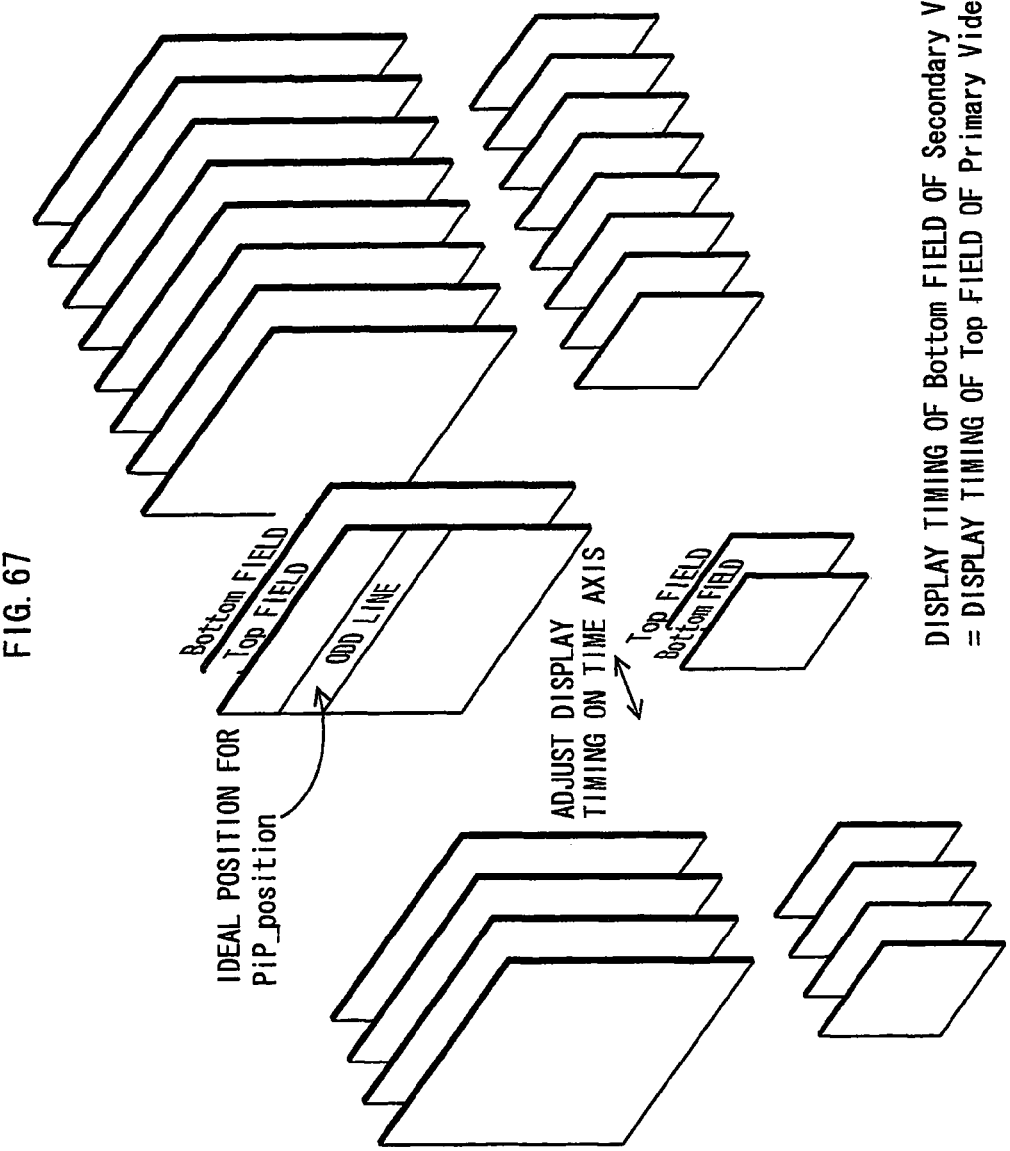

US 8,452,165 B2

RECORDING MEDIUM, PLAYBACK APPARATUS, METHOD AND PROGRAM

RELATED APPLICATIONS

The present application is a national phase application from PCT/JP2006/315991, which claims priority from Japanese Patent Application No. 2006-127502 filed on May 1, 2006. Benefit is claimed pursuant to 35 U.S.C. §119(e) for provisional applications 60/706,871, 60/706,897, 60/706,937 and 60/707,066. All of the U.S. provisional applications were filed on Aug. 9, 2005.

TECHNICAL FIELD

The present invention belongs to a technical field of Picture in Picture.

BACKGROUND ART

Picture in Picture is technology for displaying composite video where a secondary window is superimposed onto a primary screen. This technology also allows for changing the position of the secondary window on the primary screen and switching between display and non-display of the composite video.

Note that the structure of a standard model of a DVD player is described in the following patent reference 1.

<Patent Reference 1> Japanese Patent Publication No. 2813245

DISCLOSURE OF THE INVENTION

Problem that the Invention is to Solve

To realize such Picture in Picture in the DVD-Video standard application format requires at least two video streams. This is because the standard model of DVD-Video players is not designed to have a function of simultaneously decoding multiple video streams, specifying time and position, and then playing two or more videos superimposed one on top of the other. In order to switch between composite video and non-composite video or to change the position for the composite video, it is required to record, on a DVD-Video, individually a composite stream, a non-composite stream and a stream in which the composite position is changed. Then, a DVD-Video player is instructed to play one of them.

Regarding BD-ROMs, on the other hand, the video transition from SDTV to HDTV has been made, resulting in an increase in the volume of data. Accordingly, if it is tried to record individually a composite stream, a non-composite stream and a stream with different composite position on a BD-ROM, the total size of data becomes prohibitively large, and the video streams for Picture in Picture cannot fit in a BD-ROM. Therefore, in the BD-ROM standard, the standard model of BD-ROM players has been provided with a function of simultaneously decoding multiple video streams to obtain two noncompressed videos and superimposing these videos.

Since the standard model has such a function, it is only necessary to individually record a primary video stream structuring a primary video and a secondary video stream structuring a secondary video. This recording format has an advantage in terms of data size since the primary video is not recorded redundantly on a BD-ROM. In addition, video is not embedded in advance, and therefore the composite position and time for the secondary video can be switched according to a user operation, enhancing the versatility.

However, whereas it is often the case that primary videos of BD-ROMs are created in HDTV, secondary videos are sometimes created in 50 frames/sec interlace mode (50i) and in 60 frames/sec interlace mode (60i). This is because secondary video streams are displayed in a small window in the screen and therefore require half or less resolution than primary videos. However, not all playback apparatuses can play in 50i and 60i modes because 50i is the PAL format and 60 is the NTSC format. Playback apparatuses in each broadcast zone usually have ability to play only in the mode, and playback apparatuses in another broadcast zone do not have the ability to play in the mode. Accordingly, in the case where a secondary video is created in the PAL format, for example, and a recording medium on which the secondary video is recorded is mounted on a playback apparatus in the NTSC format, the playback apparatus cannot, perform Picture in Picture.

In addition, when a secondary video is created in HDTV, some playback apparatuses cannot decode the secondary video. This happens because, although standard BD-ROM playback apparatuses are planned to be equipped with video decoders each for primary videos and secondary videos, the secondary video decoder does not have an HDTV decoding function. Providing the secondary video decoder with such a function means leaving little chance for simplification of the hardware structure of playback apparatuses and adversely affecting price reduction of the products.

The fact that the availability of Picture in Picture operation depends on types of video materials and/or the ability of playback apparatuses, as described above, may become a new worrying factor for filmmakers producing motion pictures and makers manufacturing playback apparatuses.

The present invention aims at offering a recording medium capable of causing playback apparatuses to reliably perform Picture in Picture operation even the apparatuses differ in what kind of materials they can decode.

Means to Solve the Problem

In order to achieve the above objective, the present invention is a recording medium on which a plurality of video streams and a table are recorded. Here, each of the plurality of video streams is a secondary video stream to be played together with a primary video stream, and includes picture data representing a child image to be displayed in Picture in Picture that is composed of a parent image and the child image. The table includes entries of secondary video streams that are permitted to be played among the plurality of secondary video streams.

Advantageous Effects of the Invention

Even if unplayable primary video streams are present within primary video streams, conducting a procedure of selecting the next stream allows a chance to "use a primary video stream that the playback apparatus can play". Accordingly, even if playback apparatuses differ in their playback abilities of secondary videos, it is possible to cause each playback apparatus to display some secondary videos to thereby achieve Picture in Picture.

Thus, the present invention resolves the problem that some playback apparatuses are capable of executing Picture in Picture while others are not due to difference in their capabilities, and playback apparatus manufacturers can therefore create and introduce playback apparatuses that realize Picture in Picture into the market without worry.

BRIEF DESCRIPTION OF THE DRAWINGS

FIG. 7 shows a PID allocation map for elementary streams recorded on the BD-ROM;

FIG. 15 shows a PID allocation map in the BD-ROM standard;

FIG. 25A shows bit assignment in PSR14;

FIG. 25B shows bit assignment in PSR29;

FIG. 42A shows the bit assignment in the PSR1;

FIG. 42B shows the bit assignment in the PSR14;

FIG. 46 is a flowchart showing a processing procedure for secondary audio streams;

FIG. 48A shows the range of stream numbers that the stream number of the current PGtestST stream can possibly take;

FIG. 48B shows the bit assignment in the PSR2;

FIG. 61A shows video fields constituting primary and secondary videos;

FIG. 61B shows combinations where the video fields to be composed are in-phase to one another;

FIG. 61C shows combinations where the video fields to be composed are antiphase to one another FIG. 62A shows a Picture in Picture image in which the even-numbered lines of the primary video's video field match the even-numbered lines of the secondary video's video field;

FIG. 62B shows a Picture in Picture image in which the even-numbered lines of the primary video's video field match the odd-numbered lines of the secondary video's video field;

FIG. 67 shows the case where a secondary video field is displayed on an odd-numbered line of the primary video.

[Explanation of References]

| | |
|---|---|
| 1a | BD-ROM drive |
| 1b, c | read buffers |
| 1a, b, c | ATC counters |
| 2a, d | Source Depacketizers |
| 2c, d | ATC counters |
| 3a, c | STC counters |
| 3b, d | PID filters |
| 4a | transport buffer |
| 4c | elementary buffer |
| 4d | video decoder |
| 4e | re-order buffer |
| 4f | decoded picture buffer |
| 4g | video plane |
| 5a | transport buffer |
| 5c | elementary buffer |
| 5d | video decoder |
| 5e | re-prder buffer |
| 5f | decoded picture buffer |
| 5g | video plane |
| 6a, b | transport buffers |
| 7a, b | buffers |
| 8a, b | audio decoder |
| 9a | mixer |
| 11a | transport buffer |
| 11b | interactive graphics decoder |
| 11c | interactive graphics plane |
| 12a | transport buffer |
| 12b | buffer |
| 12c | text based subtitle decoder |
| 13a | transport buffer |
| 13b | presentation graphics decoder |
| 13c | presentation graphics plane |
| 21 | memory |
| 22 | controller |
| 23 | PSR set |
| 24 | PID conversion unit |
| 25 | network unit |
| 26 | operation receiving unit |
| 41 | PlayList processing unit |
| 42 | procedure executing unit |
| 43 | PiP control unit |
| 44 | mixing control unit |
| 100 | BD-ROM |
| 200 | local storage |
| 300 | playback apparatus |
| 400 | television |
| 500 | AV amplifier |

BEST MODE FOR CARRYING OUT THE INVENTION

Embodiment 1

Figure 1:
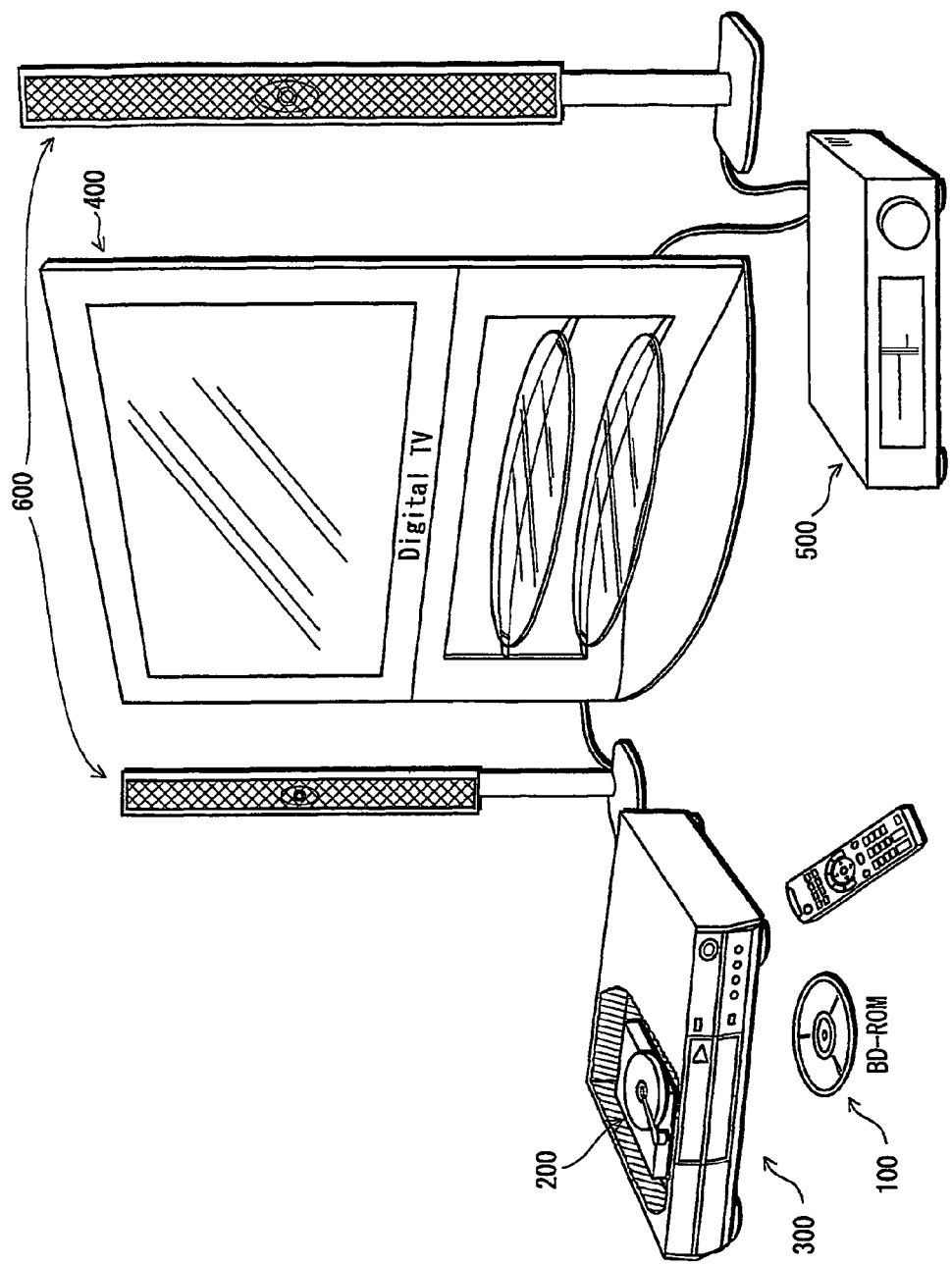
FIG. 1 shows a usage application of a recording medium according to the present invention.

The following describes an embodiment of the recording medium of the present invention. First, a usage application is described in relation to the implementation of the present invention. FIG. 1 shows the usage application of the recording medium of the present invention. In FIG. 1, the recording medium of the present invention is a local storage 200. The local storage 200 is used for supplying a motion picture to a home theater system composed of a playback apparatus 300, a television 400, an AV amplifier 500, and speakers 600.

Next are described the BD-ROM 100, the local storage 200 and the playback apparatus 300.

The BD-ROM 100 is a recording medium on which a motion picture is recorded.

The local storage 200 is a hard disk that is built in the playback apparatus, and is used for storing contents distributed from a server of a motion picture distributor.

The playback apparatus 300 is a digital home electrical appliance supported for networks, and has a function to play the BD-ROM 100. The playback apparatus 300 is also able to download a content from a server apparatus of a motion picture distributor via a network, store the downloaded content in the local storage 200, and combine this content with a content recorded on the BD-ROM 100 to expand/update the content of the BD-ROM 100. With a technology called "virtual package", it is possible to combine a content recorded on the BD-ROM 100 with a content stored in the local storage 200, treating data not recorded on the BD-ROM 100 as if it is recorded on the BD-ROM 100.

Thus concludes the description of the usage application of the recording medium of the present invention.

Next is described a production application of the recording medium of the present invention. The recording medium of the present invention can be implemented as a result of improvements in the file system of a BD-ROM.

<General Description of BD-ROM>

Figure 2:
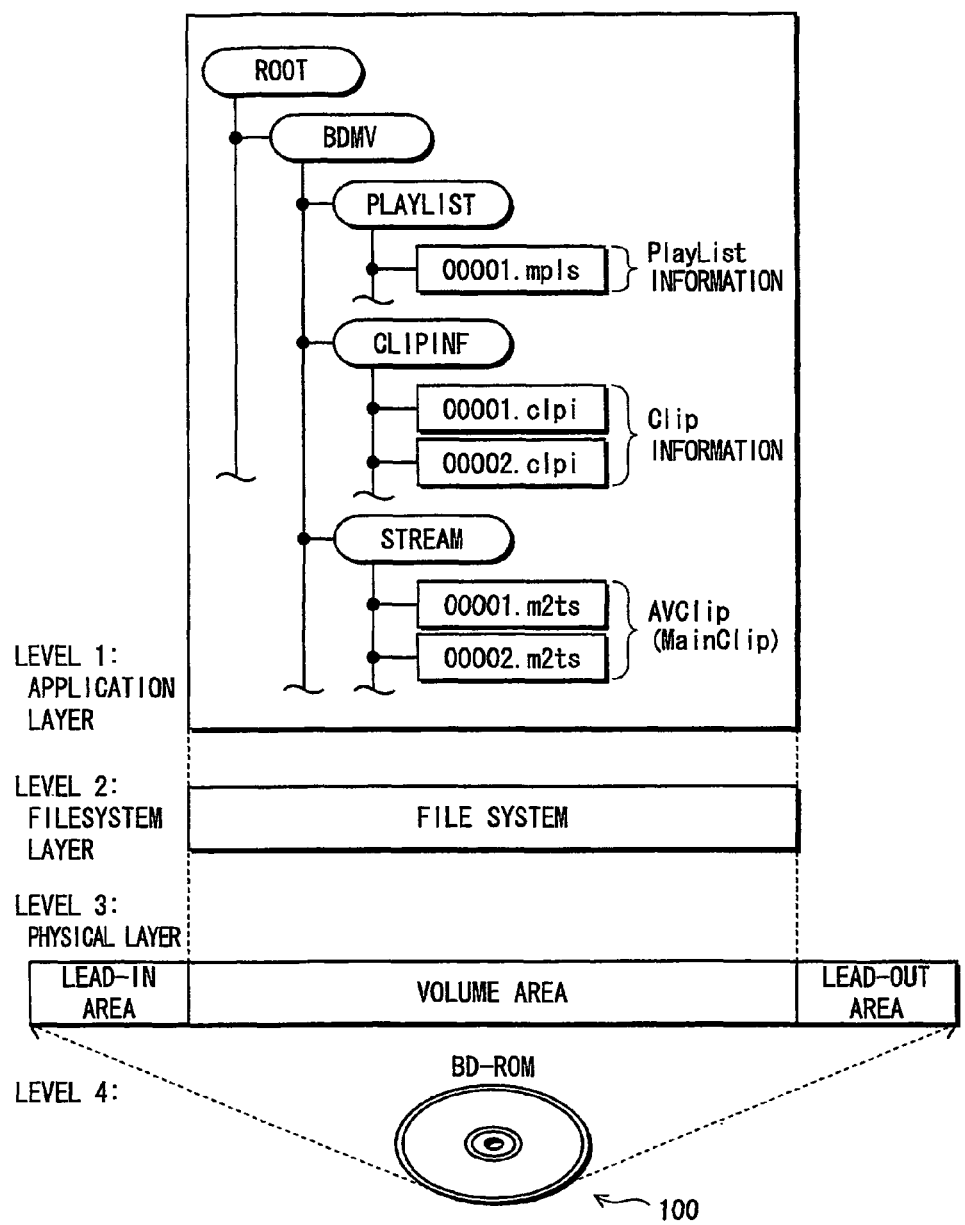
FIG. 2 shows an internal structure of a BD-ROM.

FIG. 2 shows an internal structure of a BD-ROM. Level 4 in the figure shows the BD-ROM, and Level 3 shows a track on the BD-ROM. The figure depicts the track in a laterally drawn-out form, although the track is, in fact, formed in a spiral, winding from the inside toward the outside of the BD-ROM. The track is composed of a lead-in area, a volume area, and a lead-out area. The volume area in the figure has a layer model made up of a physical layer, a filesystem layer, and an application layer. Level 1 in the figure shows a format of the application layer of the BD-ROM by using a directory structure. In Level 1, BD-ROM has BDMV directory under Root directory.

Furthermore, three subdirectories are located under the BDMV directory: PLAYLIST directory; CLIPINF directory; and STREAM directory.

The PLAYLIST directory includes a file to which an extension of mpls is attached (00001.mpls).

The CLIPINF directory includes files to each of which an extension of clpi is attached (00001.clip and 00002.clip).

The STREAM directory includes files to each of which an extension of m2ts is attached (00001.m2ts and 00002.m2ts).

Thus, it can be seen that multiple files of different types are arranged in the BD-ROM according to the directory structure above.

<BD-ROM Structure 1: AVClip>

Figure 3:
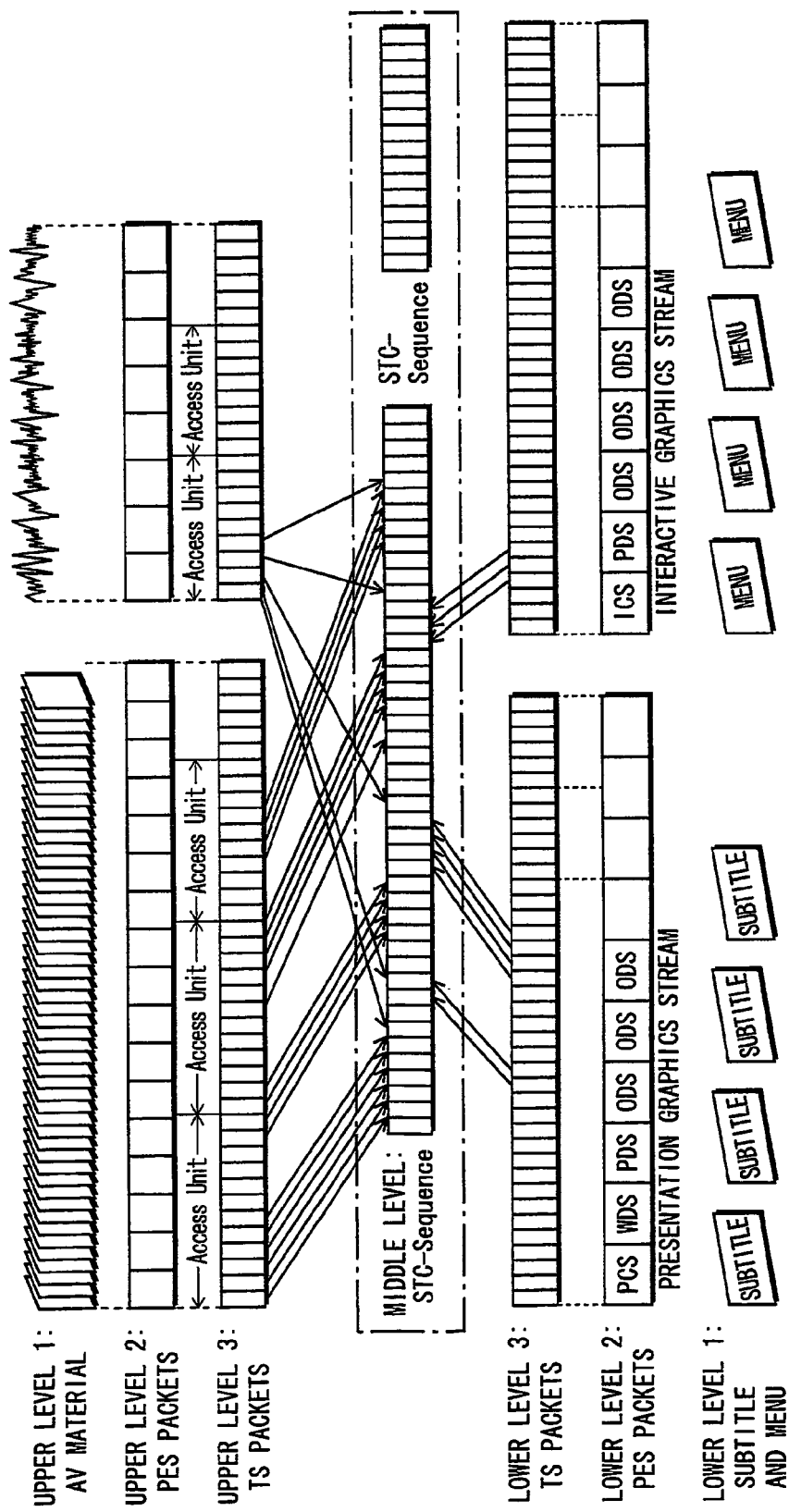
FIG. 3 is a simplified drawing showing a structure of a file with an extension of .m2ts attached thereto.

First, files to which the extension "m2ts" is attached are explained. FIG. 3 shows a schematic structure of the file to which the extension "m2ts" is attached. The files to each of which the extension "m2ts" is attached (00001.m2ts and 00002.m2ts) store an AVClip. The AVClip is a digital stream in the MPEG2-Transport Stream format. The digital stream is generated by converting the digitized video and audio (upper Level 1) into an elementary stream composed of PES packets (upper Level 2), and converting the elementary stream into TS packets (upper. Level 3), and similarly; converting the Presentation Graphics (PG) stream for the subtitles or the like and the Interactive Graphics (IG) stream for the interactive purposes (lower Level 1 and lower Level 2) into the TS packets (lower Level 3), and then finally multiplexing these TS packets.

Figure 4:
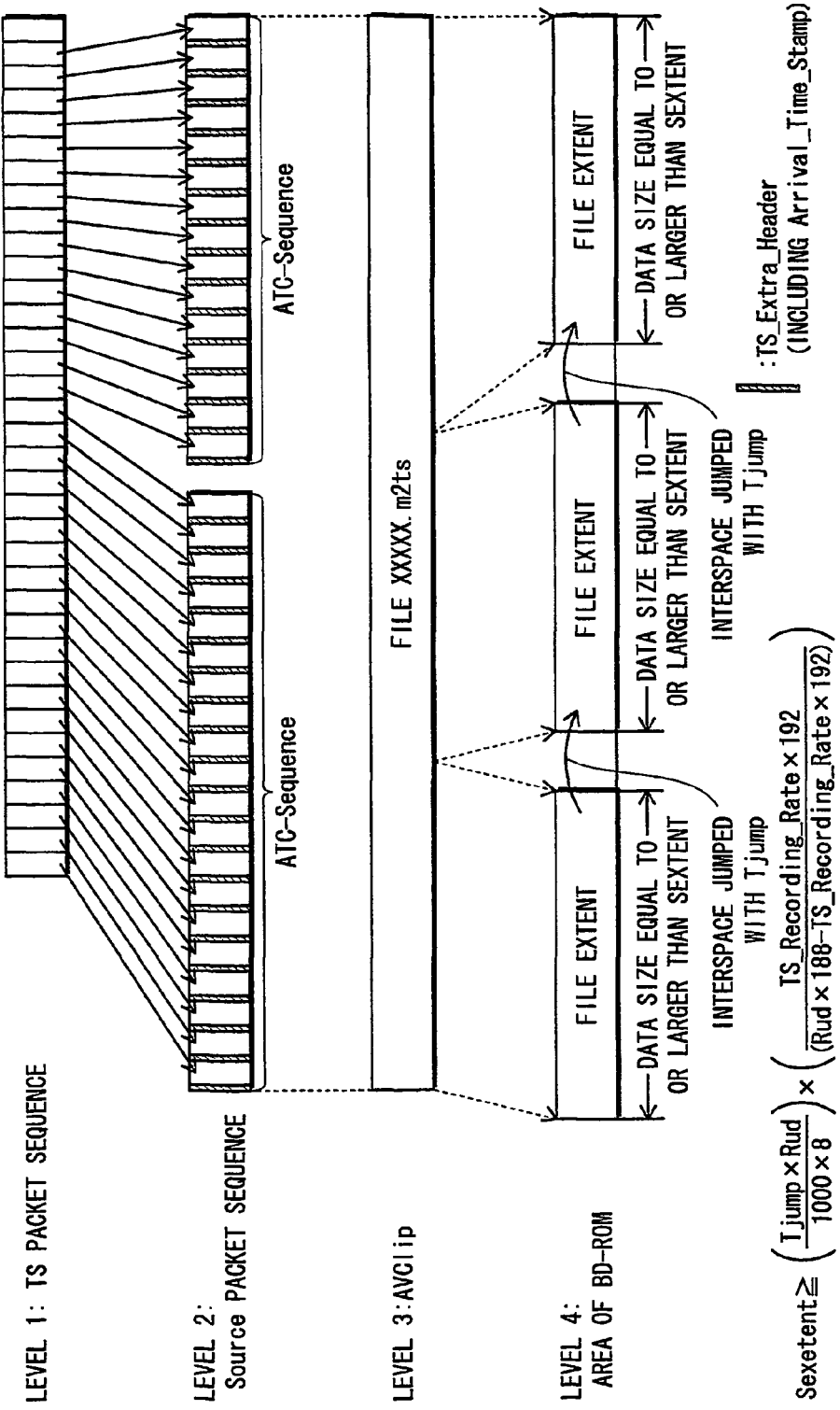
FIG. 4 shows processes until TS packets constituting an AVClip are written to the BD-ROM.

Next, how the AVClip having the above-described structure is written to the BD-ROM is explained. FIG. 4 shows what processes the TS packets constituting the AVClip are subjected to before they are written to the BD-ROM. Level 1 of the figure shows the TS packets constituting the AVClip.

As shown in Level 2 of FIG. 4, a 4-byte TS_extra_header (shaded portions in the figure) is attached to each 188-byte TS packet constituting the AVClip to generate each 192-byte Source packet. The TS_extra_header includes Arrival_Time_Stamp that is information indicating the time at which the TS packet is input to the decoder.

The AVClip shown in Level 3 includes one or more "ATC_Sequences" each of which is a sequence of Source packets. The "ATC_Sequence" is a sequence of Source packets, where Arrival_Time_Clocks referred to by the Arrival_Time_Stamps included in the ATC_Sequence do not include "arrival time-base discontinuity". In other words, the "ATC_Sequence" is a sequence of Source packets, where Arrival_Time_Clocks referred to by the Arrival_Time_Stamps included in the ATC_Sequence are continuous.

Such ATC_Sequences constitute the AVClip, and are recorded on the BD-ROM with a file name "xxxxx.m2ts".

The AVClip is, as is the case with the normal computer files, divided into one or more file extents, which are then recorded in areas on the BD-ROM. Level 4 shows how the AVClip is recorded on the BD-ROM. In Level 4, each file extent constituting the file has a data length that is equal to or larger than a predetermined length called Sextent.

Sextent is the minimum data length of each file extent, where an AVClip is divided into a plurality of file extents to be recorded.

The time required for the optical pickup to jump to a location on the BD-ROM is obtained by the following equation:

$$T\text{jump} = T\text{access} + T\text{overhead}.$$

The "Taccess" is a time required that corresponds to a jump distance (a distance to a jump-destination physical address).

The TS packets read out from the BD-ROM are stored in a buffer called read buffer, and then output to the decoder. The "Toverhead" is obtained by the following equation when the input to the read buffer is performed with a bit rate called "Rud" and the number of sectors in the ECC block is represented by Secc:

$$T\text{overhead} \leq (2 \times Secc \times 8)/Rud = 20 \text{ msec}.$$

TS packets read out from the BD-ROM are stored in the read buffer in the state of Source packets, and then supplied to the decoder at a transfer rate called "TS_Recording_rate".

To keep the transfer rate of the TS_Recording_rate while the TS packets are supplied to the decoder, it is necessary that, during Tjump, the TS packets are continuously output from the read buffer to the decoder. Here, Source packets, not TS packets, are output from the read buffer. As a result, when the ratio of the TS packet to the Source packet in size is $192/188$, it is necessary that during Tjump, the Source packets are continuously output from the read buffer at a transfer rate of "$192/188 \times TS\_Recording\_rate$".

Accordingly, the amount of occupied buffer capacity of the read buffer that does not cause an underflow is represented by the following equation:

$$B\text{occupied} \leq (T\text{jump}/1000 \times 8) \times ((192/188) \times TS\_Recording\_rate).$$

The input rate to the read buffer is represented by Rud, and the output rate from the read buffer is represented by $TS\_Recording\_rate \times (192/188)$. Therefore, the occupation rate of the read buffer is obtained by performing "(input rate)−(output rate)", and thus obtained by "$(Rud - TS\_Recording\_rate) \times (192/188)$".

The time "Tx" required to occupy the read buffer by "Boccupied" is obtained by the following equation:

$$Tx = B\text{occupied}/(Rud - TS\_Recording\_rate \times (192/188)).$$

When reading from the BD-ROM, it is necessary to continue to input TS packets with the bit rate Rud for the time period "Tx". As a result, the minimum data length. Sextent per extent when the AVClip is divided into a plurality of file extents to be recorded is obtained by the following equations:

$$\begin{aligned}
S\text{extent} &= Rud \times Tx \\
&= Rud \times B\text{occupied}/ \\
&\quad (Rud - TS\_Recording\_rate \times (192/188)) \geq \\
&\quad Rud \times (T\text{jump}/1000 \times 8) \times ((192/188) \times \\
&\quad TS\_Recording\_rate)/(Rud - \\
&\quad TS\_Recording\_rate \times (192/188)) \geq \\
&\quad (Rud \times T\text{jump}/1000 \times 8) \times TS\_Recording\_rate \times 192/ \\
&\quad (Rud \times 188 - TS\_Recording\_rate \times 192).
\end{aligned}$$

Hence, $$S\text{extent} \geq (T\text{jump} \times Rud/1000 \times 8) \times$$
$$(TS\_Recording\_rate \times 192/(Rud \times 188 - TS\_Recording\_rate \times 192)).$$

If each file extent constituting the AVClip has the data length equal to or larger than Sextent that is calculated as a value that does not cause an underflow of the decoder, even if the file extents constituting the AVClip are located discretely on the BD-ROM, TS packets are continuously supplied to the decoder so that the data is read out continuously during the playback.

Figure 5:
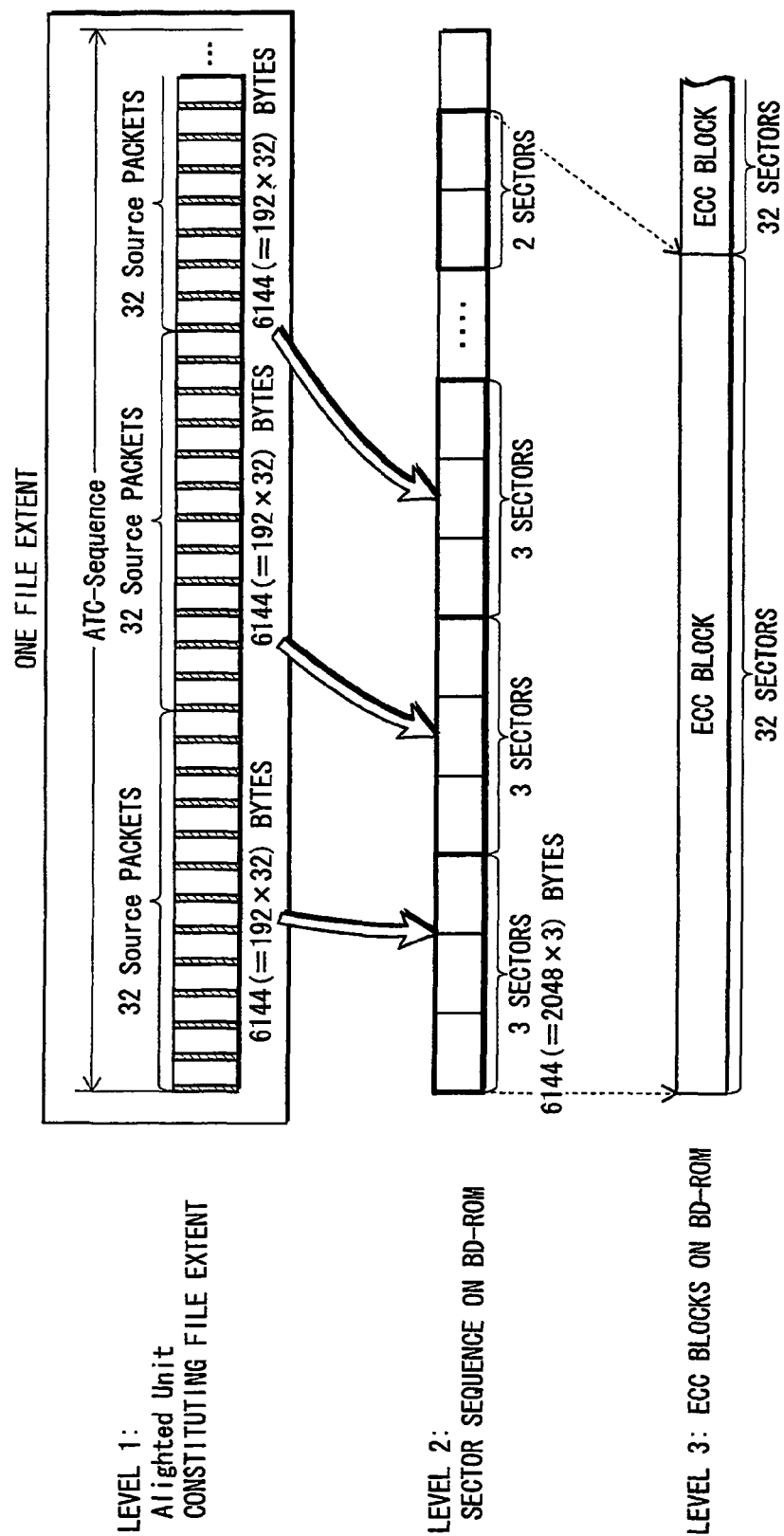
FIG. 5 shows relationships between a physical unit of the BD-ROM and the Source packets constituting one file extent.

FIG. 5 shows relationships between the physical unit of the BD-ROM and the Source packets constituting one file extent. As shown in Level 2, a plurality of sectors are formed on the BD-ROM. The Source packets constituting the file extent are, as shown in Level 1, divided into groups each of which is composed of 32 Source packets. Each group of Source packets is then written into a set of three consecutive sectors. The group of 32 Source packets is 6144 bytes (=32×192), which is equivalent to the size of three sectors (=2048×3). The 32 Source packets stored in the three sectors is called an "Aligned Unit". Writing to the BD-ROM is performed in units of Aligned Units.

In Level 3, an error correction code is attached to each block of 32 sectors. The block with the error correction code is referred to as an ECC block. As long as accessing the BD-ROM in units of Aligned Units, the playback apparatus can obtain 32 complete Source packets. Thus concludes the description of the writing process of the AVClip to the BD-ROM.

A more detailed explanation for elementary streams to be multiplexed into MainClip is given below.

Figure 6:
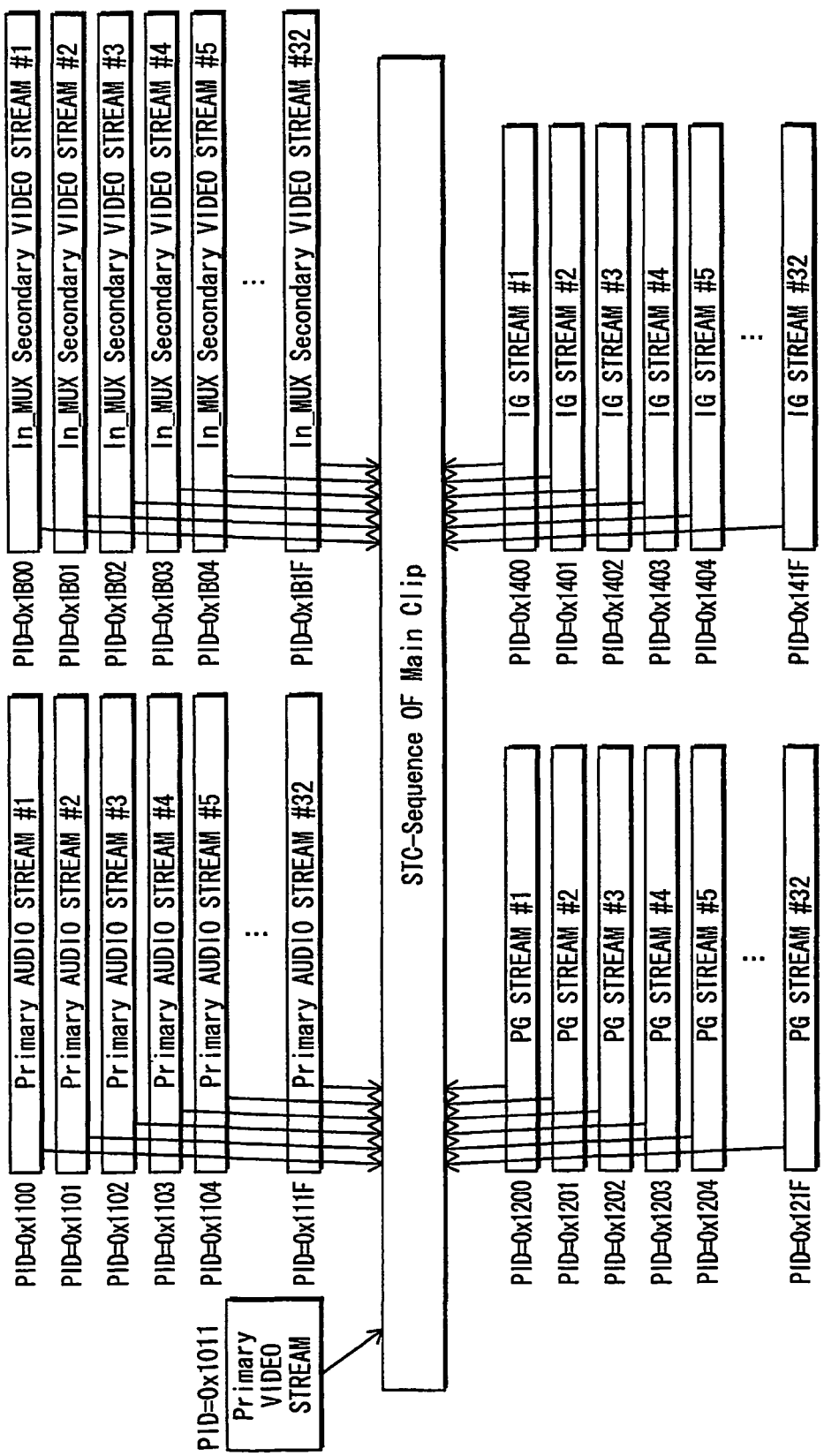
FIG. 6 shows what kind of elementary streams are multiplexed into an AVClip.

FIG. 6 shows the elementary streams that are multiplexed into the MainClip. The elementary streams to be multiplexed into STC-Sequence of the MainClip are: Primary video stream having PID of 0x1011; Primary audio streams having PIDs of 0x1100 to 0x111F; 32 PG streams having PIDs of 0x1200 to 0x121F; 32 IG streams having PIDs of 0x1400 to 0x141F; and 32 Secondary video streams having PIDs of 0x1B00 to 0x1B1F.

The following describes these video streams, audio streams, PG streams and IG streams.

<Primary Video Stream>

The primary video stream is a stream constituting the main movie, and is composed of picture data of SDTV and HDTV. The video stream is in VC-1 video stream, MPEG4-AVC or MPEG2-Video format. When the primary video stream is a video stream in MPEG4-AVC format, time stamps such as PTS and DTS are attached to IDR, I, P and B pictures, and playback control is performed in units of a picture. A unit of a video stream, which is a unit for playback control with PTS and DTS attached thereto, is called "Video Presentation Unit".

<Secondary Video Stream>

The secondary video stream is a stream constituting a commentary or the like of the motion picture, and Picture in Picture is implemented by composing the playback video of the secondary video stream with the primary video stream. The video stream is in VC-1 video stream format, MPEG4-AVC video stream format or MPEG2-Video video stream format, and includes "Video Presentation Units". The secondary video stream is in $525/60$ video format, $625/50$ video format, 1920×1080 format, or 1280×720 format.

Figure 8:
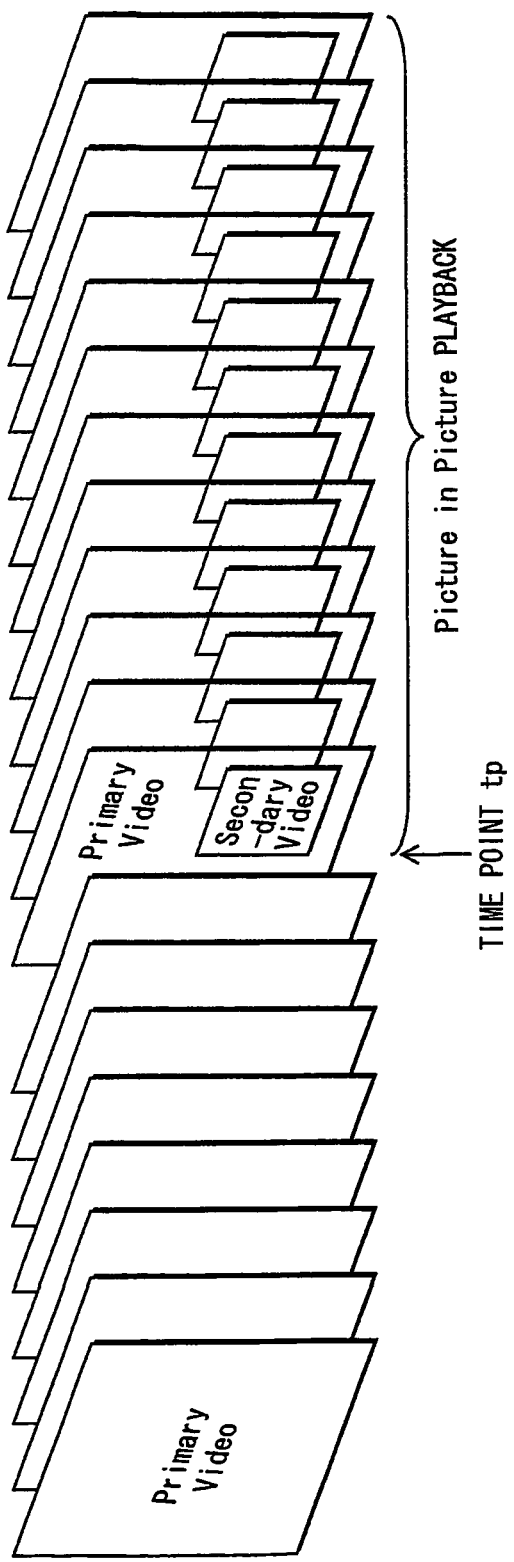
FIG. 8 shows an example of Picture in Picture.

FIG. 8 shows an example of Picture in Picture. The figure shows that only the primary video is played until a predetermined time point tp. It can be seen that a video in which the secondary video is superimposed onto the primary video is played after the time point tp. Thus, the secondary video stream is composed of a plurality of pictures, each of which is superimposed onto one of the pictures of the primary video. As the secondary video streams shown in FIG. 6, secondary video streams to be multiplexed into an AVClip, which is the same AVClip where the primary video stream is multiplexed, are called "In_MUX_secondary video streams". General elementary streams to be multiplexed into the same AVClip as the primary video stream, besides the secondary video streams, are called "In_MUX streams".

<Primary Audio Stream>

The primary audio streams are streams for main audio tracks of the motion picture, and the formats of the primary audio streams include LPCM audio stream format, DTS-HD audio stream format, DD/DD+ audio stream format, and DD/MLP audio stream format. Time stamps are attached to audio frames in the audio streams, and playback control is performed in units of an audio frame. A unit of an audio stream, which is a unit for playback control with a time stamp attached thereto, is called "Audio Presentation Unit". Note that; although being not recorded on the BD-ROM here, audio streams for sub-audio tracks of a motion picture are called secondary audio streams.

<PG Stream>

The PG stream is a graphics stream constituting a subtitle written in a language. There are a plurality of streams that respectively correspond to a plurality of languages such as English, Japanese, and French. The PG stream is composed of functional segments such as: PCS (Presentation Control Segment); PDS (Pallet Define Segment); WDS (Window Define Segment); ODS (Object Define Segment); and END (END of Display Set Segment). The ODS (Object Define Segment) is a functional segment that defines a graphics object which is a subtitle.

The WDS is a functional segment that defines a drawing area of a graphics object on the screen. The PDS (Pallet Define Segment) is a functional segment that defines a color in drawing a graphics object. The PCS is a functional segment that defines a page control in displaying a subtitle. Such page control includes Cut-In/Out, Fade-In/Out, Color Change, Scroll, and Wipe-In/Out. It is possible with the page control by the PCS to achieve a display effect, for example, fading out the current subtitle while displaying the next subtitle.

Besides the Presentation Graphics streams, streams representing subtitles, which are not multiplexed into the same AVClip as the primary video stream, include text subtitle (textST) streams. The textST streams are streams representing the contents of the subtitles with character codes. In the BD-ROM standard, a combination of the Presentation Graphics stream and textST stream is called a "PGTextST stream".

<IG Stream>

The IG streams are graphics streams for achieving interactive control. The interactive control defined by an IG stream is an interactive control that is compatible with an interactive control on a DVD playback apparatus. The IG stream is composed of functional segments such as: ICS (Interactive Composition Segment); PDS (Palette Definition Segment); and ODS (Object Definition Segment). The ODS (Object Definition Segment) is a functional segment that defines a graphics object. Buttons on the interactive screen are drawn by a plurality of such graphics objects. The PDS (Palette Definition Segment) is a functional segment that defines a color in drawing a graphics object. The ICS (Interactive Composition Segment) is a functional segment that achieves a state change in which the button state changes in accordance with a user operation. The ICS includes a button command that is executed when a confirmation operation is performed on a button.

FIG. 7 shows a PID allocation map for elementary streams recorded on the BD-ROM. The left column of the BID allocation map indicates multiple ranges of PIDs. The right column indicates an elementary stream allocated to each of the ranges. When the figure is referred to according to this description, the following can be seen: the program_map is allocated in the PID range of 0x0100; the PCR in the range of 0x1001; the primary video stream in the range of 0x1011; the primary audio streams in the range of 0x1100 to 0x111F; PG streams in the range of 0x1200 to 0x121F; IG streams in the range of 0x1400 to 0x141F; and IN_MUX_Secondary video streams in the range of 0x1B00 to 0x1B1F.

As can be seen from the PID allocation map, the ranges for the primary video stream and for the secondary video streams are different.

The PES packets of the secondary video streams for constituting Picture in Picture have different high bytes from those of PIDS of the PES packets of the primary video stream. Therefore, even if the primary video stream and secondary video streams are multiplexed into one AVClip, the PES packets constituting each type of the video streams can be supplied to a different decoder by referring to the high bytes of PIDs.

<BD-ROM Structure 2: Clip Information>

Figure 9:
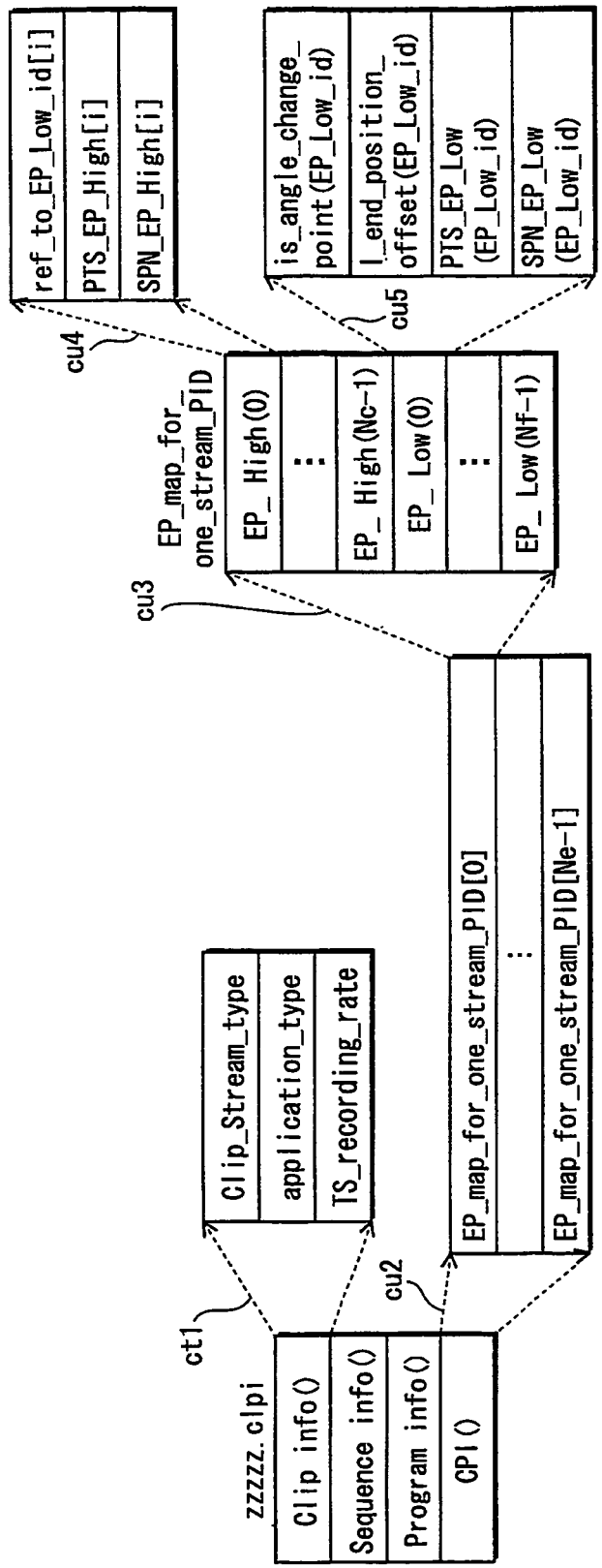
FIG. 9 shows an internal structure of Clip information.

Next are described files to which an extension "clpi" is attached. Files (00001.clpi and 00002.clpi) to which an extension "clpi" is attached store Clip information. The Clip information is management information on each AVClip. FIG. 9 shows the internal structure of Clip information. As shown on the left-hand side of the figure, the Clip information includes:

i) "ClipInfo( )" storing therein information regarding the AVClip;

ii) "Sequence Info( )" storing therein information regarding the ATC Sequence and the STC Sequence;

iii) "Program Info( )" storing therein information regarding the Program Sequence; and iv) "Characteristic Point Info (CPI( ))".

The "ClipInfo" includes "application_type" indicating the application type of the AVClip referred to by the Clip information. Referring to the ClipInfo allows identification of whether the application type is the MainClip or SubClip, whether video is contained, or whether still pictures (slide show) are contained. In addition, the above-mentioned TS_recording_rate is described in the ClipInfo.

The Sequence Info is information regarding one or more STC-Sequences and ATC-Sequences contained in the AVClip. The reason that these information are provided is to preliminarily notify the playback apparatus of the system time-base discontinuity and the arrival time-base discontinuity. That is to say, if such discontinuity is present, there is a possibility that a PTS and an ATS that have the same value appear in the AVClip. This might be a cause of defective playback. The Sequence Info is provided to indicate from where to where in the transport stream the STCs or the ATCs are sequential.

The Program Info is information that indicates a section (called "Program Sequence") of the program where the contents are constant. Here, "Program" is a group of elementary streams that have in common a time axis for synchronous playback. The reason that the Program Info is provided is to preliminarily notify the playback apparatus of a point at which the Program contents change. It should be noted here that the point at which the Program contents change is, for example, a point at which the PID of the video stream changes, or a point at which the type of the video stream changes from SDTV to HDTV.

Next is described the Characteristic Point Info. The lead line cu2 in FIG. 9 indicates a close-up of the structure of CPI. As indicated by the lead line cu2, the CPI is composed of Ne pieces of EP_map_for_one_stream_PIDs (EP_map_for_one_stream_PID[0] to EP_map_for_one_stream_PID[Ne−1]). These EP_map_for_one_stream_PIDs are EP_maps of the elementary streams that belong to the AVClip. The EP_map is information that indicates, in association with an entry time (PTS_EP_start), a packet number (SPN_EP_start) at an entry position where the Access Unit is present in one elementary stream. The lead line cu3 in the figure indicates a close-up of the internal structure of EP_map_for_one_stream_PID.

It is understood from the close-up that the EP_map_for_one_stream_PID is composed of Ne pieces of EP_Highs (EP_High(0) to EP_High(Nc−1)) and Nf pieces of EP_Lows (EP_Low(0) to EP_Low (Nf−1)). Here, the EP_High plays a role of indicating upper bits of the SPN_EP_start and the PTS_EP_start of the Access Unit (Non-IDR I-Picture, IDR-Picture), and the EP_Low plays a role of indicating lower bits of the SPN_EP_start and the PTS_EP_start of the Access Unit (Non-IDR I-Picture and IDR-Picture).

The lead line cu4 in the figure indicates a close-up of the internal structure of EP_High. As indicated by the lead line cu4, the EP_High(i) is composed of: "ref_to_EP_Low_id[i]" that is a reference value to EP_Low; "PTS_EP_High[i]" that indicates upper bits of the PTS of the Access Unit (Non-IDR I-Picture, IDR-Picture); and "SPN_EP_High[i]" that indicates upper bits of the SPN of the Access Unit (Non-IDR I-Picture, IDR-Picture). Here, "i" is an identifier of a given EP_High.

The lead line cu5 in the figure indicates a close-up of the structure of EP_Low. As indicated by the lead line cu5, the EP_Low(i) is composed of: "is_angle_change_point (EP_Low_id)" that indicates whether the corresponding Access Unit is an IDR picture; "I_end_position_offset (EP_Low_id)" that indicates the size of the corresponding Access Unit; "PTS_EP_Low(EP_Low_id)" that indicates lower bits of the PTS of the Access Unit (Non-IDR I-Picture, IDR-Picture); and "SPN_EP_Low(EP_Low_id)" that indicates lower bits of the SPN of the Access Unit (Non-IDR I-Picture, IDR-Picture). Here, "EP_Low_id" is an identifier for identifying a given EP_Low.

<Clip Information Explanation 2: EP_Map>

Figure 10:
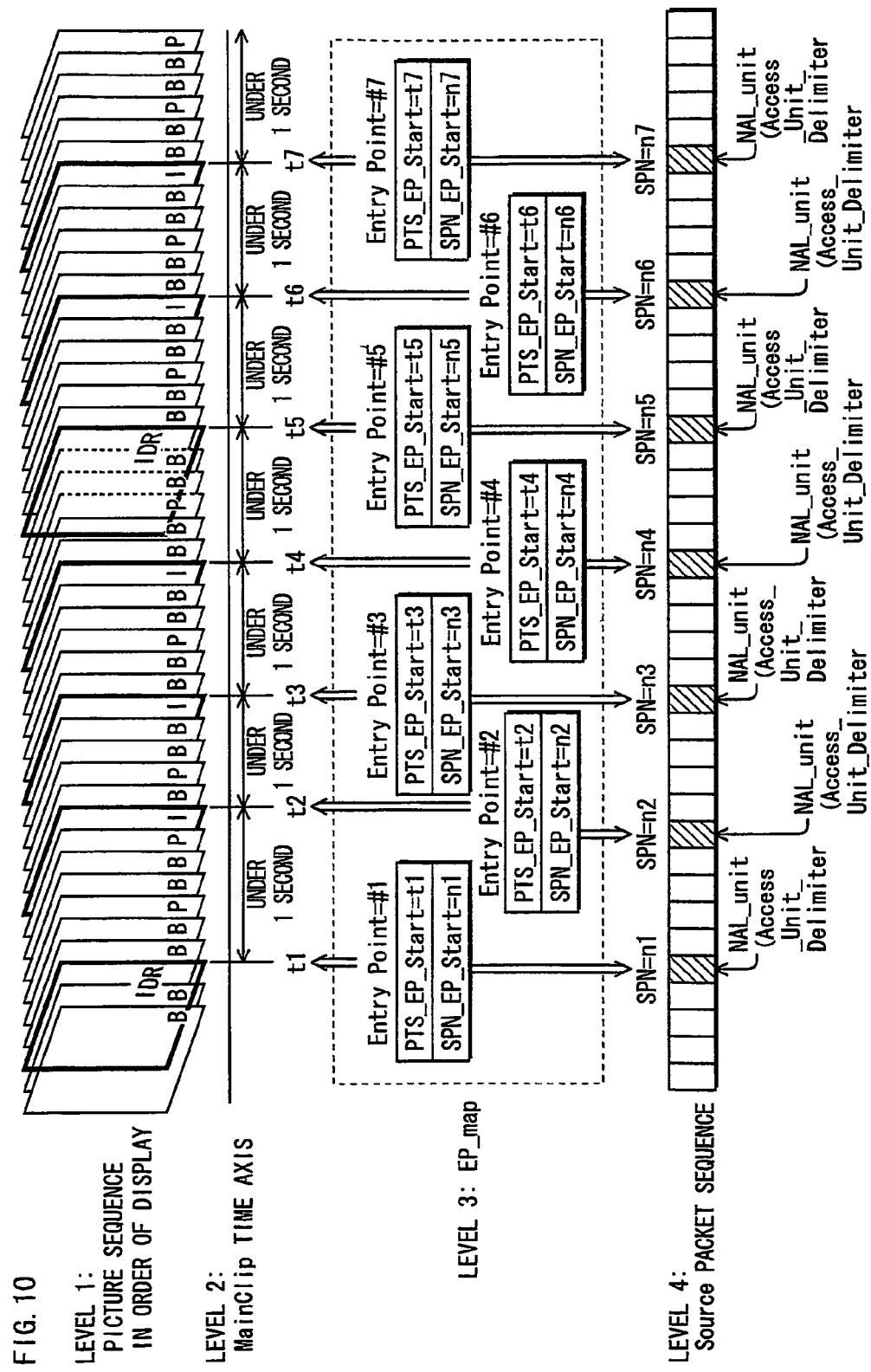
FIG. 10 shows EP_map settings for a video stream of a motion picture.

Here, the EP_map is explained using a specific example. FIG. 10 shows EP_map settings for a video stream of a motion picture. Level 1 shows a plurality of pictures (IDR picture, I-Picture, B-Picture, and P-Picture defined in MPEG4-AVC) arranged in the order of display. Level 2 shows the time axis for the pictures. Level 4 indicates a TS packet sequence on the BD-ROM, and Level 3 indicates settings of the EP_map.

Assume here that, in the time axis of Level 2, an IDR picture or an I picture is present at each time point t1 to t7. The interval between adjacent ones of the time points t1 to t7 is approximately one second. The EP_map used for the motion picture is set to indicate t1 to t7 with the entry times (PTS_EP_start), and indicate entry positions (SPN_EP_start) in association with the entry times.

<PlayList Information>

Next is described the PlayList information. A file (00001.mpls) to which extension "mpls" is attached is a file storing therein the PlayList (PL) information.

Figure 11:
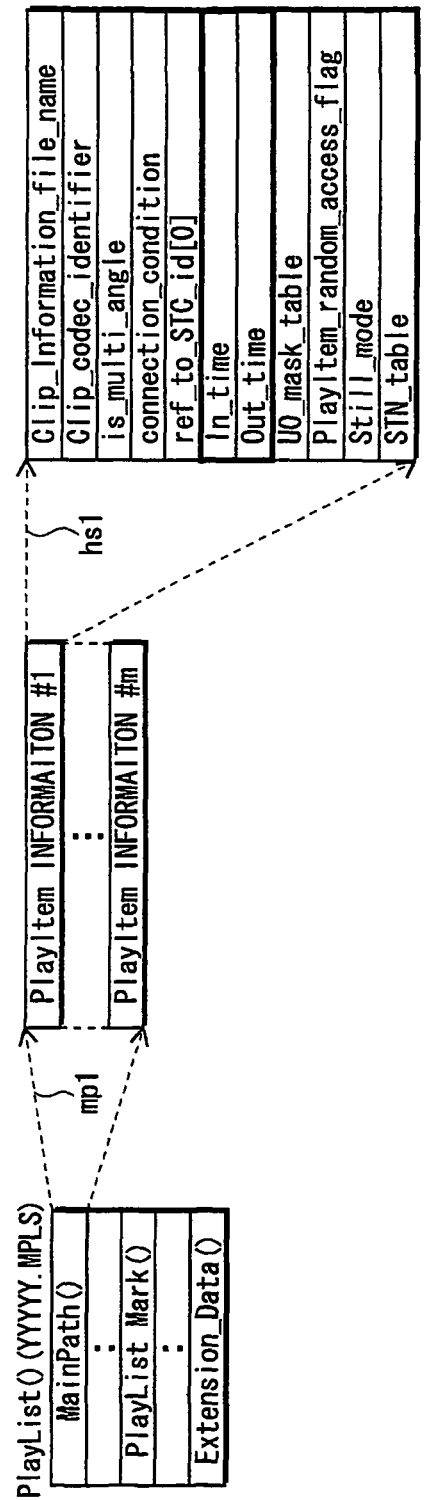
FIG. 11 shows the data structure of PlayList information.

FIG. 11 shows the data structure of the PlayList information. As indicated by the lead line mp1 in the figure, the PlayList information includes: MainPath information (MainPath( )) that defines MainPath; PlayListMark information (PlayListMark( )) that defines chapter; and other extension data (Extension Data).

<PlayList Information Explanation 1: MainPath Information>

First is described the MainPath. The MainPath is a playback path that is defined in terms of a video stream such as the primary video and an audio stream.

As indicated by the arrow mp1, the MainPath is defined by a plurality of pieces of PlayItem information: PlayItem information #1 to PlayItem information #m. The PlayItem information defines one or more logical playback sections that constitute the MainPath.

The lead line hs1 in the figure indicates a close-up of the structure of the PlayItem information. As indicated by the lead line hs1, the PlayItem information is composed of: "Clip_Information_file_name" that indicates the file name of the playback section information of the AVClip to which the IN point and the OUT point of the playback section belong; "Clip_codec_identifier" that indicates the AVClip encoding method; "is_multi_angle" that indicates whether or not the PlayItem is multi angle; "connection_condition" that indicates whether or not to seamlessly connect the current PlayItem and the preceding PlayItem; "ref_to_STC_id[0]" that indicates uniquely the STC_Sequence targeted by the PlayItem; "In_time" that is time information indicating the start point of the playback section; "Out_time" that is time information indicating the end point of the playback section;

"UO_mask_table" that indicates which user operation should be masked by the PlayItem; "PlayItem_random_access_flag" that indicates whether to permit a random access to a mid-point in the PlayItem; "Still_mode" that indicates whether to continue a still display of the last picture after the playback of the PlayItem ends; and "STN_table". Among these, the time information "In_time" indicating the start point of the playback section and the time information "Out_time" indicating the end point of the playback section constitute a playback path. The playback path information is composed of "In_time" and "Out_time".

Figure 12:
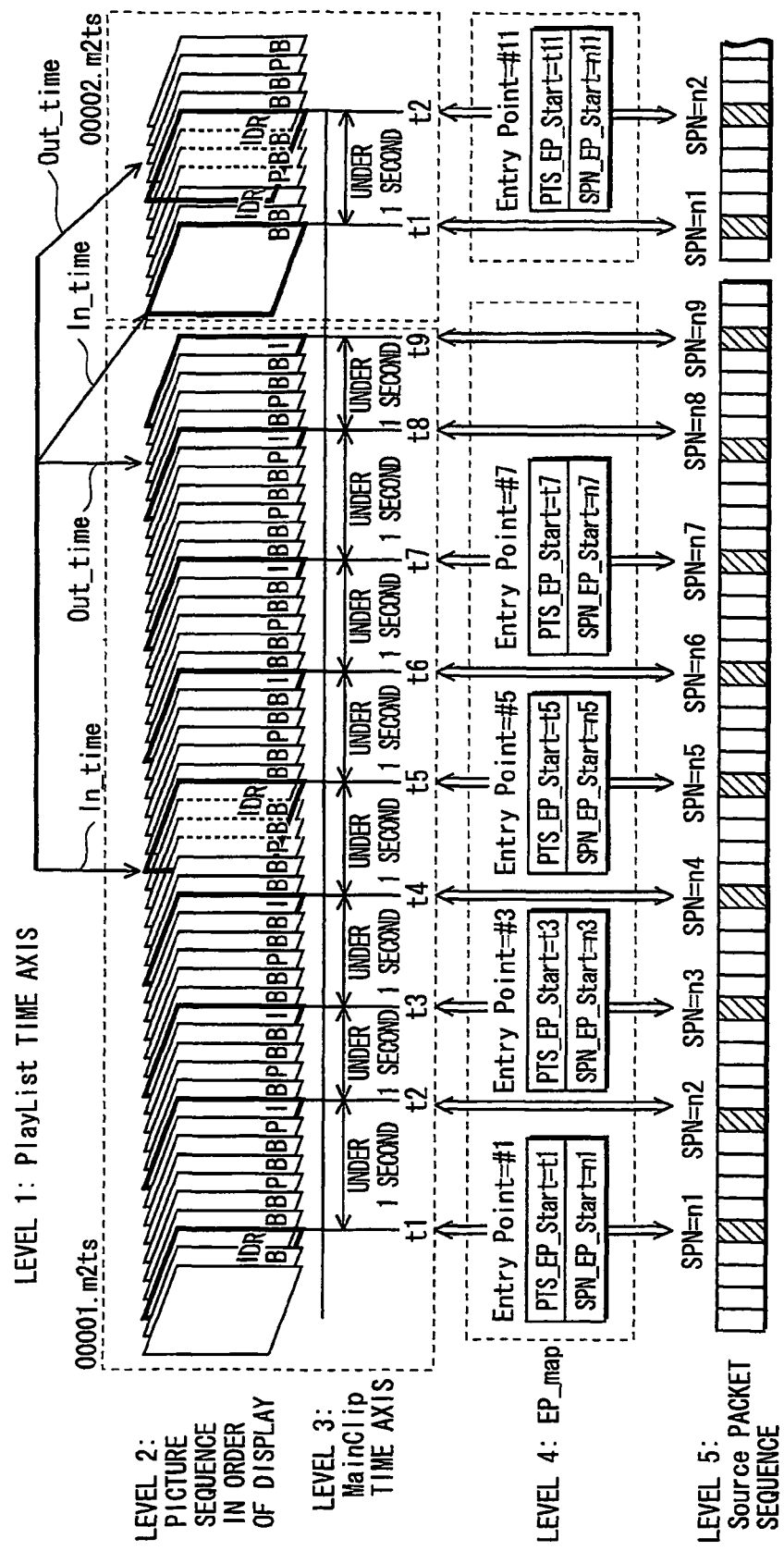
FIG. 12 shows the relationships between the AVClip and the PlayList information.

FIG. 12 shows the relationships between the AVClip and the PlayList information. Level 1 shows the time axis of the PlayList information (PlayList time axis). Levels 2 to 5 show the video stream that is referenced by the EP_map.

The PlayList information includes two pieces of PlayItem information: PlayItem information #1; and PlayItem information #2. Two playback sections are defined by "In_time" and "Out_time" included in the PlayItem information #1 and PlayItem information #2, respectively. When these playback sections are arranged, a time axis that is different from the AVClip time axis is defined. This is the PlayList time axis shown in Level 1. Thus, it is possible to define a playback path that is different from the AVClip by defining the PlayItem information.

Thus concludes the description of the BD-ROM 100.

<Local Storage 200>

Figure 13:
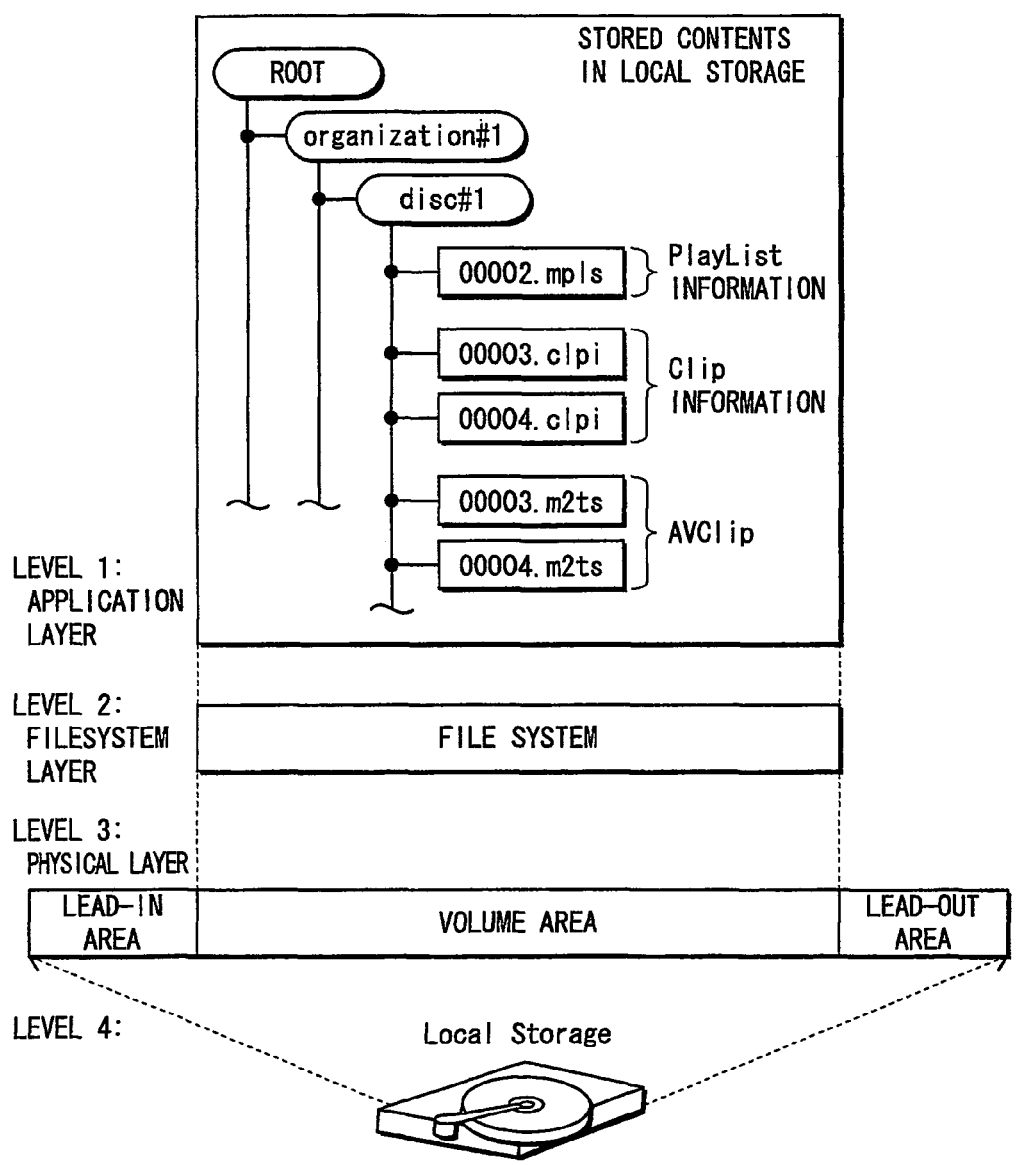
FIG. 13 shows an internal structure of a local storage 200.

The following describes the local storage 200 that is a recording medium of the present invention. FIG. 13 shows an internal structure of the local storage 200. As shown in the figure, the recording medium of the present invention can be produced by improving the application layer.

Level 4 of the figure shows the local storage 200 and Level 3 shows a track on the local storage 200. The figure depicts the track in a laterally drawn-out form, although the track is, in fact, formed in a spiral, winding from the inside toward the outside of the local storage 200. The track is composed of a lead-in area, a volume area, and a lead-out area. The volume area in the figure has a layer model made up of a physical layer, a filesystem layer, and an application layer. Level 1 in the figure shows a format of the application layer of the local storage 200 by using a directory structure.

In the directory structure shown in FIG. 13, there is a subdirectory "organization#1" under a root directory. Also, there is a subdirectory "disk#1" under the directory "organization#1". The directory "organization#1" is assigned to a specific provider of a motion picture. The directory "disk#1" is assigned to each BD-ROM provided from the provider.

With this construction in which the directory assigned to a specific provider includes directories that corresponds to BD-ROMs, download data for each BD-ROM is stored separately. Similarly to the information stored in the BD-ROM, under the subdirectory "disk#1", the following information is stored: PlayList information ("00002.mpls"); Clip information ("00003.clpi" and "00004.clpi"); and AVClips ("00003.m2ts" and "00004.m2ts".

The following describes components of the local storage 200: the PlayList information, Clip information and AVClips.

<Local-Storage 200 Structure 1: AVClip>

The AVClips (00003.m2ts and 00004.m2ts) in the local storage 200 make up a SubClip. The SubClip is formed by multiplexing four types of elementary streams—video streams, audio streams, PG streams and IG streams. The following gives a detailed description of the types of elementary streams which are multiplexed into an AVClip.

Figure 14:
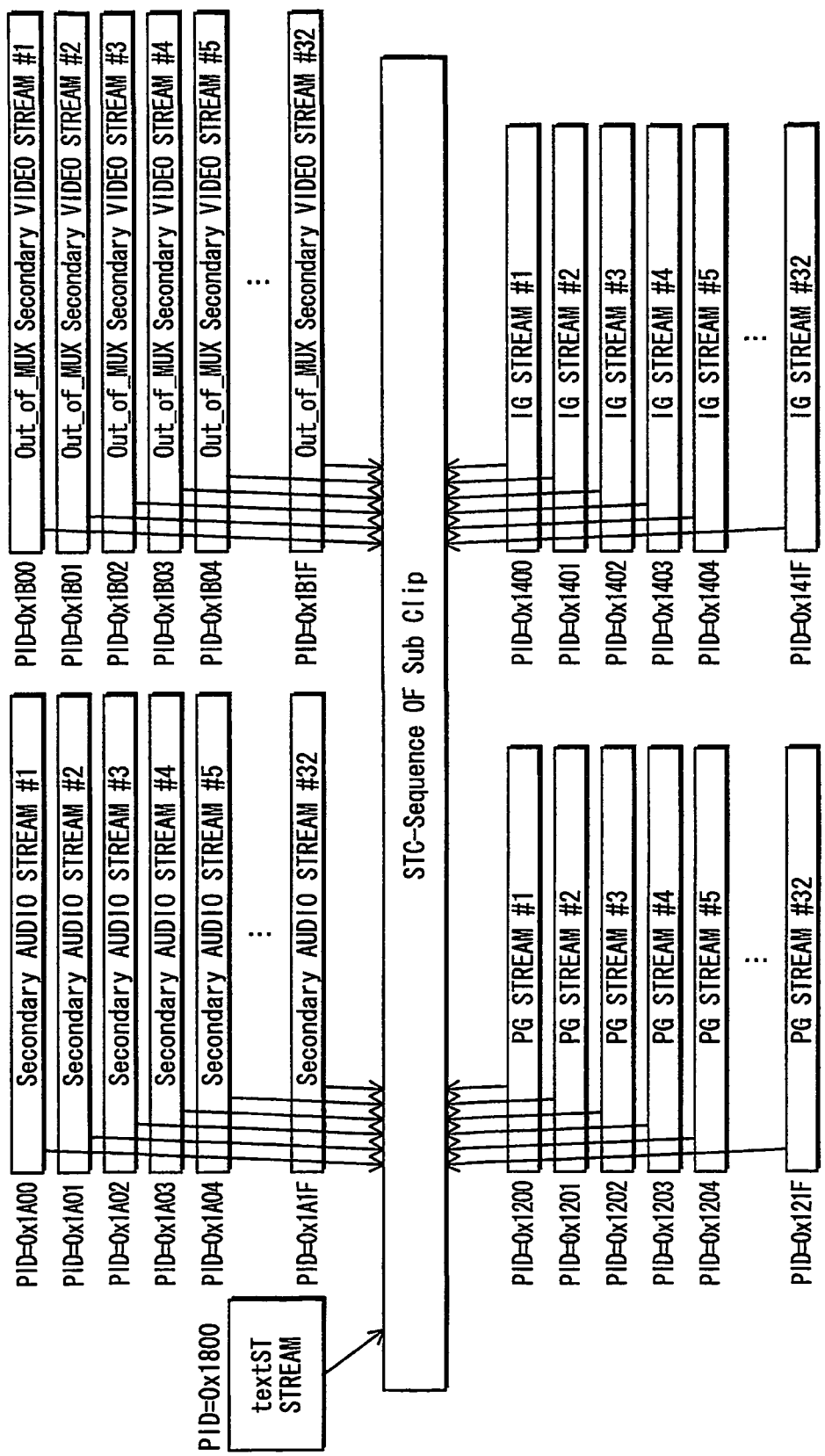
FIG. 14 shows elementary streams multiplexed into Sub-Clip.

FIG. 13 shows an internal structure of the local storage 200. The elementary streams to be multiplexed into the SubClip are: textST stream having PID of 0x1800; primary audio streams having PIDs of 0x1A00 to 0x1A1F; 32 Out_of_MUX_Secondary video streams having PIDs of 0x1B00 to 0x1B1F; 32 PG streams having PIDs of 0x1200 to 0x121F; and 32 IG streams having PIDs of 0x1400 to 0x141F. As the secondary video streams shown in FIG. 14, secondary video streams to be multiplexed into an AVClip, which is a different AVClip where the primary video stream is multiplexed, are called "Out_of_MUX_Secondary video streams". General elementary streams to be multiplexed into a different AVClip from the primary video stream, besides the secondary video streams, are called "Out_of_MUX streams".

FIG. 15 shows a PID allocation map for elementary streams multiplexed into the SubClip. The left column of the PID allocation map indicates multiple ranges of PIDs. The right column indicates an elementary stream allocated to each of the ranges. When the figure is referred to according to this description, the following can be seen: the program_map is allocated in the PID range of 0x0100; the PCR in the range of 0x1001; PG streams in the range of 0x1200 to 0x121F; IG streams in the range of 0x1400 to 0x141F; the textST stream in the range of 0x1800; secondary audio streams in the range of 0x1A00 to 0x1A1F; and secondary video streams in the range of 0x1B00 to 0x1B1F.

<Local. Storage 200 Structure 2: PlayList Information>

Figure 16:
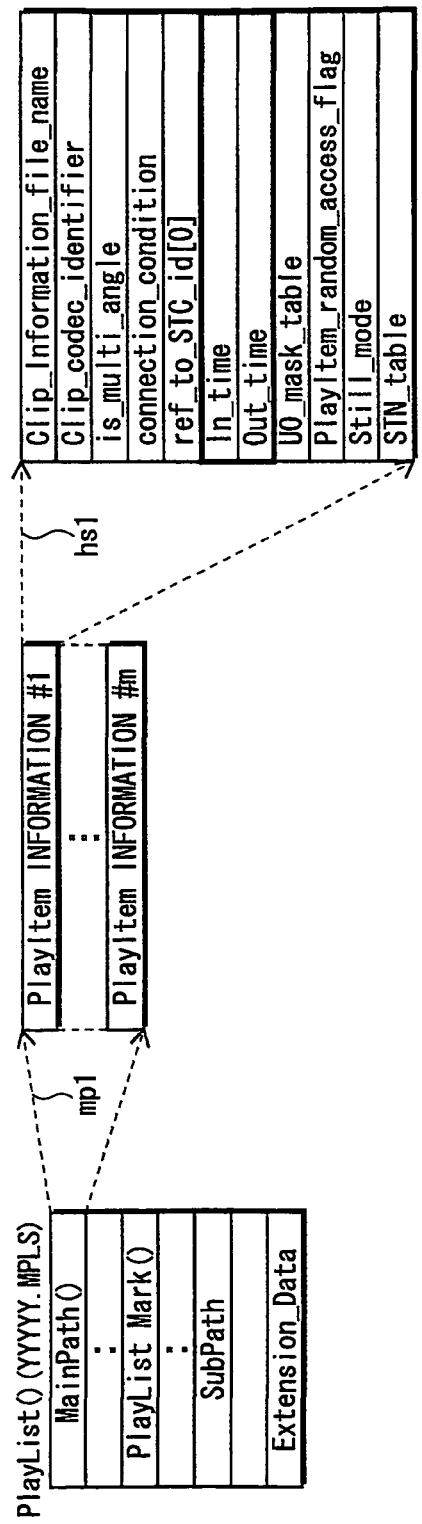
FIG. 16 shows a data structure of the PlayList information.

Next is described the PlayList information in the local storage 200. A file (00002.mpls) to which extension "mpls" is attached is information that defines a group made by binding up two types of playback paths called MainPath and Subpath as Playlist (PL). FIG. 16 shows the data structure of the PlayList information. As shown in the figure, the PlayList information includes: MainPath information (MainPath( )) that defines MainPath; PlayListMark information (PlayListMark( )) that defines chapter; Subpath information that defines Subpath; and other extension data (Extension_Data). The internal structures of the PlayList information and PlayItem information are the same as those in the BD-ROM, and therefore their descriptions are omitted here. The following describes the Subpath information.

<PlayList Information Explanation 1: Subpath Information>

Whereas the MainPath is a playback path defined for the MainClip which is a primary video, the Subpath is a playback path defined for the SubClip which synchronizes with the MainPath.

Figure 17:
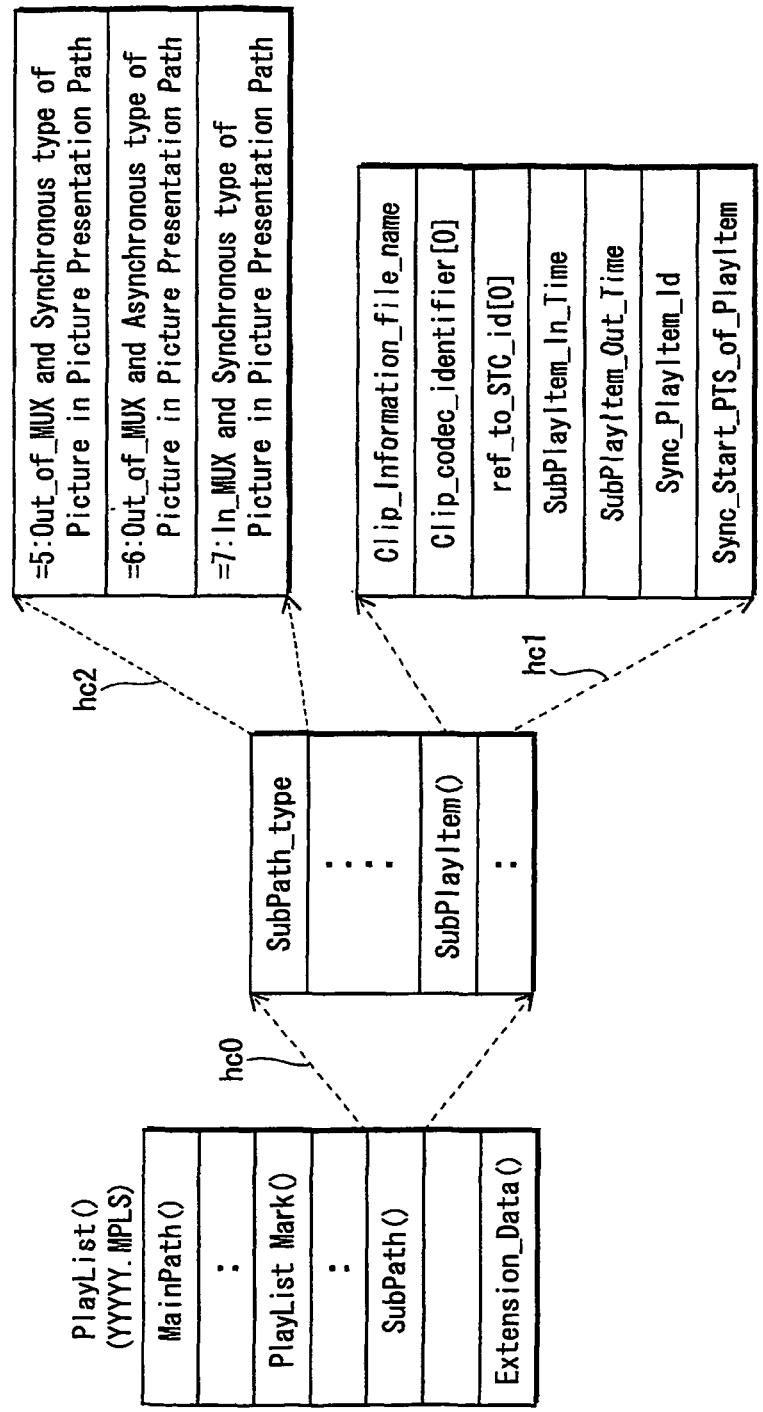
FIG. 17 shows a close-up of the internal structure of the Subpath information.

FIG. 17 shows a close-up of the internal structure of the Subpath information. As indicated by the arrow hc0 in the figure, each Subpath includes "SubPath_type" indicating a type of the SubClip and one or more pieces of SubPlayItem information ( . . . SubPlayItem( ) . . . ).

The lead line hc1 in the figure indicates a close-up of the structure of SubPathItem information.

The SubPlayItem defines one or more elementary stream playback paths separated from the MainPath, and is used to express the type showing how these playback paths are synchronized with the MainPath. When the SubPlayItems use subpaths of the primary audio, PG, IG, secondary audio and secondary video, these SubPlayItems synchronize with MainPaths using PlayItems in the PlayList. The elementary streams used by the Subpaths for the elementary stream playback are multiplexed into a SubClip, i.e. a Clip separated from the MainClip used by the PlayItem of the MainPath.

Next is described the internal structure of the SubPlayItem. As indicated by the arrow hc1 in the figure, the SubPlayItem information includes: "Clip_information_file_name"; "Clip_codec_identifier"; "ref_to_STC_id[0]"; "SubPlay- Item_In_time"; "SubPlayItem Out_time"; "sync_PlayItem_id"; and "sync_start_PTS_of_PlayItem".

The "Clip_information_file_name" is information that uniquely specifies a SubClip corresponding to the SubPlayItem by describing a file name of the Clip information.

The "Clip_codec_identifier" indicates an encoding system of the AVClip.

The "ref_to_STC_id[0]" uniquely indicates a STC_Sequence at which the SubPlayItem aims.

The "SubPlayItem_In_time" is information indicating a start point of the SubPlayItem on the playback time axis of the SubClip.

The "SubPlayItem_Out_time" is information indicating an end point of the SubPlayItem on the Playback time axis of the SubClip.

The "sync_PlayItem_id" is information uniquely specifying, from among PlayItems making up the MainPath, a PlayItem with which the SubPlayItem synchronizes. The "SubPlayItem_In_time" is present on the playback time axis of the PlayItem specified with the sync_PlayItem_id.

The "sync_start_PTS_of_PlayItem" indicates, with a time accuracy of 45 KHz, where the start point of the SubPlayItem specified by the SubPlayItem_In_time is present on the playback time axis of the PlayItem specified with the sync_PlayItem_id. In the case where the SubPlayItem defines a playback section on a secondary video stream and the sync_start_PTS_of_PlayItem of the SubPlayItem indicates a time point on the PlayItem time axis, the SubPlayItem realizes "synchronous Picture in Picture".

In addition, an unspecified value (0xFFF) can be set in the Sync_Start_Pts_of_PlayItem. The unspecified value causes the time point, on the time axis of the PlayItem specified by the Sync_PlayItem_Id, at which the user performed a lock operation to be a synchronous point with the PlayItem specified by the Sync_PlayItem_Id. In the case where the unspecified value is set in the Sync_Start_Pts_of_PlayItem and the SubPlayItem indicates the playback of a secondary video stream, the SubPlayItem realizes "asynchronous Picture in Picture".

<Details of Subpath Information 1. SubPath_Type>

Thus concludes the description of the SubPath information. Next is described the SubPath_type. When a value ranging from 0 to 255 is set therein, the SubPath_type indicates what kind of playback path the SubPath defined by the SubPath information is. Three typical types of playback paths expressed by the Subpath_types are explained below.

Subpath_Type=5
: Out-of-Mux and Synchronous Type of Picture in Picture Presentation Path In this case, the SubPlayItem defines a Picture in Picture playback path which is played in synchronization with an Out-of-mux. The elementary streams used in the path are multiplexed into a SubClip—i.e. a Clip separated from the MainClip which is used by the PlayItem of the MainPath.

Subpath_Type=6
: Out-of-Mux and Asynchronous Type of Picture in Picture Presentation Path In this case, the SubPlayItem defines a Picture in Picture playback path which is played out of synchronization with an Out-of-mux stream. That is, the elementary streams used in this path are multiplexed into a SubClip—i.e. a Clip different from a Clip used by the PlayItem. When SubPath_type=6, the SubPath includes only one SubPlayItem.

When SubPath_Type of the SubPlayItem is set to "6", the sync_PlayItem_id and sync_start_PTS_of_PlayItem become Invalid and are set to 0x0000 and 0x00000000, respectively.

Subpath_Type=7
: In-MUX and Synchronous Type of Picture in Picture Presentation Path In this case, the SubPlayItem defines a Picture in Picture playback path which is played in synchronization with an In-mux stream. That is, when Subpath_Type=7, the elementary streams used in this path are multiplexed into the same Clip together with the elementary streams used by the PlayItem to be played synchronously.

Thus concludes the description of the SubPath_type.

<Details of Subpath Information 2. Relationship of Three Objects>

Here, the three objects mean SubClips in the local storage 200, PlayList information in the local storage 200 and the MainClip in the BD-ROM.

Figure 18:
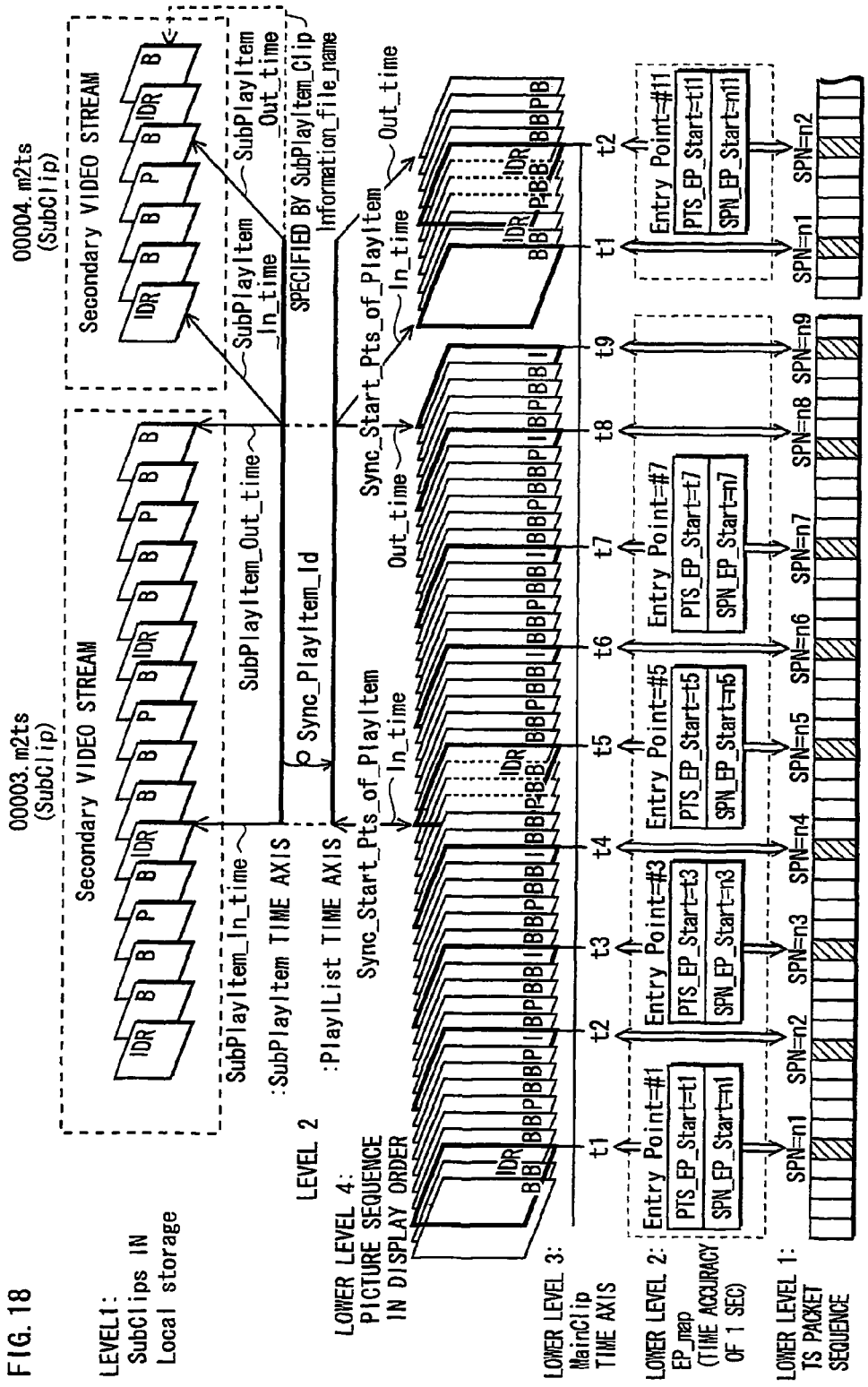
FIG. 18 shows relationship of SubClips in the local storage 200, PlayList information in the local storage 200 and the MainClip on the BD-ROM.

FIG. 18 shows relationship of SubClips in the local storage 200, PlayList information in the local storage 200 and the MainClip on the BD-ROM. Level 1 of the figure indicates SubClips present in the local storage 200. As shown in Level 1, there are different types of SubClips: a secondary video stream, a secondary audio stream, a PG stream and an IG stream. Any one of them is used as a SubPath for the synchronous playback.

Level 2 indicates two time axes defined by PlayList information. The lower time axis in Level 2 is a PlayItem time axis defined by the PlayItem information and the upper time axis is a SubPlayItem time axis defined by the SubPlayItem.

As shown in the figure, it can be seen that the SubPlayItem_Clip_information_file_name of the SubPlayItem information plays a role in SubClip selection, selecting an Out-of-MUX stream as a target for the playback section specification from among Out-of-MUX streams which are multiplexed into the .m2ts file stored in the STREAM directory.

It can also be seen that the SubPlayItem.IN_time and SubPlayItem.Out_time play roles in defining the start point and end point of the playback section.

The arrow Sync_PlayItem_Id plays a role in specifying which PlayItem is synchronized with the SubPlayItem. The sync_start_PTS_of_PlayItem plays a role in determining a time point of the SubPlayItem_In_time on the PlayItem time axis.

Thus concludes the description of the SubPath information.

<STN_Table>

A STN_Table is a feature of the PlayList information in the BD-ROM and local storage 200. The following describes PlayLIst information in the local storage 200.

The STN_table shows, out of multiple elementary streams multiplexed into the AVClip specified by the Clip_Information_file_name of the PlayItem information and OUT_of_MUX streams specified by the Clip_Information_file_name of the SubPlayItem information, ones permitted for playback. To be more specific, in the STN_table, Stream_entries of multiple In_MUX streams multiplexed into the MainClip and Out_of_MUX streams multiplexed into the SubClips are individually associated with Stream_attributes.

Figure 19:
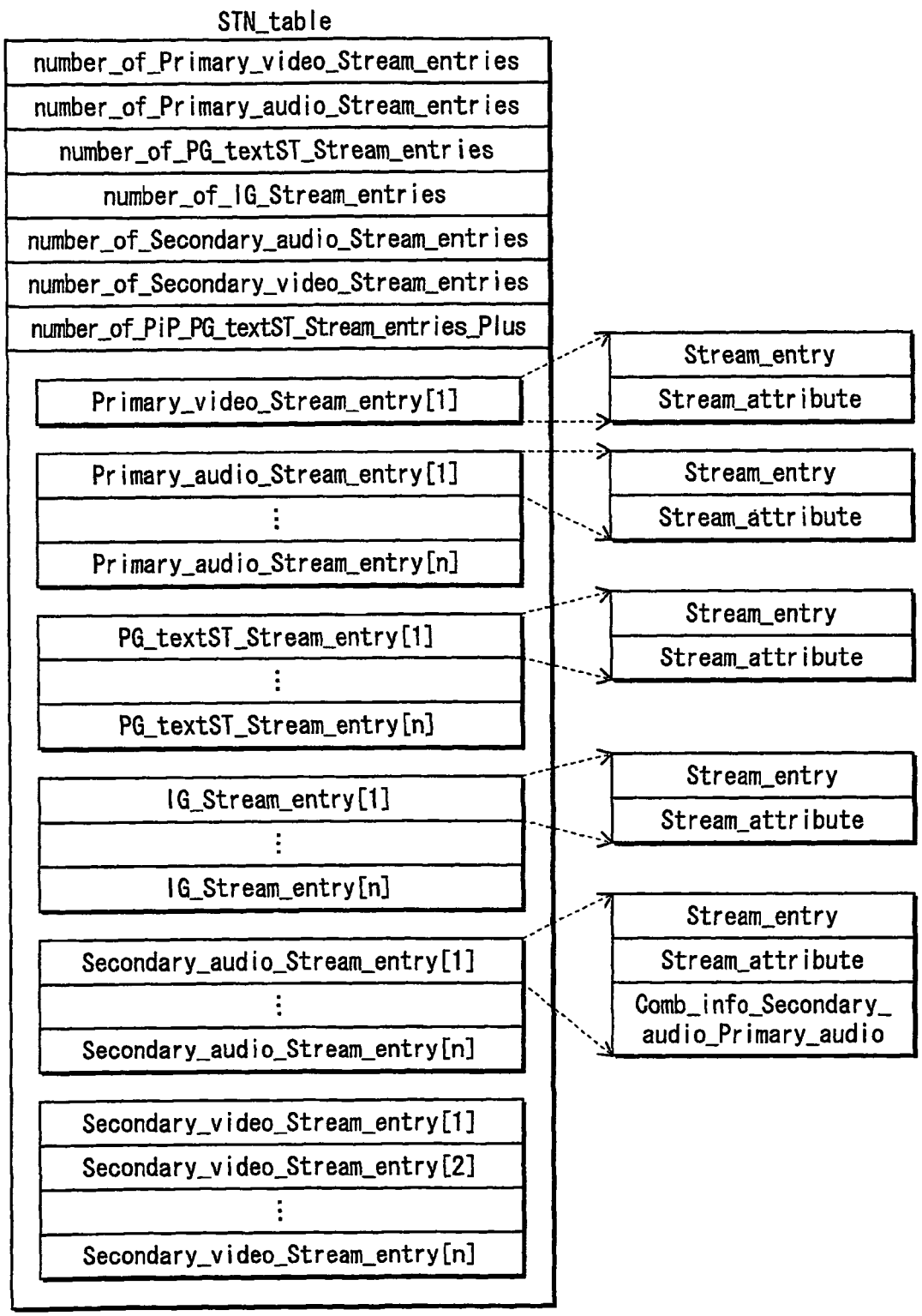
FIG. 19 shows an internal structure of a STN_table.
Figure 20:
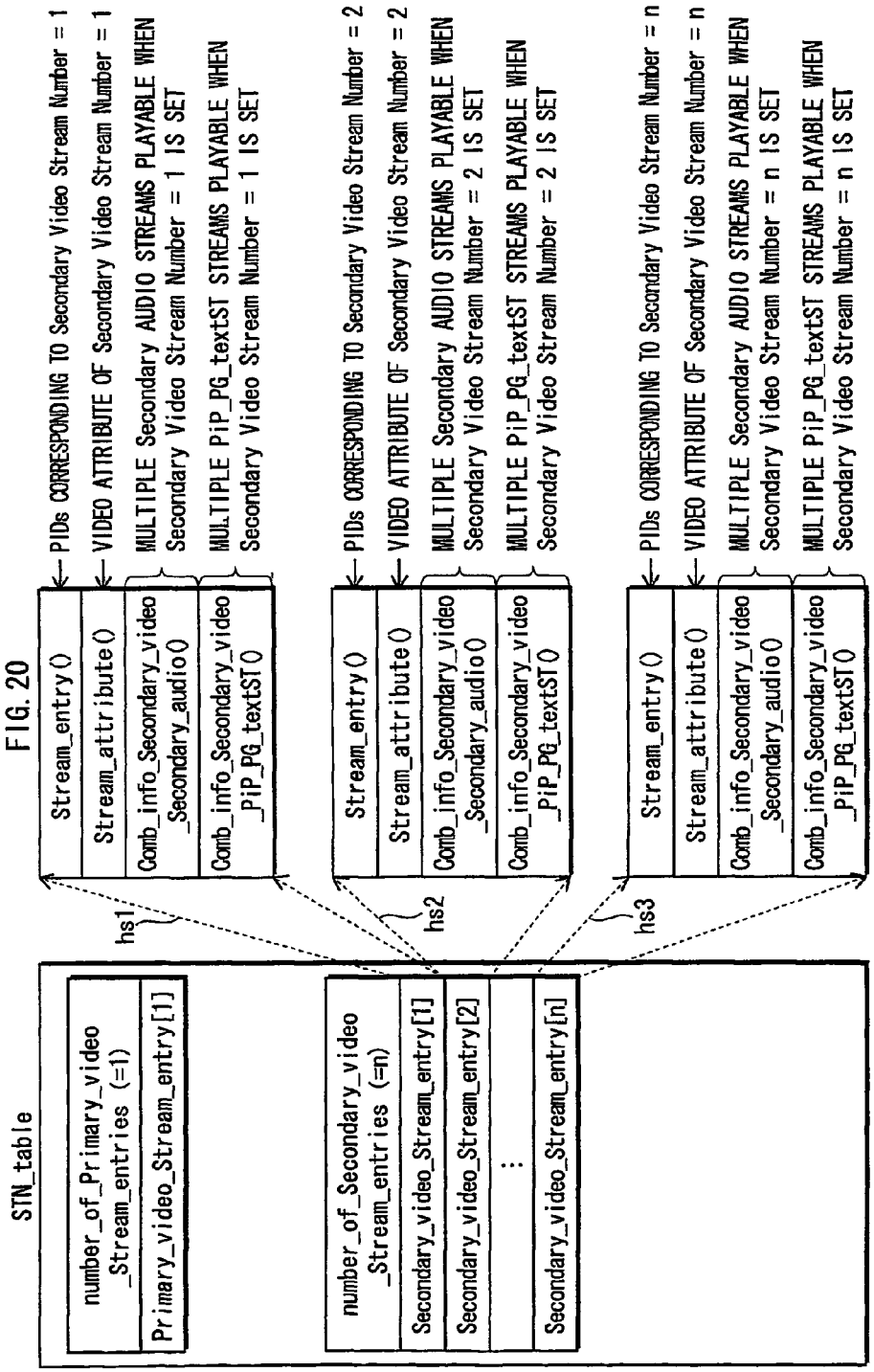
FIG. 20 shows, within the overall structure of the STN_table shown in FIG. 19, stream_entries for secondary video streams.

FIG. 19 shows an overall structure of a STN_table. FIG. 20 shows, within the overall structure of the STN_table shown in FIG. 19, stream_entries for secondary video streams. As shown in the figure, the STN_table are composed of n pieces of Secondary_video_stream_entries (Secondary_video_stream_entry[1] to Secondary_video_stream_entry[n]) and the count of the secondary video streams (number_of_Secondary_video_stream_entries (=n).

The lead line hs1 indicates a close-up of the internal structure of the Secondary_video_stream_entry[1]. That is, the Secondary_video_stream_entry[1] to Secondary_video_stream_entry[n] are multiple instances generated from the same class structure, and each has the same internal structure as indicated by the lead line hs1. A number in the square parentheses [ ] of each Secondary_video_stream_entry indicates an order of the Secondary_video_stream_entry in the STN_table.

As shown by the lead line hs1, the Secondary_video_stream_entry[1] is composed of: "Stream_entry" presenting PIDs corresponding to the Secondary Video Stream Number=1 to the playback apparatus; "Stream_attribute" indicating a video attribute corresponding to the Secondary Video Stream Number=1; "Comb_info_Secondary_Video_Secondary_Audio" indicating secondary audio streams which become playable when "1" is set in the Secondary Video Stream Number; and "Comb_info_Secondary_Video_PiP_PG_textST( )" indicating PG streams or textST streams which become playable when "1" is set in the Secondary Video Stream Number.

As shown by the lead line hs2, the Secondary_video_stream_entry[2] is composed of: "Stream_entry" presenting PIDs corresponding to the Secondary Video Stream Number=2 to the playback apparatus; "Stream_attribute" indicating a video attribute corresponding to the Secondary Video Stream Number=2; "Comb_info_Secondary_Video_Secondary_Audio" indicating secondary audio streams which become playable when "2" is set in the Secondary Video Stream Number; and "Comb_info_Secondary_Video_PiP_PG_textST( )" indicating PG streams or textST streams which become playable when "2" is set in the Secondary Video Stream Number.

The same goes for the lead line hs3. Thus, the secondary_video_stream_entry[x], which is located in the x-th place in the STN_table indicates to the playback apparatus the following information: PIDs of a secondary video stream corresponding to "x" when "x" is set for the number of the secondary video stream; the video attribute of the secondary video stream; and available combinations with secondary audio streams and PGTextST streams.

Figure 21:
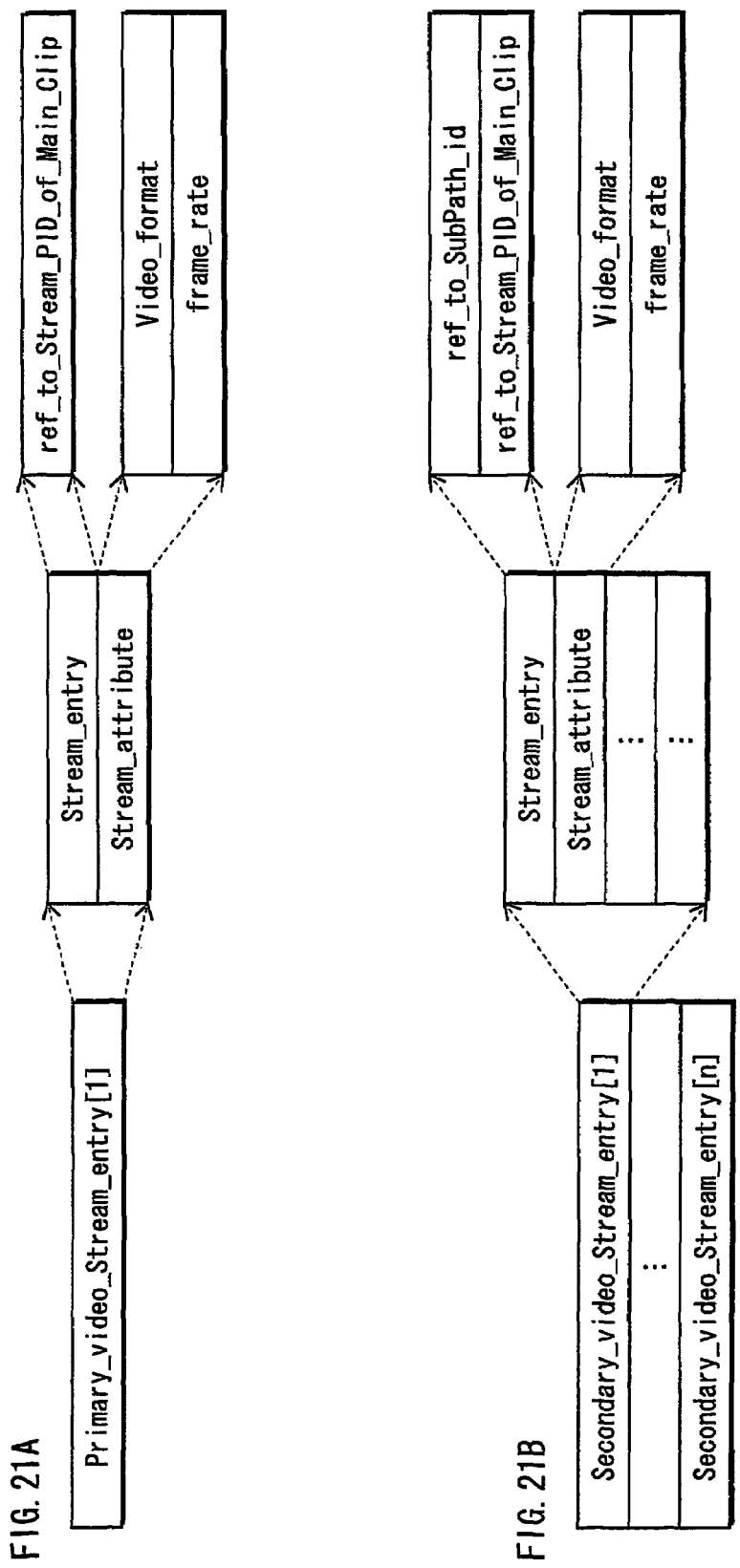
FIG. 21A shows "Stream_entry" and "Stream_attribute" of the primary video stream.
FIG. 21B shows "Stream_entry" and "Stream_attribute" of the secondary video stream.

FIG. 21A shows "Stream_entry" and "Stream_attribute" of the primary video stream. The Stream_entry includes "ref_to_stream_PID_of_mainClip" indicating a packet identifier of PES packets constituting the primary video stream.

The Stream_attribute includes "Video_format" indicating a display format of the video stream and "frame_rate" indicating a display frequency of the video stream.

FIG. 21B shows "Stream_entry" of a secondary video stream. As shown in the figure, the Stream_entry of the Secondary video stream includes "ref_to_Sub_Path_id" indicating SubPath information that refers to the Secondary video stream and "ref_to_stream_PID_of_mainClip" indicating a packet identifier of PES packets constituting the Secondary video stream.

Thus concludes the description of the recording medium of the present invention. Besides these components, the BD-ROM also includes Movie Object, BD-J Object and Index.bdmv, for example.

Movie Object instructs a dynamic control procedure to the playback apparatus with a similar description used in a DVD-Video while BD-J Object instructs a dynamic control procedure to the playback apparatus with a description in a Java™ application. Index.bdmv is a table that indicates the Movie Object or the BD-J Object that constitutes a title.

These components are not the focus of the present invention, and their descriptions are therefore omitted here in the present embodiment. Thus concludes the description of the recording medium of the present invention.

<Playback Apparatus>

Figure 22:
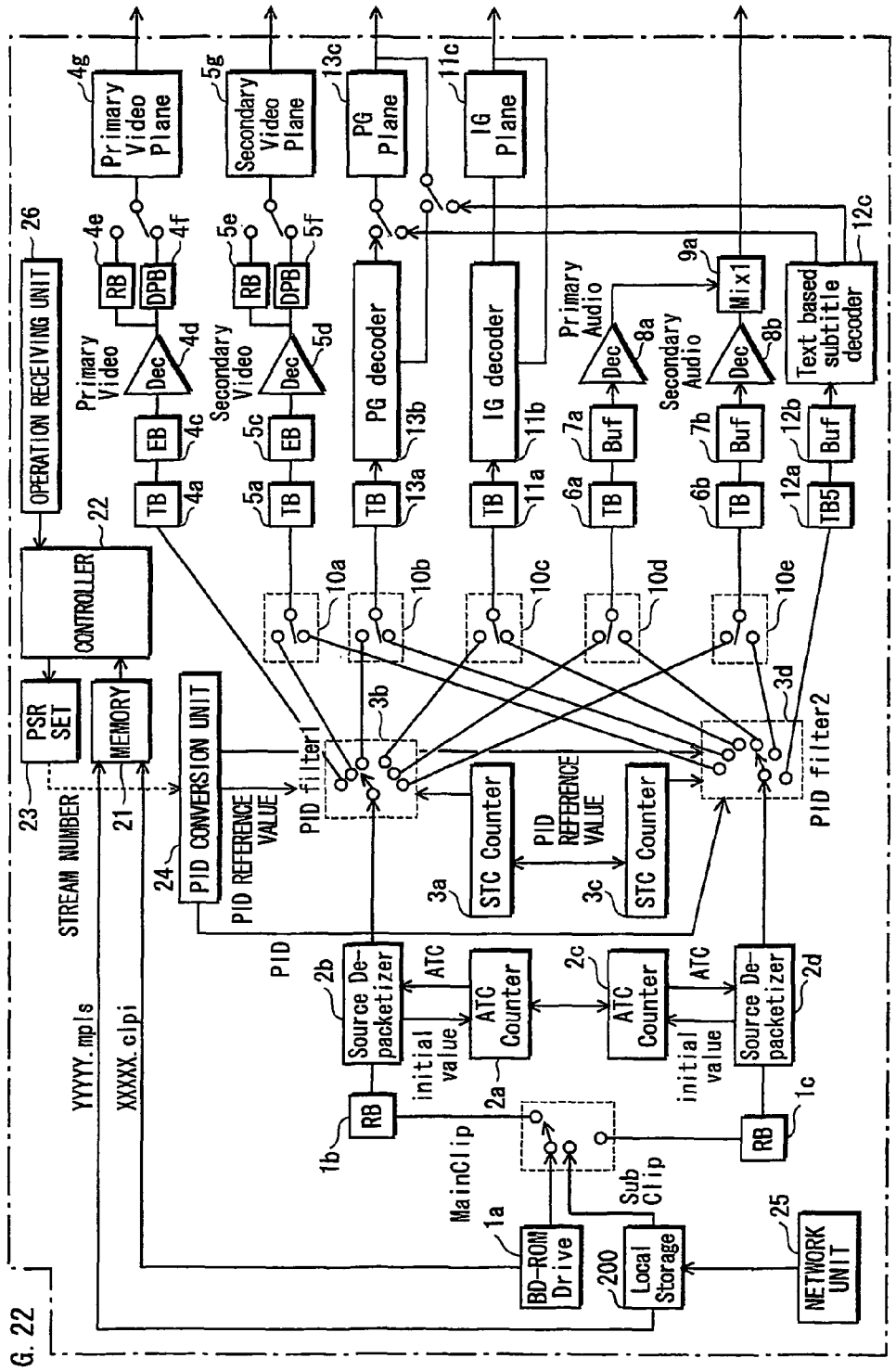
FIG. 22 shows an internal structure of a playback apparatus of the present invention.

FIG. 22 shows an internal structure of the playback apparatus of the present invention. The playback apparatus of the present invention is commercially manufactured based on the internal structure shown in the figure. The playback device is mainly composed of two parts—a system LSI and a drive device, and can be produced commercially by mounting these parts on the cabinet and substrate of the device. The playback apparatus manufactures in this way comprises: a BD-ROM drive 1a; read buffers 1b and 1c; an ATC counters 2a and 2c; source depacketizers 2b and 2d; ATC counters 2b and 2d; STC counters 3a and 3c; PID filters 3b and 3d; a transport buffer (TB) 4a; an elementary buffer (EB) 4c; a video decoder 4d; a re-order buffer 4e; a decoded picture buffer 4f; a video plane 4g; a transport buffer (TB) 5a; an elementary buffer (EB) 5c; a video decoder 5d; a re-order buffer 5e; a decoded picture buffer 5f; a video plane 5g; buffers 6a and 6b; buffers 7a and 7b; audio decoders 8a and 8b; a mixer 9a; switches 10a, 10b, 10c, 10d and 10e; a transport buffer (TB) 11a; an interactive graphics decoder 11b; an interactive graphics plane 11c; a transport buffer (TB) 12a; a buffer 12b; a text based subtitle decoder 12c; a transport buffer (TB) 13a; a presentation graphics decoder 13b; a presentation graphics plane 13c; a memory 21; a controller 22; a PSR set 23; a PID conversion unit 24; a network unit 25; an operation receiving unit 26; and the local storage 200. Note that an output stage of the playback apparatus is not shown in the figure. The output stage is described hereinafter with the aid of another figure showing the internal structure.

The BD-ROM drive 1a loads/ejects a BD-ROM, and executes access to the BD-ROM.

The read buffer (RB) 1b accumulates Source packet sequences read from the BD-ROM.

The read buffer (RB) 1c accumulates Source packet sequences read from the local storage 200.

The ATC counter 2a is reset by using an ATS of the Source packet located at the beginning of the playback section within Source packets constituting the MainClip, and subsequently outputs ATCs to the source depacketizer 2b.

The source depacketizer 2b takes out TS packets from source packets constituting the MainClip and sends out the TS packets. At the sending, the source depacketizer 2b adjusts the time of an input to the decoder according to an ATS of each TS packet. To be more specific, at the moment when the value of the ATC generated by the ATC counter 2a becomes the same as the ATS value of a Source packet, the source depacketizer 2b transfers only the TS packet to the PID filter 3b at TS_Recording_Rate.

The ATC counter 2C is reset by using an ATS of the Source packet located at the beginning of the playback section within Source packets constituting the SubClip, and subsequently outputs ATCs to the source depacketizer 2d.

The source depacketizer 2d takes out TS packets from source packets constituting the SubClip and sends out the TS packets. At the sending, the source depacketizer 2d adjusts the time of an input to the decoder according to an ATS of each TS packet. To be more specific, at the moment when the value of the ATC generated by the ATC counter 2c becomes the same as the ATS value of a Source packet, the source depacketizer 2d transfers only the TS packet to the PID filter 3d at TS_Recording_Rate.

The STC counter 3a is reset by a PCR of the MainClip and outputs a STC.

The PID filter 3b is, a demultiplexing unit for the MainClip and outputs, among Source packets output from the source depacketizer 2b, ones having PID reference values informed by the PID conversion unit 24 to the video decoders 4d and 5d, the audio decoder 8a, the interactive graphics decoder 11b and the presentation graphics decoder 13b. Each of the decoders receives elementary streams passed through the PID filter 3b and performs from decoding processing to playback processing according to the PCR of the MainClip. Thus, the elementary streams input to each decoder after being passed through the PID filter 3b are subjected to decoding and playback based on the PCR of the MainClip.

The STC counter 3c is reset by a PCR of the SubClip and outputs a STC. The PID filter 3d performs demultiplexing with reference to this STC.

The PID filter 3d is a demultiplexing unit for the SubClip and outputs, among Source packets output from the source depacketizer 2d, ones having PID reference values informed by the PID conversion unit 24 to the audio decoder 8b, the interactive graphics decoder 11b and the presentation graphics decoder 13b. Thus, the elementary streams input to each decoder after being passed through the PID filter 3d are subjected to decoding and playback based on the PCR of the SubClip.

The transport buffer (TB) 4a is a buffer in which TS packets belonging to the primary video stream are temporarily accumulated when they are output from the PID filter 3b.

The elementary buffer (EB) 4c is a buffer in which pictures in the encoded state (I pictures, B pictures and P pictures) are stored.

The decoder (Dec) 4d obtains multiple frame images by decoding individual pictures constituting the primary video at every predetermined decoding time period (DTS) and writes the frame images to the video plane 4.

The decoded picture buffer 4e is a buffer for storing noncompressed pictures obtained from the decoding process of the decoder 4d.

The re-order buffer 4f is a buffer for changing the order of decoded pictures from the decoded order to the order for display.

The primary video plane 4g is a memory area for storing pixel data for one picture of the primary video. The pixel data is represented by a 16-bit YUV value, and the video plane 4g stores therein pixel data for a resolution of 1920×1080.

The transport buffer (TB) 5a is a buffer in which TS packets belonging to a secondary video stream are temporarily accumulated when they are output from the PID filter 3b.

The elementary buffer (EB) 5c is a buffer in which pictures in the encoded state (I pictures, B pictures and P pictures) are stored.

The decoder (Dec) 5d obtains multiple frame images by decoding individual pictures constituting the secondary video at every predetermined decoding time period (DTS) and writes the frame images to the video plane 5.

The decoded picture buffer 5e is a buffer for storing noncompressed pictures obtained from the decoding process of the decoder 5d.

The re-order buffer 5f is a buffer for changing the order of decoded pictures from the decoded order to the order for display.

The secondary video plane 5g is a memory area for storing pixel data for one picture of the secondary video. The pixel data is represented by a 16-bit YUV value, and the video plane 5g stores therein pixel data for a resolution of 1920×1080.

The buffer 6a stores, from among TS packets output from the demultiplexer 3a, ones constituting a primary audio stream in a first-in first-out manner and provides the TS packets to the audio decoder 7a.

The buffer 6b stores, from among TS packets output from the demultiplexer 3b, ones constituting a secondary audio stream in a first-in first-out manner and provides the TS packets to the audio decoder 7b.

The audio decoder 7a converts TS-packets stored in the buffer 6a into PES packets, decodes the PES packets to obtain noncompressed audio data in the LPCM state, and outputs the obtained audio data. This achieves a digital output of the primary audio stream.

The audio decoder 7b converts TS packets stored in the buffer 6b into PES packets, decodes the PES packets to obtain noncompressed audio data in the LPCM state, and outputs the obtained audio data. This achieves a digital output of the secondary audio stream.

The mixer 9a performs a mixing of the digital audio in the LPCM state output from the audio decoder 7a with the digital audio in the LPCM state output from the audio decoder 7b.

The switch 10a selectively provides TS packets read from the BD-ROM or TS packets read from the local storage 200 to the secondary video decoder 5d.

The switch 10b selectively provides TS packets read from the BD-ROM or TS packets read from the local storage 200 to the presentation graphics decoder 13b.

The switch 10c selectively provides TS packets read from the BD-ROM or TS packets read from the local storage 200 to the interactive graphics decoder 11b.

The switch 10d is a switch between supplying or not supplying, to the audio decoder 8a, either of TS packets of a primary audio stream demultiplexed by the demultiplexer 3a and TS packets of a primary audio stream demultiplexed by the demultiplexer 3b.

The switch 10e is a switch between supplying or not supplying, to the audio decoder 8b, either of TS packets of a secondary audio stream demultiplexed by the demultiplexer 3a and TS packets of a secondary audio stream demultiplexed by the demultiplexer 3b.

The transport buffer (TB) 11a is a buffer in which TS packets belonging to an IG stream are temporarily accumulated.

The interactive graphics (IG) decoder 11b decodes an IG stream read from the BD-ROM 100 or the local storage 200 and writes the noncompressed graphics to the IG plane 12.

The interactive graphics (IG) plane 11c is a plane in which pixel data constituting noncompressed graphics obtained by the decoding by the IG decoder 11b.

The transport buffer (TB) 12a is a buffer in which TS packets belonging to a textST stream are temporarily accumulated.

The buffer (TB) 12b is a buffer in which PES packets constituting a textST stream are temporarily accumulated.

As to a textST stream read from the BD-ROM 100 or the local storage 200, the text based subtitle decoder 12C converts the presented subtitle into bitmap using character codes and writes the bitmap into the PG plane 13c. Since font data stored in the BD-ROM 100 or the local-storage 200 is used for the conversion, decoding a textST stream requires reading such font data in advance.

The transport buffer (TB) 13a is a buffer in which TS packets belonging to a PG stream are temporarily accumulated.

The presentation graphics (PG) decoder 13b decodes a PG stream read from the BD-ROM 100 or the local storage 200 and writes the noncompressed graphics to the presentation graphics plane 14. A subtitle appears on the screen by decoding of the PG decoder 13b.

The presentation graphics (PG) plane 13c is a memory having an area of one screen, and stores therein one screen of non-compressed graphics.

The memory 21 is a memory for storing therein current PlayList information and current Clip information. The current PlayList information is PlayList information that is currently processed, among a plurality of pieces of PlayList information stored in the BD-ROM. The current Clip information is Clip information that is currently processed, among a plurality of pieces of Clip information stored in the BD-ROM/local storage.

The controller 22 achieves a playback control of the BD-ROM by performing PlayList playback (i.e. playback control in accordance with the current PlayList information).

The PSR set 23 is a register built in the playback apparatus, and is composed of 64 pieces of Player Setting/Status Registers (PSR) and 4096 pieces of General Purpose Registers (GPR). Among the values (PSR) set in the Player Setting/Status Registers, PSR4 to PSR8 are used to represent the current playback point.

The PID conversion unit 24 converts stream numbers stored in the PSR set 23 into PID reference values based on the STN_table, and notifies the PID reference values of the conversion results to the PID filters 3b and 3d.

The network unit 25 achieves a communication function of the playback apparatus. When a URL is specified, the communication unit establishes a TCP connection or an FTP connection with a web site of the specified URL. The establishment of such a connection allows for downloading from web sites.

The operation receiving unit 26 receives specification of an operation made by a user on the remote controller, and notifies User Operation information, which indicates the operation specified by the user, to the controller 22. With the User Operation information, a number of a stream (number x) which the user desires to select is specified.

Figure 23:
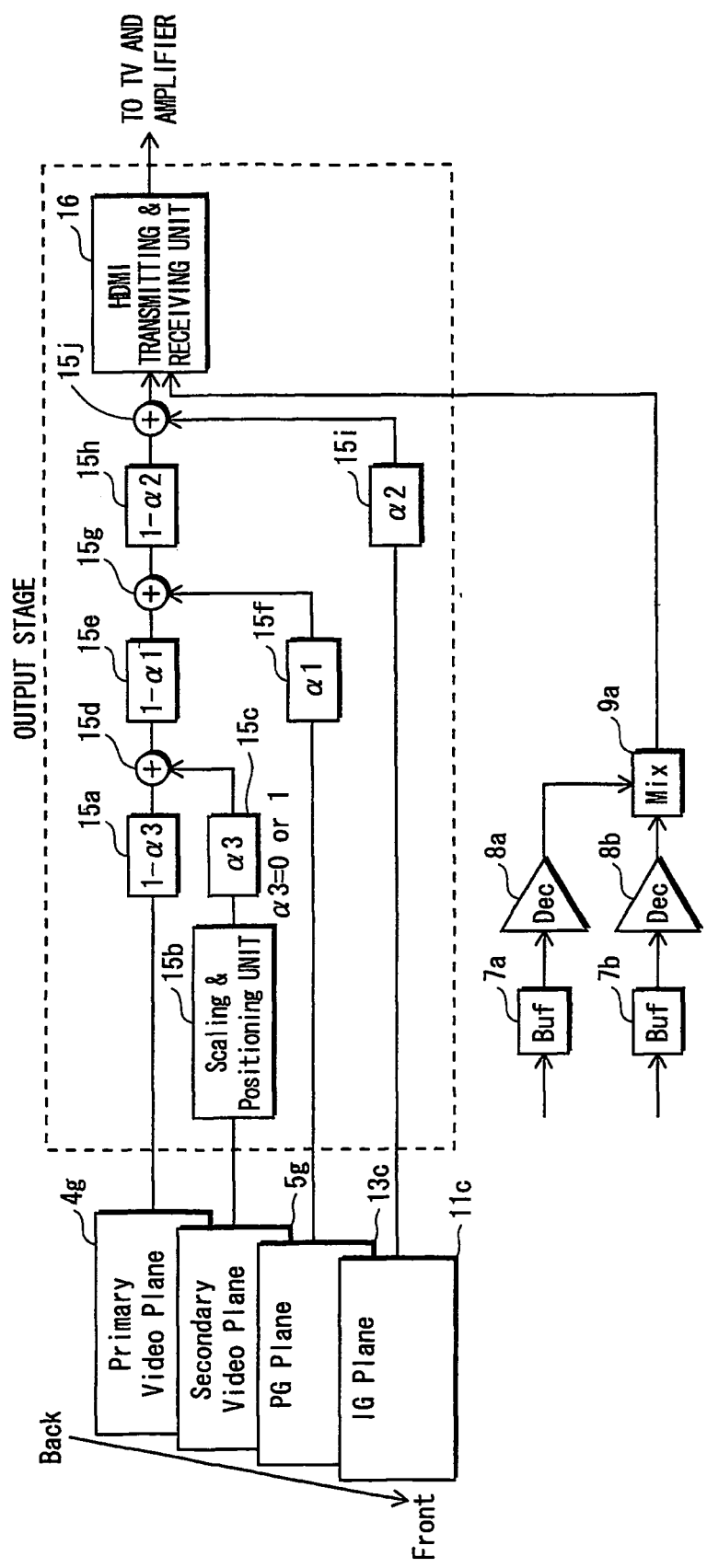
FIG. 23 shows a structure of an output stage of the playback apparatus.

Thus concludes the description of the internal structure of the playback apparatus. Next is described the internal structure of the output stage of the playback apparatus. FIG. 23 shows a structure of the output stage of the playback apparatus. As shown in the figure, the output stage of the playback apparatus is composed of: a 1-α3 multiplication unit 15a; a scaling and positioning unit 15b; an α3 multiplication unit 15c; an addition unit 15d; a 1-α1 multiplication unit 15e; an α1 multiplication unit 15f; an addition unit 15g; a 1-α2 multiplication unit 15h; an α2 multiplication unit 15i; an addition unit 15j and an HDMI transmitting and receiving unit 16.

The 1-α3 multiplication unit 15a multiplies the luminance of pixels constituting a noncompressed digital picture stored in the video decoder 4g by a transmittance of 1-α3.

The scaling and positioning unit 15b enlarges or minimizes (i.e. scaling) a noncompressed digital picture stored in the video plane 5g, and changes the position (i.e. positioning). The enlargement and minimization are based on PiP_scale of the metadata and the change of the position is based on PiP_horizontal_position and PiP_vertical_position.

The α3 multiplication unit 15c multiplies, by a transmittance of α3, the luminance of pixels constituting the noncompressed picture on which scaling and positioning have been performed by the scaling and positioning unit 15b.

The multiplication unit 15d combines the noncompressed digital picture created by the α3 multiplication unit 15c multiplying the luminance of each pixel by a transmittance of α3 and the noncompressed digital picture, created by the 1-α3 multiplication unit 15a multiplying the luminance of each pixel by a transmittance of 1-α3, to thereby obtain a composite picture.

The 1-α1 multiplication unit 15e multiplies, by a transmittance of 1-α1, the luminance of pixels constituting the composite digital picture created by the multiplication unit 15d.

The α1 multiplication unit 15f multiplies, by a transmittance of α1, the luminance of pixels constituting a compressed graphic stored in the presentation graphics decoder 13c.

The multiplication unit 15g combines the noncompressed digital picture created by the 1-α1 multiplication unit 15e multiplying the luminance of each pixel by a transmittance of 1-α1 and the noncompressed graphic created by the α1 multiplication unit 15f multiplying the luminance of each pixel by a transmittance of α1, to thereby obtain a composite picture.

The 1-α2 multiplication unit 15h multiplies, by a transmittance of 1-α2, the luminance of pixels constituting the digital picture created by the multiplication unit 15g.

The α2 multiplication unit 15i multiplies, by a transmittance of α2, the luminance of pixels constituting a noncompressed graphic stored in the interactive graphics decoder 1c.

The multiplication unit 15j combines the noncompressed digital picture created by the 1-α2 multiplication unit 15h multiplying the luminance of each pixel by a transmittance of 1-α2 and the noncompressed graphic created by the α2 multiplication unit 15i multiplying the luminance of each pixel by a transmittance of α2, to thereby obtain a composite picture.

The HDMI transmitting and receiving unit 16 receives, from another apparatus connected via an HDMI (High Definition Multimedia Interface), information regarding the apparatus, and transmits, to the apparatus connected via the HDMI, digital noncompressed video obtained by the composition of the multiplication unit 15j together with audio data combined by the mixer 9a.

Thus concludes the description of the hardware structure of the playback apparatus of the present embodiment. Next is described the software structure of the playback apparatus of the present embodiment.

Figure 24:
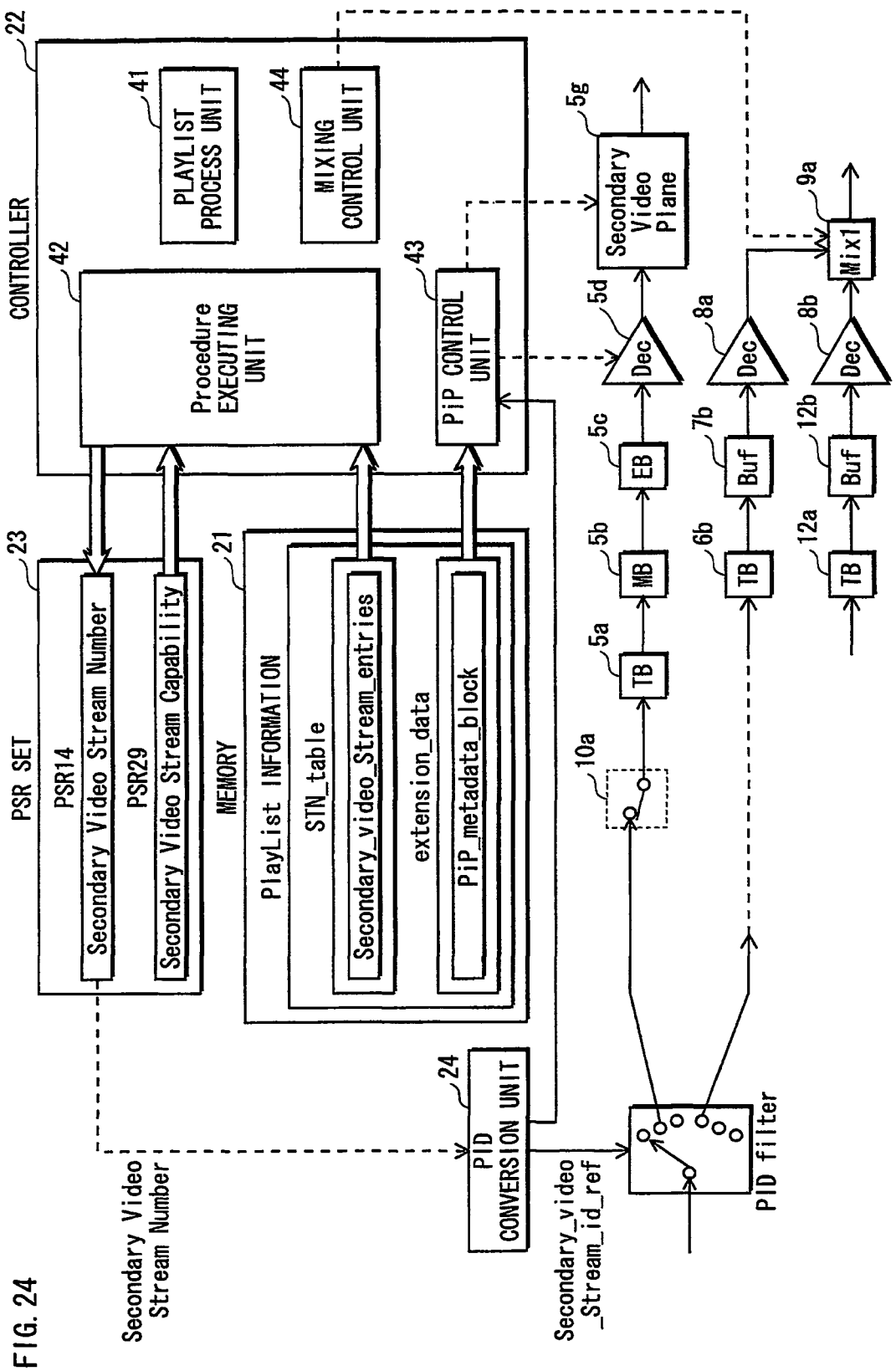
FIG. 24 functionally depicts the controller 22.

The controller 22 shown in FIG. 22 is functionally depicted in FIG. 24. FIG. 24 functionally depicts the controller 22, and as shown in the figure, the controller 22 is composed of: a play list process unit 41; a procedure execution unit 42; PiP control unit 43 and a mixing control unit 44.

These components perform the processes based on the PSR set 23. The following explains PSR1, PSR14, and PSR31. The word length of a PSR is 32 bits. The bit locations of respective bit data constituting one word of the PSR (32 bits) are referred to as b0 to b31. Here, the most significant bit of the PSR is called b31 while the least significant bit is called b0.

<PSR14>

FIG. 25A shows bit assignment in PSR14.

As shown in the figure, b8 to b15 among 32 bits of PSR14 represents a stream number of a secondary video stream, and identifies one of a plurality of secondary video streams whose entries are written in the STN_table of the current Play Item. When the value set in PSR14 changes, the playback apparatus plays a secondary video stream corresponding to the set value after the change. The stream number of the secondary video stream of PSR14 is set to the initial value, "0xFF", and then may be set to a value ranging from "1" to "32" by the playback apparatus. The value "00xFF" is an unspecified value and indicates that there is no secondary video stream or that a secondary video stream has not been selected. When PSR14 is set to a value ranging from "1" to "32", the set value is interpreted as a stream number of a secondary video stream.

The b31 of PSR14 is disp_v_flag, and indicates whether or not the playback apparatus is capable of playing a secondary video (1b: Presentation of Secondary Video is enabled; 0b: Presentation of Secondary Video is disabled). Here, HDTV means a video with a resolution of 1920×1080, or a video with a resolution of 1280×720, and the bit of b31 shows whether the playback apparatus is capable of decoding the video and outputting the decoded video.

<PSR29>

FIG. 25B shows bit assignment in PSR29.

The b0 of PSR29 is HD_Secondary_video_Capability, and indicates whether the playback apparatus is capable of playing a 50 & 25 Hz video, i.e. a PAL-format video stream in 50 frame/sec mode or a PAL-format video stream in 25 frame/sec mode (1b: HD Secondary Video is capable) or whether the playback apparatus is capable of playing a HDTV secondary video (0b: HD Secondary Video is incapable).

The b1 of PSR29 is 50 & 25 Hz_video_Capability, and indicates whether or not the playback apparatus is capable of playing a 50 & 25 Hz video, i.e. a PAL-format video stream (1b: 50 & 25 Hz Video is capable; 0b: 50 & 25 Hz Video is incapable).

Thus concludes the description of the PSR set 23.

From now on, the PlayList processing unit 41, the Procedure executing unit 42, and the Procedure executing unit 43 will be described.

Since the PiP control unit 43 has various processing, the description is given in Embodiment 2. The mixing control unit 44 has little connection with the main focus of the present embodiment, and the explanation is therefore given in Embodiment 4.

<Details of Functional Structure 1: PlayList Processing Unit>

The PlayList processing unit 41 achieves the PL playback. The PlayList processing unit 41 plays a portion of the primary video stream that corresponds to a section from In_time to Out_time of the PlayItem information. In synchronization with this, the PlayList processing unit 41 causes the video decoder 5b to play a portion of a secondary video stream that corresponds to a section from Sub_PlayItem_In_time to Sub_PlayItem_Out_time of the SubPlayItem information.

<Details of Functional Structure 2: Procedure Executing Unit 42>

When necessity for changing a piece of PlayItem information to another arises, or when the user performed to change the stream number, the procedure executing unit 42 executes a predetermined stream selection procedure, and writes a stream number of a new secondary video stream into PSR14. The playback apparatus plays a secondary video stream according to the stream number written in PSR14. The setting of PSR14 thus enables a secondary video stream to be selected.

The reason why the stream selection procedure is executed when the PlayItem information is changed is as follows. Since the STN_Table is provided with respect to each piece of PlayItem information, it may happen that a secondary video stream, which is playable according to a piece of PlayItem information, cannot be played according to another piece of PlayItem information.

Figure 26:
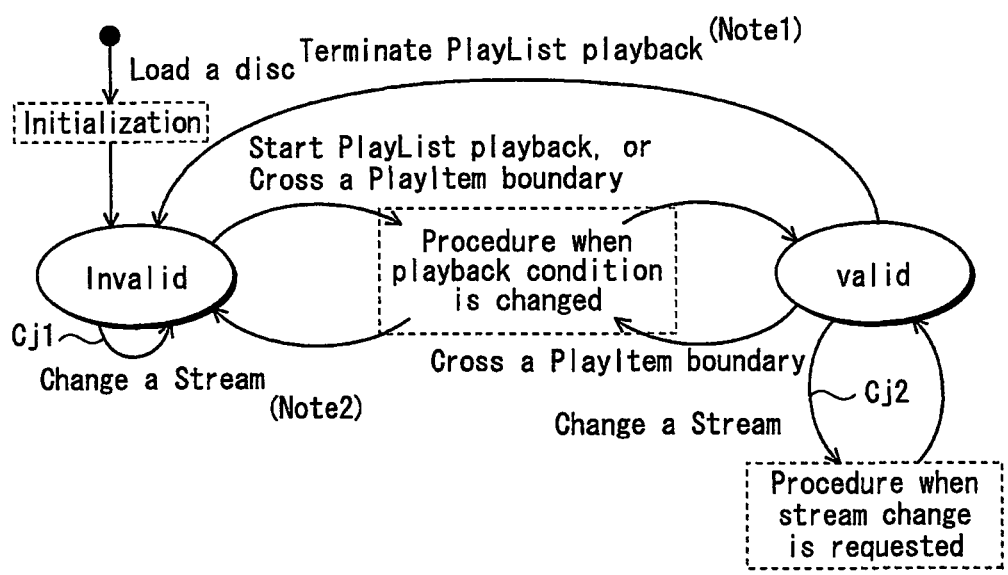
FIG. 26 shows status transition of the secondary video stream numbers in the PSR14.

The procedure executing unit 42 brings PSR1 to change in status as shown in FIG. 26. FIG. 26 shows the status transition of the secondary video stream numbers in the PSR14. In the figure, the term "valid" means that the value of the PSR14 is equal to or less than the number of entries written in the STN_table of the Play Item, and is decodable.

The term "Invalid" means that (a) the secondary video stream number of the PSR14 is "0", (b) the secondary video stream number of the PSR14 is more than the number of entries written in the STN_table of the Play Item, or (c) decoding is not available even if the number of entries written in the STN_table of the Play Item is in the range from "1" to "32".

The frames drawn with dotted lines in FIG. 26 schematically indicate procedures for determining the value of PSR when the status changes. The procedures for setting a secondary video stream number to the PSR14 include "Procedure when playback condition is changed" and "Procedure when Stream change is requested".

The "Procedure when playback condition is changed" is a procedure to be executed when the status of the playback apparatus has changed due to some event that took place in the playback apparatus.

The "Procedure when Stream change is requested" is a procedure to be executed when the user requests to change a stream.

The "Procedure when playback condition is changed" and "Procedure when Stream change is requested" are stream selection procedures and are described hereinafter in detail with reference to flowcharts.

The arrows in FIG. 26 symbolically indicate the status transition of the secondary video stream number set in PSR14.

The notes attached to the arrows indicate events that trigger each status transition. That is to say, FIG. 26 indicates that a status transition of the secondary video stream number in PSR14 takes place if an event such as "Load Disk", "Change a Stream", "Start PlayList playback", "Cross a PlayItem boundary", or "Terminate PlayList playback" occurs. By referring to FIG. 26, it can be seen that the above-mentioned procedures are not performed when a status transition of "Invalid→Invalid" or "Valid→Invalid" occurs. On the other hand, status transitions of "Invalid→Valid" and "Valid→Valid" go through the dotted-line frames. That is to say, the above-mentioned "Procedure when playback condition is changed" or "Procedure when Stream change is requested" is performed when the secondary video stream number in PSR14 is set to be "Valid".

The following describes the events that trigger the status transition.

The event "Load Disk" indicates that the BD-ROM has been loaded in the playback apparatus. In such loading, the secondary video stream number in PSR14 is once set to an unspecified value (0xFF).

The event "Start PlayList playback" indicates that a playback process based on PlayList has been started. When such an event occurs, the "Procedure when playback condition is changed" is executed, and the secondary video stream number in PSR14 is set to be "Valid".

The event "Terminate PlayList playback" indicates that a playback process based on PlayList has been terminated. It is understood that when such an event occurs, the "Procedure when playback condition is changed" is not executed, and the secondary video stream number in PSR14 is set to be "Invalid".

The event "Change a Stream" indicates that the user requested to change the stream. If this event occurs when the secondary video stream number in PSR14 is "Invalid" (indicated by "cj1" in FIG. 26), PSR14 is set to a value as requested. Even if the value that is set in this way indicates a valid stream number, the value set in PSR14 is treated as an "Invalid" value. That is, in the status transition triggered by the event "ChangeX a Stream", PSR never changes from Invalid to Valid.

On the other hand, if event "Change a Stream" occurs when the secondary video stream number in PSR14 is "Valid" (indicated by "cj2" in FIG. 26), the "Procedure when Stream change is requested" is executed, and PSR14 is set to a new value. Here, the value set when the "Procedure when Stream change is requested" is executed may not be a value desired by the user. This is because the "Procedure when Stream change is requested" has a function to exclude an invalid value. If the event "Change stream" occurs when PSR14 is "Valid", PSR14 never changes from Valid to Invalid. This is because the "Procedure when Stream change is requested" assures that PSR1 does not become "Invalid".

The event "Cross a PlayItem boundary" indicates that a Play Item boundary has been passed. Here, the Play Item boundary is a boundary between two successive Play Items, namely a position between the end of a preceding Play Item and the start of a succeeding Play Item, between the two successive Play Items. If the event "Cross a PlayItem boundary" occurs when the secondary video stream number in PSR14 is "Valid", the "Procedure when playback condition is changed" is executed. After the execution of the "Procedure when playback condition is changed", the status of PSR14 either returns to "Valid" or transits to "Invalid". Since the STN_table is provided in correspondence with each Play Item, if a Play Item changes, a playable elementary stream also changes. The status transition is aimed to set PSR14 to a most appropriate value for each Play Item by executing the "Procedure when playback condition is changed" each time a Play Item starts to be played.

Figure 27:
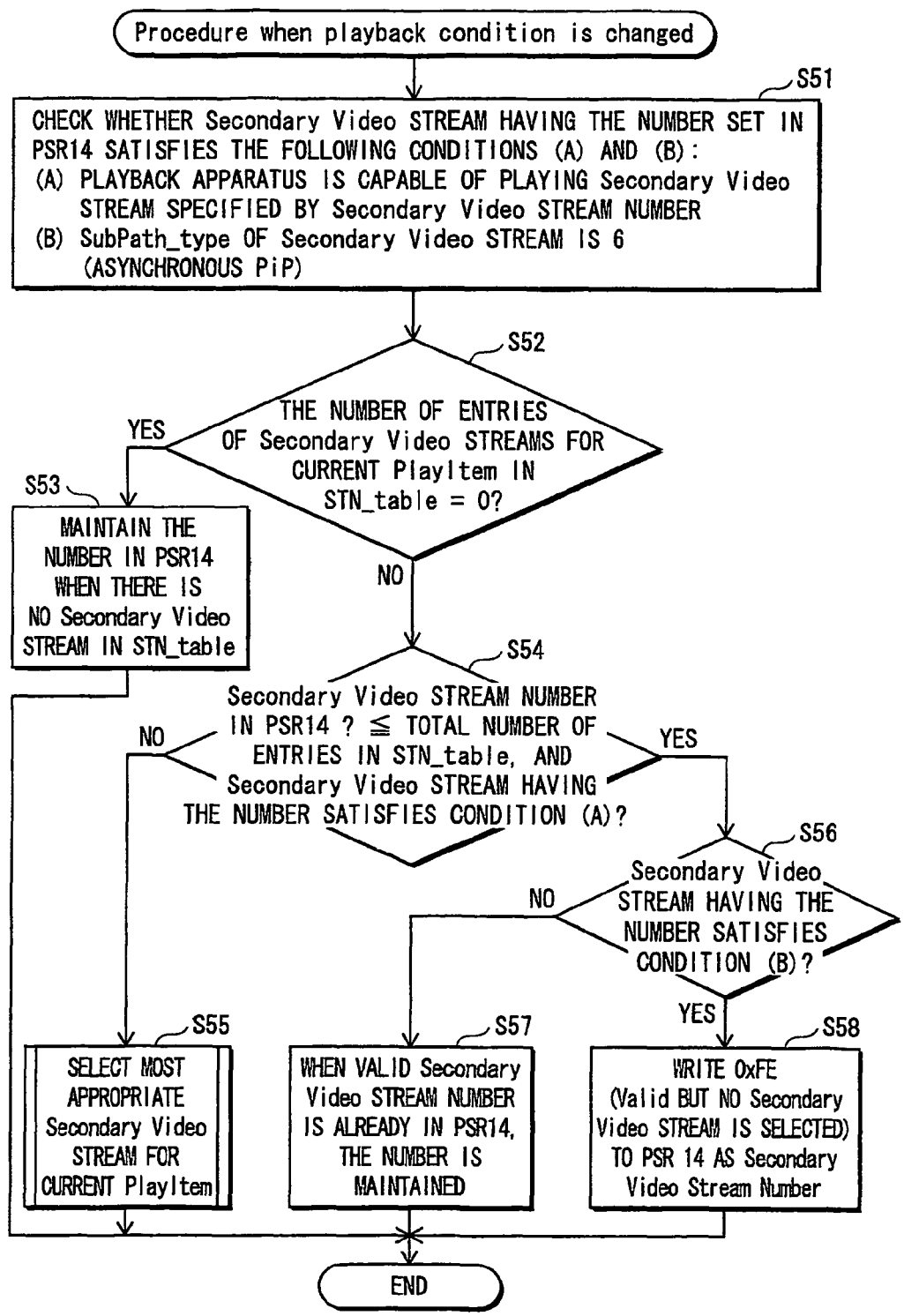
FIG. 27 is a flowchart showing a processing procedure of "Procedure when playback condition is changed" for secondary video streams.

FIG. 27 is a flowchart showing a processing procedure of "Procedure when playback condition is changed" for secondary video streams.

In Step S51, it is checked whether a secondary video stream having the stream number set in PSR14 satisfies the following conditions (A) and (B):

Condition (A): based on a comparison of the video format and frame_rate with the HD Secondary Video Capability or the 50 & 25 Hz Video Capability, the playback apparatus is capable of playing a secondary video stream specified by the number stored in PSR14; and Condition (B): the SubPath_Type of the secondary video stream is "6 (i.e. asynchronous Picture in Picture)".

The "HD Secondary Video Capability" means capability of decoding an HDTV video stream and outputting this for playback while the "50 & 25 Hz Video Capability" means capability of decoding a 50 frame/sec or a 25 frame/sec picture sequence and outputting this for playback. In addition, the video format and frame_rate are written, within the STN_table, in the stream_attribute of the secondary video stream. Whether the HD Secondary Video Capability and the 50 & 25 Hz Video Capability are present is shown in b0 and b1 of PSR 29. Checking these settings in the STN_table against the value of b1 in PSR29 allows for determining whether the condition (A) is satisfied.

After the execution of Step S51, Steps S52 and S53 are executed.

Step S52 is a judgment step for judging whether the number of Stream_entries of the secondary video streams for the current PlayItem in the STN_table is 0. Here, the number of Stream_entries of the secondary video streams in the STN_table being 0 means that there is no playback-permitted secondary video stream. When the number is 0, the secondary video stream number in PSR 14 is maintained (Step S53). This is because, as long as there is no secondary video stream that has been permitted to be played in the current PlayItem, the current value of PSR 14 should be retained.

Step S54 is a judgment step that is executed when the number of Stream_entries of the secondary video streams in the STN_table is judged to be not 0 in Step S53. In Step S54, the following are judged: whether the number x stored in PSR14 is equal to or less than the total number of stream_entries in the STN_table; and whether a secondary video stream having the number x satisfies the condition (A). If YES in Step S54, the most appropriate stream for the current PlayItem is selected by executing a procedure shown in the flowchart of FIG. 28 to be hereinafter described (Step S55).

If NO in Step S54, the judgment step of Step S56 is executed. This judgment step is for judging whether the secondary video stream having the number x satisfies the condition (B). When the condition (B) is satisfied, PSR14 is set to OxFE in Step S58. The value 0xFE indicates that a secondary video stream has not been selected although the secondary video stream number in PSR14 is Valid. If this value is set in PSR14 at the execution of asynchronous Picture in Picture, the "Procedure when stream change is requested" will be executed in response to the user operation. However, if the stream number of PSR14 is Invalid, the "Procedure when stream change is requested" is not executed even when the user operation is performed and the secondary video stream will never be played. In order to avoid this to happen, it is designed to set 0xFE in PSR14 at the execution of asynchronous Picture in Picture.

When a valid secondary video stream number is already set in PSR14 although the condition (B) is not satisfied, the number is maintained (Step S57).

Thus concludes the description of the "Procedure when playback condition is changed" for a secondary video stream.

Figure 28:
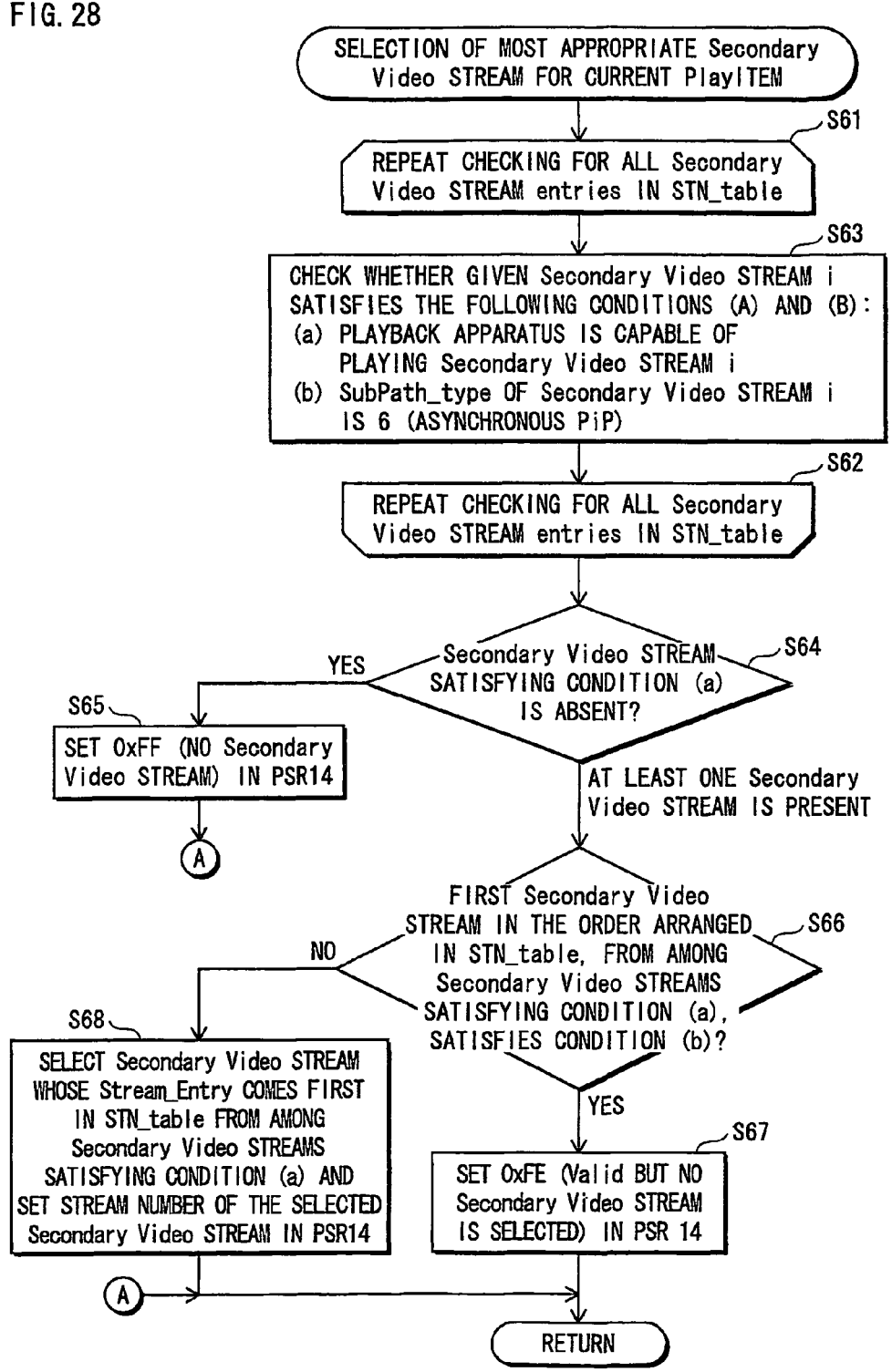
FIG. 28 is a flowchart showing a processing procedure for selecting the most appropriate stream for the current PlayItem.

FIG. 28 is a flowchart showing a processing procedure for selecting the most appropriate stream for the current PlayItem.

In steps S61 to S63, the checking of whether the following conditions (a) and (b) are satisfied is performed on all stream_entries in the STN_table.

Condition (a): based on a comparison of the video format and frame_rate of a secondary video stream with the HD Secondary Video Capability or the 50 & 25 Hz Video Capability, the playback apparatus is capable of playing a secondary video stream specified by the number stored in PSR14; and Condition (b): the SubPath_Type of the secondary video stream is "6 (i.e. asynchronous Picture in Picture)".

When these checks are completed for all playback-permitted secondary video streams in the STN_table, the procedure executing unit 42 executes Step S64.

Step S64 is a judgment step for judging whether a secondary video stream satisfying the condition (a) is absent. If YES in Step S64, 0xFFF is set in the PSR14 as the stream number of a secondary video stream (Step S65).

If at least one secondary video stream satisfying the condition (a) is present, Step S64 is YES and Step S66 is executed. In Step S66, a judgment is made on whether, among the secondary video streams satisfying the condition (a), the first secondary video stream in the order arranged in the STN_table satisfies the condition (b). If it satisfies the condition (b), 0xFFF is set in PSR as the stream number of a secondary video stream in Step S67.

If the condition (b) is not satisfied, a secondary video stream whose Stream_Entry comes first in the STN_table is selected from among the secondary video streams satisfying the condition (a), and the stream number of the selected secondary video stream is set in PSR14 (Step S68). Through the procedure, the most appropriate secondary video stream for the current PlayItem is thus stored in PSR14. Thus concludes the selection procedure for selecting the most appropriate stream number.

Figure 29:
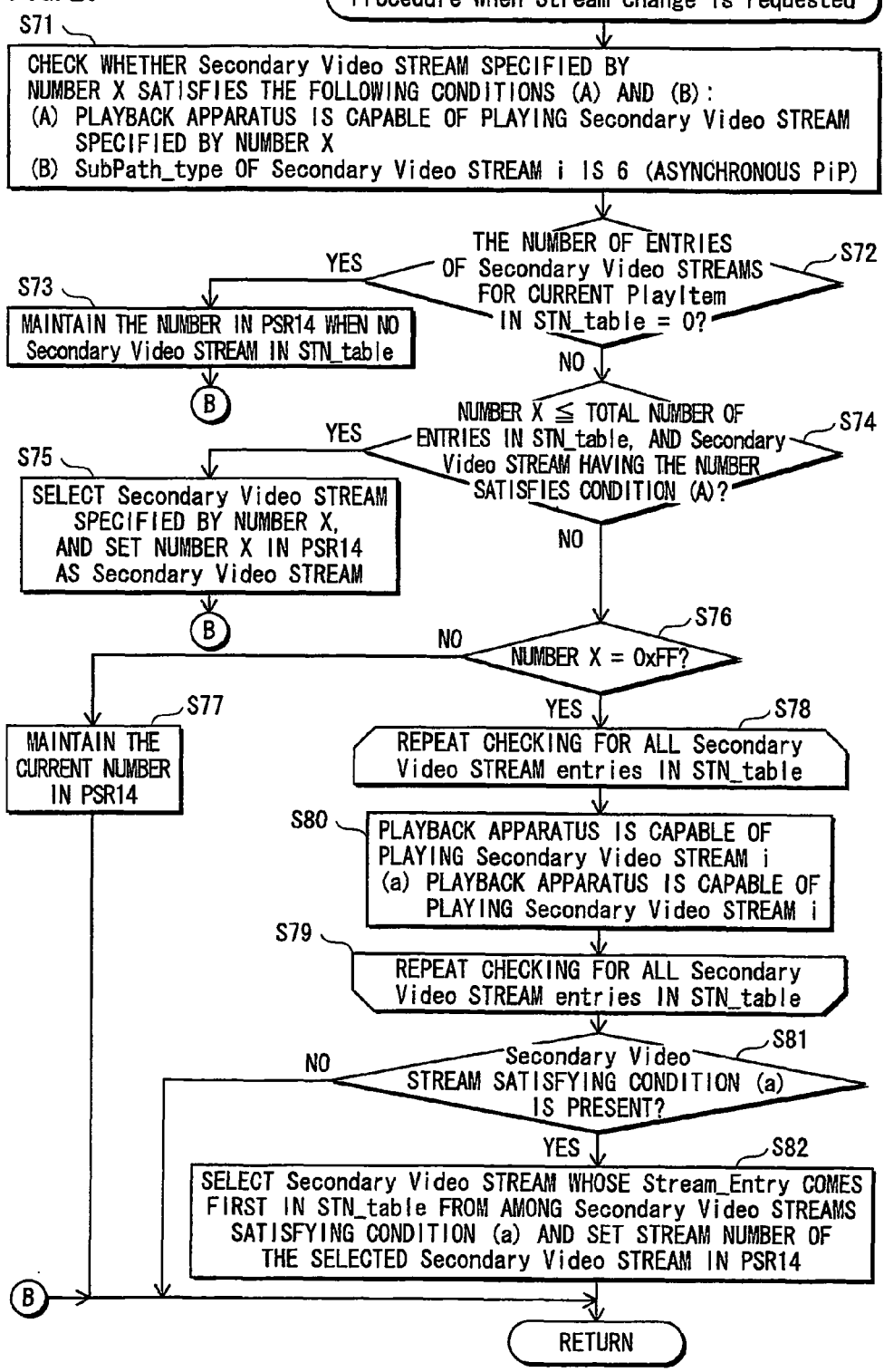
FIG. 29 is a flowchart showing a processing procedure of the "Procedure when stream change is requested" for a secondary video stream.

FIG. 29 is a flowchart showing a processing procedure of the "Procedure when stream change is requested" for a secondary video stream.

Assume that the secondary video stream number x is specified by the user operation made on the operation receiving unit 26. In this case, whether the secondary video stream of the number x satisfies the following conditions (A) and (B) is checked in Step S71.

Condition (A): based on a comparison of the video format and frame_rate with the HD Secondary Video Capability or the 50 & 25 Hz Video Capability, the playback apparatus is capable of playing a secondary video stream specified by the number stored in PSR14; and Condition (B): the SubPath_Type of the secondary video stream is "6 (i.e. asynchronous Picture in Picture)".

After these checks are completed, the judgment step of Step S72 is executed. In Step S72, a judgment is made on whether the number of Stream_entries of the secondary video streams for the current PlayItem in the STN_table is 0. "0" in Step S72 means that no playback-permitted stream is present, and the secondary video stream number in PSR14 is maintained (Step S73).

When not "0" in Step S72, the judgment step of Step S74 is executed. In Step S74, a judgment is made on whether the number x of the secondary video stream specified by the user operation is equal to or lower than the total number of the stream_entries in the STN_table and whether the number x satisfied the condition (A). If it satisfies the condition (A), a stream specified by the number x is selected and set in PSR14 (Step S75).

When NO in Step S74, the judgment step of Step S76 is executed. The judgment step is for judging whether the number x is 0xFF. Here, "0xFF" of the number x is an "entrustment number" which means that the selection of the most appropriate secondary video stream for the current PlayItem is left to the discretion of the playback apparatus. If the number x is not 0xFF, the secondary video stream number stored in PSR14 is maintained (Step S77). If the number x is 0xFF, a loop processing of Steps S78 to S80 is commenced. In the loop processing, the checking of whether the following condition is satisfied is performed on all secondary video streams written in the stream_entries of the STN_table.

Condition (a): based on a comparison of the video format and frame_rate with the HD Secondary Video Capability or the 50 & 25 Hz Video Capability, the playback apparatus is capable of playing a secondary video stream specified by the number stored in PSR14.

After the loop processing is executed, whether at least one secondary video stream satisfying the condition (a) is present is judged in Step S81. If it is present, a secondary video stream whose Stream_Entry comes first in the STN_table is selected from among the secondary video streams satisfying the condition (a), and the stream number of the selected secondary video stream is set in PSR14 (Step S82). Thus concludes the description of the "Procedure when stream change is requested" for the secondary video stream.

According to the present embodiment, even if unplayable secondary video streams are present within secondary video streams recorded in the BD-ROM or the local storage, there is an option to use "for Picture in Picture, one that the playback apparatus is capable of playing" by executing a procedure of selecting a subsequent stream. Accordingly, even if the total sizes of secondary videos vary from each other and there are differences among playback apparatuses in their capabilities of playing secondary videos, it is possible to cause the playback apparatus to display some kind or another secondary video and to execute Picture in Picture.

Embodiment 2

Figure 30:
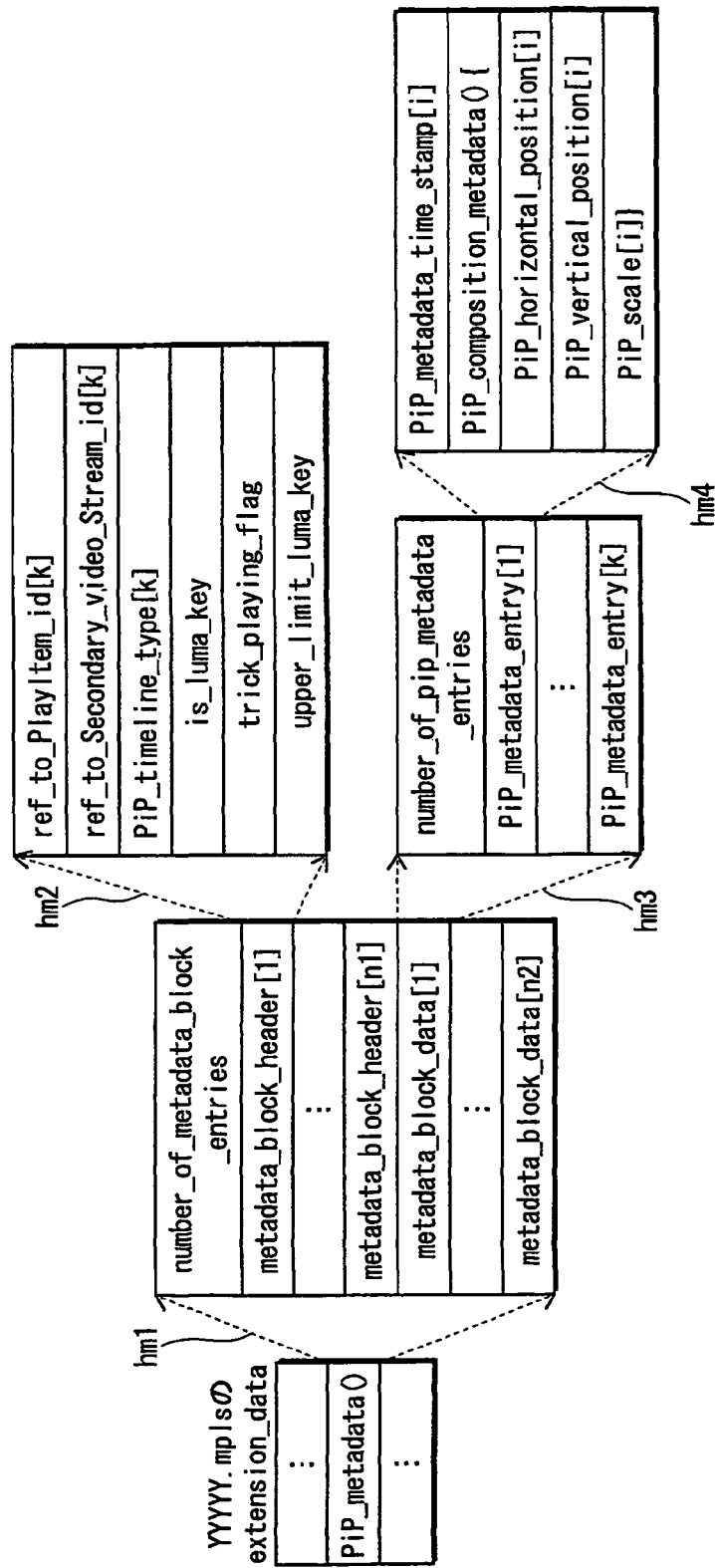
FIG. 30 shows an internal structure of the PiP Metadata.

The present embodiment describes a specific data structure to cause the playback apparatus to perform Picture in Picture and a processing procedure of the playback apparatus according to the data structure. The specific data structure to cause the playback apparatus perform Picture in Picture is present in extension_data within the internal structure of mpls file shown in FIGS. 11 and 16, and is called PiP_metadata. FIG. 30 shows an internal structure of the PiP_metadata. The lead line hm1 indicates a close-up of the internal structure of the PiP_metadata. As shown by the lead line hm1, the PiP_metadata is composed of number_of_metadata_block_entries, n1 pieces of metadata_block_headers, and n2 pieces of PiP_metadata_blocks.

The lead line hm2 indicates a close-up of the internal structure of the metadata_block header. That is, the metadata_block_headers are multiple instances generated from the same class structure, and each has the same internal structure as indicated by the lead line hm2. The following describes each field constituting the metadata_block_header.

ref_to_PlayItem_id[k]:

This is a field for indicating a PlayItem_id of PlayItem[k] to be a target of Picture in Picture. The STN_table of the PlayItem indicated by the ref_to_PlayItem_id[k] must store therein a reference value of the ref_to_secondary_video_stream_id[k](secondary_video_stream_id). In addition, the ref_to_PlayItem_ids in the pip_metadata( ) has to be rearranged in ascending order of the reference values. This is for, when the current PlayItem changes, promptly finding a metadata_block_header having the ref_to_PlayItem_id that specifies a PlayItem after the change.

ref_to_secondary_video_stream_id[k]:

This is a field for showing, from among secondary_video_stream_ids defined in the STN_table of the PlayItem referred to by the ref_to_PlayItem_id[k], one indicating a secondary video stream used for the playback of Picture in Picture. This field is used for identifying a secondary video stream which uses associated PiP_metadata_block[k]( ). To be more specific, an associated stream_entry( ) in the STN_table can be derived by referring the secondary_video_stream_id, and a SubPath corresponding to a secondary video stream which is used by PiP_metadata_block[k]( ) by referring to the stream_entry.

Note here that two or more pairs whose values of the ref_to_PlayItem_id[k] and the ref_to_secondary_video_stream_id[k] are the same must not be present in the pip_metadata( ).

pip_timeline_type[k]:

This indicates that a mapping point of the Sync_Start_PTS_of_PlayItem on the PlayItem time axis should be used as reference timing for executing Picture in Picture or as the position of SubPlayItem_In_time.

When Pip_time_line_type=1, the pip_metadata_time_stamp uses the PlayItem time axis referred to by the ref_to_PlayItem_id[k] as the basis in the execution of synchronous Picture in Picture. In this case, the SubPath_type of the SubPath specified by the ref_to_secondary_video_stream_id[k] must be set to 5 or 7.

When Pip_time_line_type=2, the pip_metadata_time_stamp uses the SubPath time axis as the basis in the execution of asynchronous Picture in Picture. In this case, the SubPath_type of the SubPath specified by the ref_to_secondary_video_stream_id[k] must be set to 6.

When Pip_time_line_type=3, the pip_metadata_time_stamp uses the PlayItem time line referred to by the ref_to_PlayItem_id[k] as the basis in the execution of asynchronous Picture in Picture. In this case, the SubPath_type of the SubPath specified by the ref_to_secondary_video_stream_id[k] must be set to 6.

Thus, preferred Picture in Picture playback can be realized by ideally using either one of the PlayItem side or the Sub-PlayItem side as the basis.

is_luma_key:

When this flag is 1, luma-keying is applied for a corresponding secondary video stream according to upper_limit_luma_key. The luma-keying is a process of, when each picture constituting the secondary video includes a subject and a background, extracting the subject from the picture and providing this for the composition with the primary video. When the luma-keying is applied for the secondary video, the α3 of the α3-multiplication unit 15c, shown in Embodiment 1, is set to 0 or 1. When the luma-keying is not applied, the α3 is set to 1.

trick_playing_flag:

This is a flag showing an intention of the content provider on whether the window for Picture in Picture is left open or closed during trick playback of the primary video. This flag becomes valid only for the synchronous Picture in Picture. By setting the flag to 0, the content provider shows the intention of making the window for Picture in Picture-(PiP window) closed during trick playback of the primary video. Here, the trick playback is defined by playback apparatus manufacturers with respect to each playback apparatus. For example, in some playback apparatuses, 1.2× Forward Play may be defined as not being trick playback while 2× Forward-Play or more being defined as trick playback.

upper_limit_luma_key:

This is a field for specifying the upper limit of the luminance (Y) of a corresponding secondary video for the luma-keying. When the Primary video plane and Secondary video plane are placed on top of one another, perfect transmission is realized, in the composition of Picture in Picture, for pixels whose values of luminance (Y) are 0 or more but no more than the upper_limit_luma_key value on the Secondary video plane. For example, when a secondary video is composed of a figure of a person and a background and only the person's figure is desired to be used as a target of the composition, a luminance value is set in the upper_limit_luma_key so that, from among the pixels constituting the secondary video, pixels having the luminance value or lower are regarded as the background.

Next is described an internal structure of the PiP_metadata_block. The lead line hm2 indicates a close-up of the structure of PiP_metadata_block. As indicated by the lead line, the PiP_metadata_block[1] is composed of k pieces of PiP_metadata_entries[1] to [k] and number_of_pipmetadata_entries.

The lead line hm3 indicates a close-up of an internal structure of a PiP_metadata_entry. That is, the PiP_metadata_entries are multiple instances generated from the same class structure, and each has the same internal structure and is composed of pip_metadata_time_stamp[i] and pip_composition_metadata( ).

pip_metadata_time_stamp[i]:

This is a field for indicating a start point of the time interval during which the pip_composition_metadata( ) is valid.

Except for the last pip_composition_metadata( ), the i-th pip_composition_metadata ( ) in the k-th PiP_metadata_block[k] becomes valid during the time interval no less than pip_metadata_time_stamp[i] but no more than pip_metadata_time_stamp[i+1]. The last pip_composition_metadata ( ) of the last pip_metadata_time_stamp in the PiP_metadata_block[k]( ) becomes valid during the time interval no less than the last pip_metadata_time_stamp but no more than display end time of a SubPath specified by the ref_to_secondary_video_stream_id[k]. In addition, the minimal time interval between two adjacent pip_metadata_time_stamps is one second inclusive.

Figure 31:
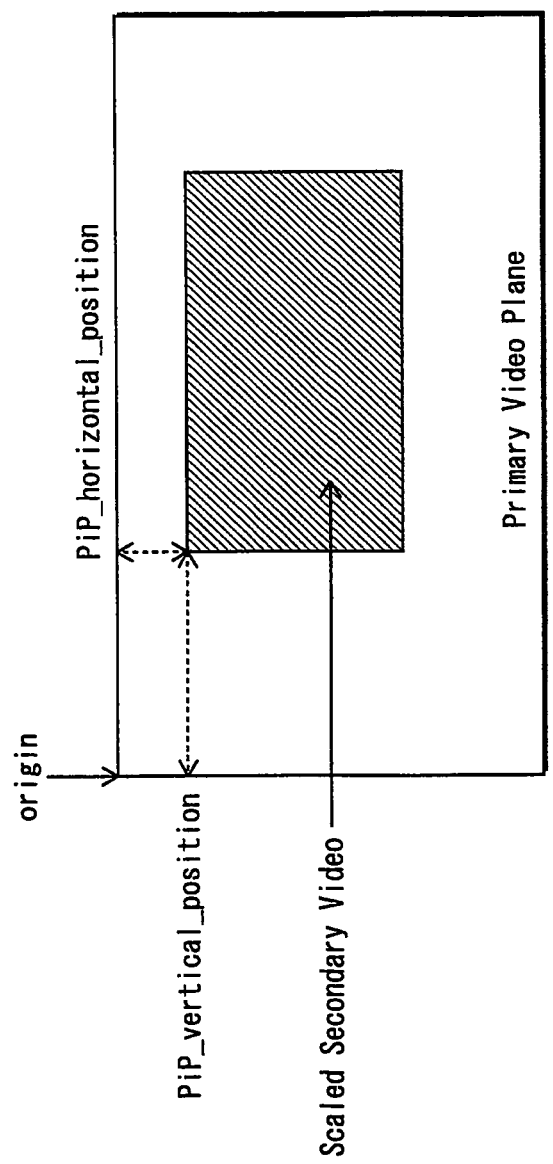
FIG. 31 shows coordinates that the PiP_horizontal_position and PiP_vertical_position possibly take on the video plane.

The pip_composition_metadata( ) is composed of the following fields.

pip_horizontal_position[i]:

This field indicates, a horizontal position of a pixel of the left upper corner of the secondary video on the primary video plane. When video_width represents the horizontal width of the video plane, a horizontal position specified by the PiP_horizontal_position ranges from 0 to video_width-1.

pip_vertical_postion[i]:

This field indicates a vertical position of a pixel of the left upper corner of the secondary video on the primary video plane. When video_height represents the vertical width of the video plane, a vertical position specified by the PiP_vertical_position ranges from 0 to video_height-1. FIG. 31 shows coordinates that the PiP_horizontal_position and PiP_vertical_position possibly take on the video plane. This figure shows a coordinate system in which the left uppermost of the image is the origin, and the positive directions of the x axis and y axis are rightward and downward in the image, respectively. In this coordinate system, the PiP_horizontal_position represents an x coordinate while the PiP_vertical_position represents a y coordinate.

pip_scale[i]:

This is a field for indicating a scaling type of the secondary video. Scaling types are as follows:

0: Preset
1: no scaling (×1)
2: ½ scaling (×½)
3: ¼ scaling (×¼)
4: 1.5× scaling (×1.5)
5: full screen scaling The following describes the relationship between the pip_timeline_type and the pip_metadata_time_stamp.

pip_timeline_type[k]=1

In this case, Picture in Picture becomes valid for a time length starting from the mapping point of SubPlayItem_In_Time on a PlayItem time axis referred to by the ref_to_PlayItem_id[k] and corresponding to the time length of the SubPlayItem. In this case, the PiP_metadata_time_stamp represents, with a time accuracy of 45 KHz, any one of time points in the valid time period of Picture in Picture. Here, the pip_metadata_time_stamp[0] is positioned to the mapping point obtained by mapping the SubPlayItem_In_Time on the time line of the PlayItem referred to by the ref_to_PlayItem_id[k].

Figure 32:
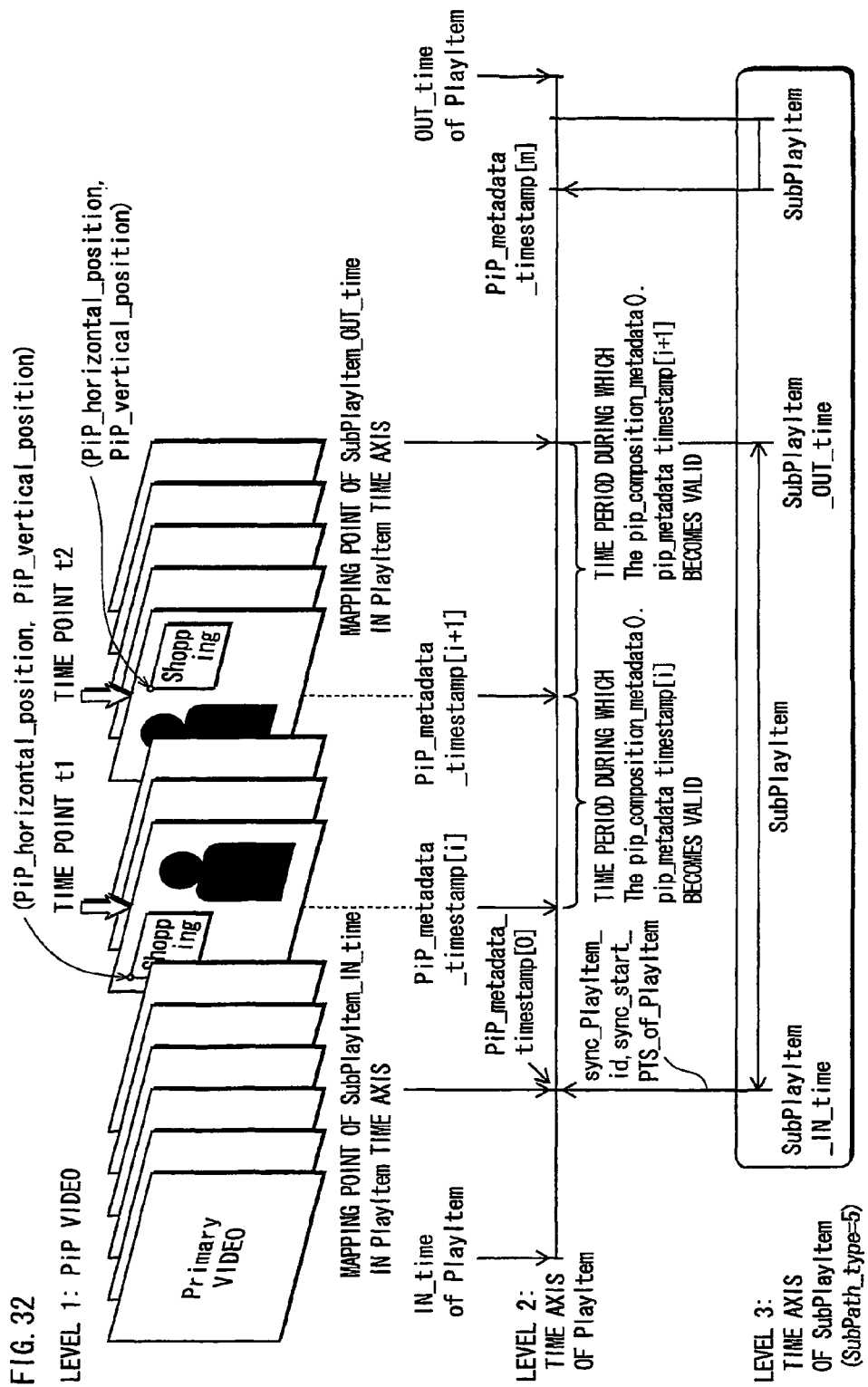
FIG. 32 shows how the PiP_metadata_time_stamp is positioned on the time axis when the PiP_time_line_type=1.

FIG. 32 shows how the PiP_metadata_time_stamp is positioned on the time axis when the PiP_time_line_type=1. In the figure, Level 3 shows the SubPlayItem time axis and Level 2 shows the PlayItem time axis. Level 1 shows multiple pictures constituting the primary video.

Assume here that the secondary video is a shopping video and offers sales of clothing which an actress appearing in the main movie wears. Here, the left side of the screen is blank at time point t1 on the PlayItem time axis, and the right side of the screen is blank at time point t2. In this case, PiP_metadata_time_stamp[i] is set for t1, and the PiP_horizontal_position[i] and PiP_vertical_position[i] are set for the left side of the screen. In addition, the PiP_metadata_time_stamp[i+1] is set for t2, and the PiP_horizontal_position[i+1] and PiP_vertical_position[i+1] for the right side of the screen.

Herewith, the shopping video will be displayed in the blanks at the time points t1 and t2. When PiP_time_line_type=1, the secondary video can be positioned in accordance with the picture of the main movie by displaying the secondary video at which it would not interrupt the view of the main movie.

pip_timeline_type[k]=2

Figure 33:
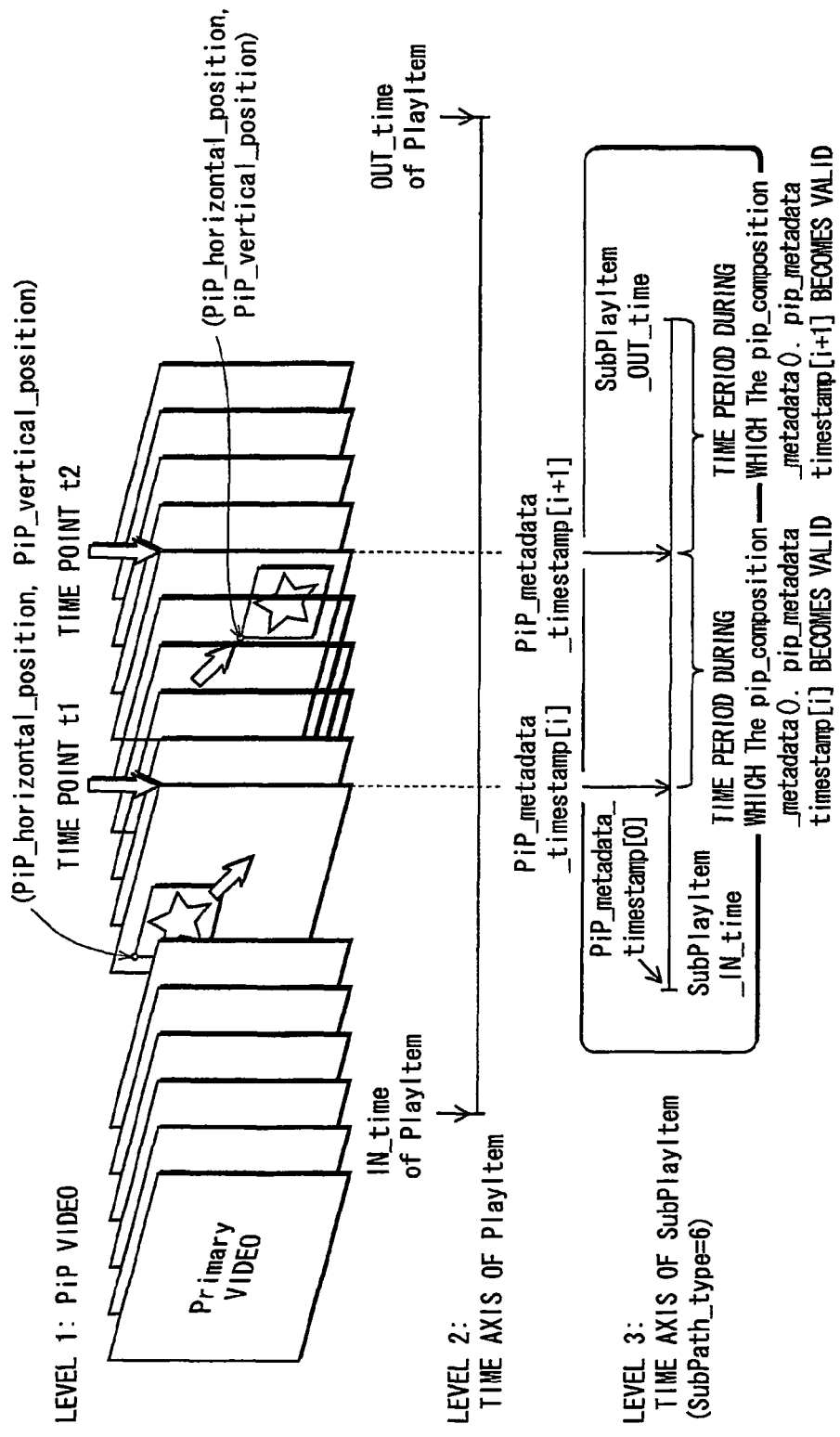
FIG. 33 shows how the PiP_metadata_time_stamp is positioned on the time axis when the PiP_time_linetype=2.

FIG. 33 shows how the PiP_metadata_time_stamp is positioned on the time axis when the PiP_time_line_type=2. Levels 1, 2 and 3 in the figure are the same as those in FIG. 32.

Picture in Picture becomes valid for a time length starting from the SubPlayItem_In_Time on the SubPath time axis of Level 3 in the figure and corresponding to the time length of the SubPlayItem. The PiP_metadata_time_stamp represents, with a time accuracy of 45 KHz, any one of time points in the valid time period of Picture in Picture. Here, the pip_metadata_time_stamp[0] is positioned at a time point specified by the In_Time on the SubPlayItem time axis.

The reason why the PiP_metadata_time_stamp[0] is positioned on the Subpath time axis is to define a movement trajectory when a thing drawn in the secondary video is a moving object which is desired to be moved from left to right side of the screen. This is because such a movement trajectory can be defined independently of the picture of the main movie. Accordingly, the PiP_metadata_time_stamp[0] is positioned on the playback axis of the Subpath information.

Assume that, in FIG. 33, the PiP_metadata_time_stamp[i] indicates t1 on the SubPlayItem time axis and the PiP_horizontal_position[i] and PiP_vertical_position[i] indicate a left upper part of the screen. In addition, the PiP_metadata_time_stamp[i+1] indicates t2 on the SubPlayItem time axis and the PiP_horizontal_position[i+1] and PiP_vertical_position[i+1] indicate a right lower part of the screen.

In this case, the secondary video is displayed at the left upper part of the screen at a time on the SubPlayItem time axis indicated by the PiP_metadata_time_stamp[i]. The secondary video is then displayed at the right lower part at a time on the SubPlayItem time axis indicated by the PiP_metadata_time_stamp[i+1]. Here, in the case where Sync_Start_PTS_of_PlayItem is 0xFFF, the Sync_Start_PTS_of_PlayItem is interpreted as a point when the user performed the lock operation. Therefore, if the user performs the lock operation, secondary videos will be sequentially displayed. Herewith, a screen effect can be realized in which an object drawn in the secondary video (the shooting star in the figure) moves around in the primary video in response to the user's operation.

pip_timeline_type[k]=3

Picture in Picture becomes valid in a time period starting at the PlayItem_In_Time and ending at the PlayItem_Out_Time on a PlayItem time axis referred to by the ref_to_PlayItem_id [k]. The PiP_metadata_time_stamp represents, with a time accuracy of 45 KHz, any one of time points in the execution time period of Picture in Picture. Here, the pip_metadata_time_stamp[0] is positioned at the PlayItem_In_Time referred to by the ref_to_PlayItem_id[k].

Figure 34:
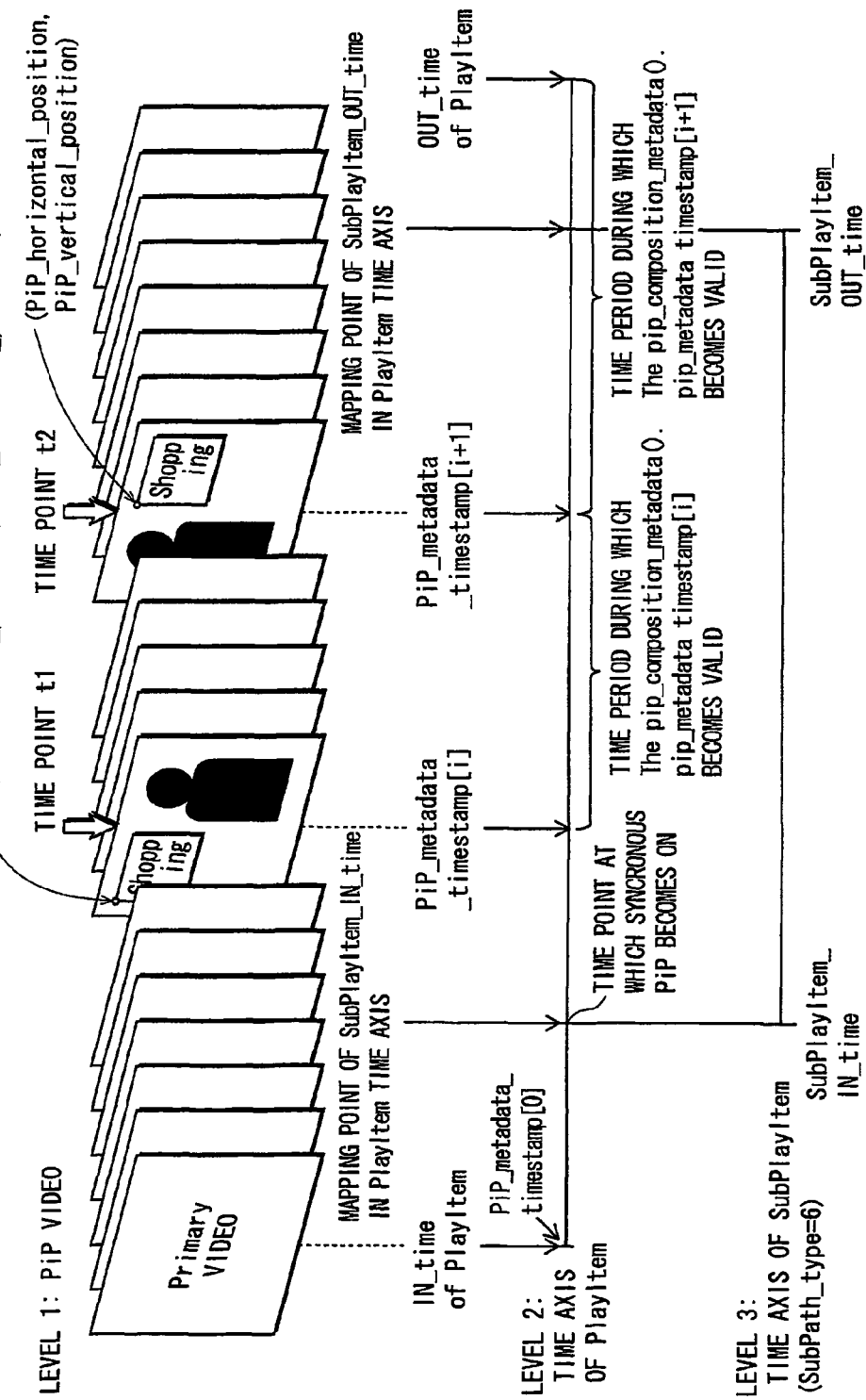
FIG. 34 shows how the PiP_metadata_time_stamp is positioned on the time axis when the PiP_time_line_type=3.

FIG. 34 shows how the PiP_metadata_time_stamp is positioned on the time axis when the PiP_time_line_type=3. Each Level in the figure is the same as that in FIG. 32. In addition, the blank locations in the primary video are the same as those in FIG. 32. When the pip_timeline_type[k]=3, the PiP_metadata_time_stamp[0] is positioned at a time point indicated by the origin of the PlayItem time axis, i.e. a time point indicated by In_Time. Therefore, it is possible to realize the same screen-effect as FIG. 32 by representing t1 using a coordinate based on the origin of the PlayItem time axis and setting the t1 for the PiP_metadata_time_stamp[i] while representing t2 using a coordinate based on the origin of the PlayItem time axis and setting the t2 for the PiP_metadata_time_stamp[i]. If the PiP_time_line_type is set to 3, the time period in which Picture in Picture should be executed can be defined by a coordinate based on the origin of the PlayItem time axis.

Figure 35:
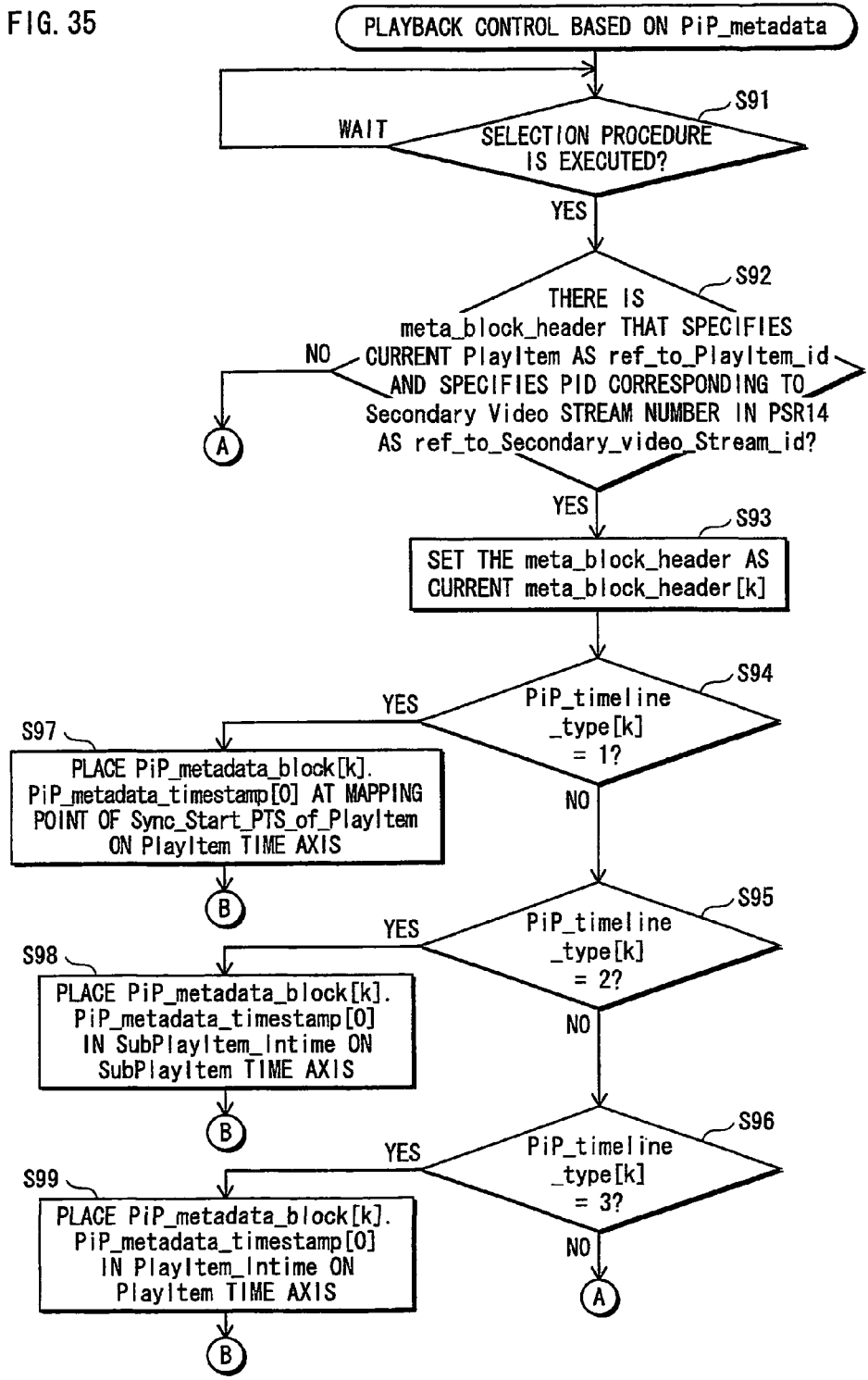
FIG. 35 is a flowchart Showing a procedure of playback control based on Picture in Picture.
Figure 36:
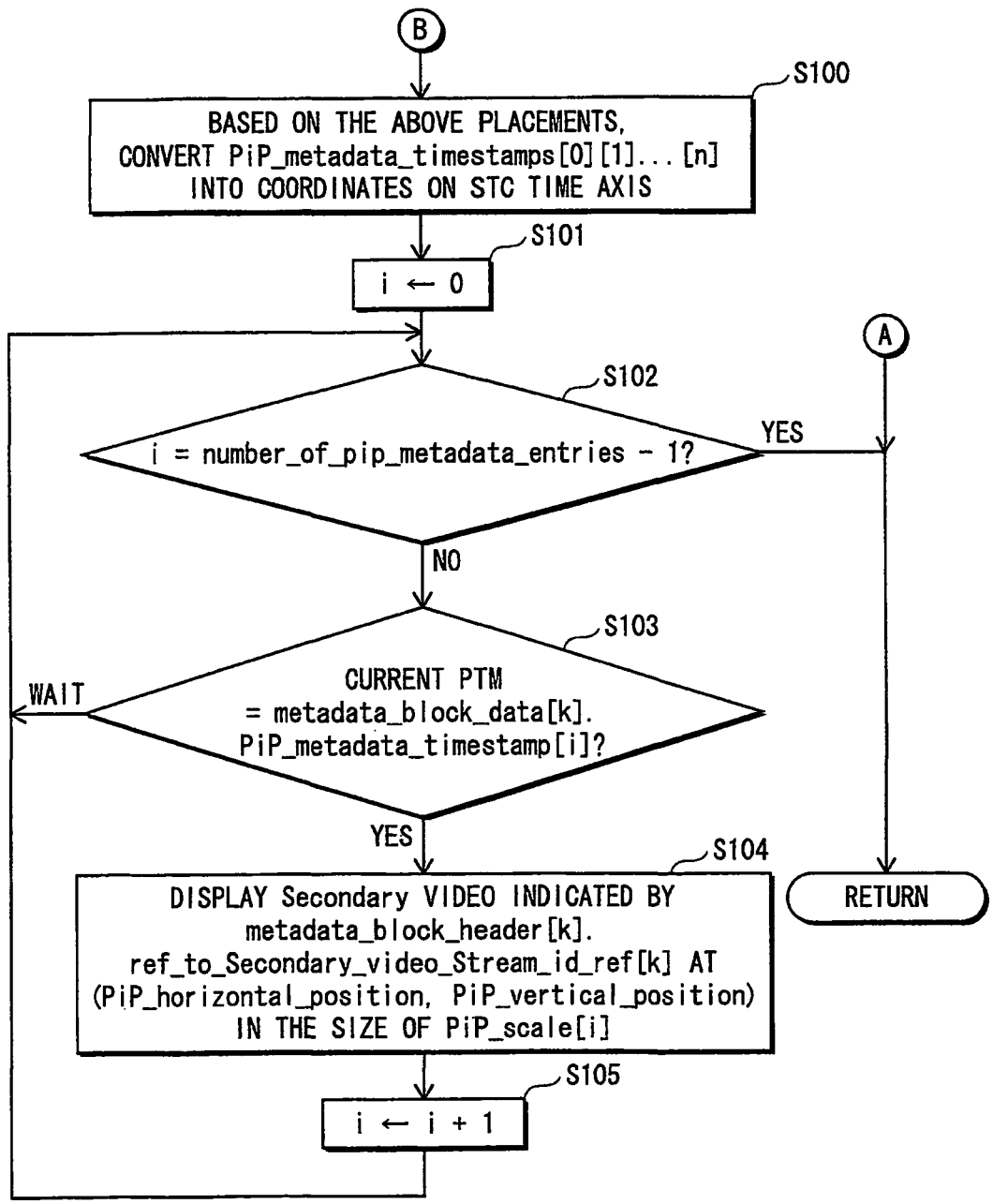
FIG. 36 is a flowchart showing a procedure of playback control based on Picture in Picture.

Thus concludes the improvement of the recording medium of the present embodiment. Next is described an improvement in the playback apparatus of the present embodiment. The improvement in the playback apparatus of the present embodiment is that the PiP control unit 43 performs playback control based on the metadata_block_header and PiP_metadata_block. FIGS. 35 and 36 are flowcharts showing a playback control procedure based on Picture in Picture. The following describes the playback control with reference to the flowcharts.

Step S91 forms an event-wait loop that waits for the execution of a selection procedure. When the procedure is executed, Step S91 is YES and processing from Step S92 onward will be executed. In Step S92, it is judged whether there is a meta_block_header that specifies current PlayItem as ref_to_PlayItem_id and specifies PID corresponding to the secondary video stream number in psr14 as Ref_to_secondary_video_stream_id.

If being present, the meta_block_header is set as the current metadata_block_header (Step S93). Steps S94 to S96 are provided for selectively executing Steps S97, S98 and 599 according to the value of PiP_time_line_type of the metadata_block_header. When PiP_time_line_type of the metadata_block_header is 1, Step S94 is YES and the PiP_metadata_block.PiP_metadata_time_stamp[0] is positioned at the mapping point of the Sync_Start_PTS_of_PlayItem on the PlayList playback time axis (Step S97).

When PiP_time_line_type of the metadata_block_header is 2, Step S95 is YES and the PiP_metadata_block.PiP_metadata_time_stamp[0] is positioned at the SubPlayItem. In_Time on the SubPlayItem time axis (Step S98).

When PiP_time_line_type of the metadata_block_header is 3, Step S96 is YES and the PiP_metadata_block.PiP_metadata_time_stamp[0] is positioned at the PlayItem.In_Time (Step S99).

In Step S100, the PiP_metadata_time_stamps[0][1] . . . [n] are converted into coordinates on the STC time axis based on the position of the PiP_metadata_time_stamp[0]. Subsequently, a loop processing of Steps S101 to S105 is commenced. The counter variable in the loop processing is variable i and it is initialized to "0" in Step S101. The counter variable is incremented by 1 in Step S105 every time Steps S103 and S104 are performed.

Step S103 is for judging whether the current playback time point (current Presentation TiMe (PTM)) has reached the PiP_metadata_block.PiP_metadata_time_stamp[i]. When the current PTM reaches it, the α3 multiplication unit 15c and addition unit 15d are, instructed to display the secondary video indicated by the metadata_block_header.Ref_to_secondary_video_stream_id at coordinates indicated by (PiP_horizontal_position and PiP_vertical_position) in the size indicated by the PiP_scale[i](Step S104).

Here, if the is_luma_key: of the metadata_block_header is set to 1, the α3 multiplication unit 15c and addition unit 15d are instructed to make the pixels whose values of luminance (Y) are 0 or more but no more than the upper_limit_luma_key value to have perfect transmission in the composition of Picture in Picture. Herewith, only the person's figure can be extracted from the secondary video and the extracted figure can be combined with the primary video.

A requirement to end the loop processing is to obtain i=number_of_pip_metadata_entries−1 in Step S102. Until the requirement is satisfied, the processing of Steps S103 to S105 will be repeated.

When trick playback is to be started in the middle of PlayList information and the currently executed Picture in Picture is synchronous PiP, the intention of the content provider is checked on whether the window for pip is left open or closed during trick playback of the primary video. When the flag is 0, the content provider intends to close the PiP window and therefore the window is closed. When the flag is 1, the content provider intends to leave the PiP window open and the window is left open.

Thus, according to the present embodiment, which one of the MainPath time axis and the Subpath time axis is used as the reference for starting Picture in Picture is decided based on the PiP_time_line_type. It is therefore possible to reflect, on the operations of the playback apparatus, the intentions of the authoring developers regarding whether the position of the secondary video is decided in accordance with the picture of the primary video or the secondary video is moved in response to the user's operation.

Embodiment 3

The present embodiment relates to an improvement in which multiple secondary video streams are associated one-to-one with SubPlayItems and one Picture in Picture playback path is defined from the SubPlayItems.

In this case, the length of the playback section for one SubPlayItem may be shorter than that for a corresponding PlayItem. However, consecutive SubPlayItems in the SubPath cannot temporally overlap. Even if boundaries exist between PlayItems, the SubPlayItems cannot overlap. On the other hand, consecutive SubPlayItems in the SubPath are allowed to have time gaps therebetween. Such a time gap is three seconds or more.

Figure 37:
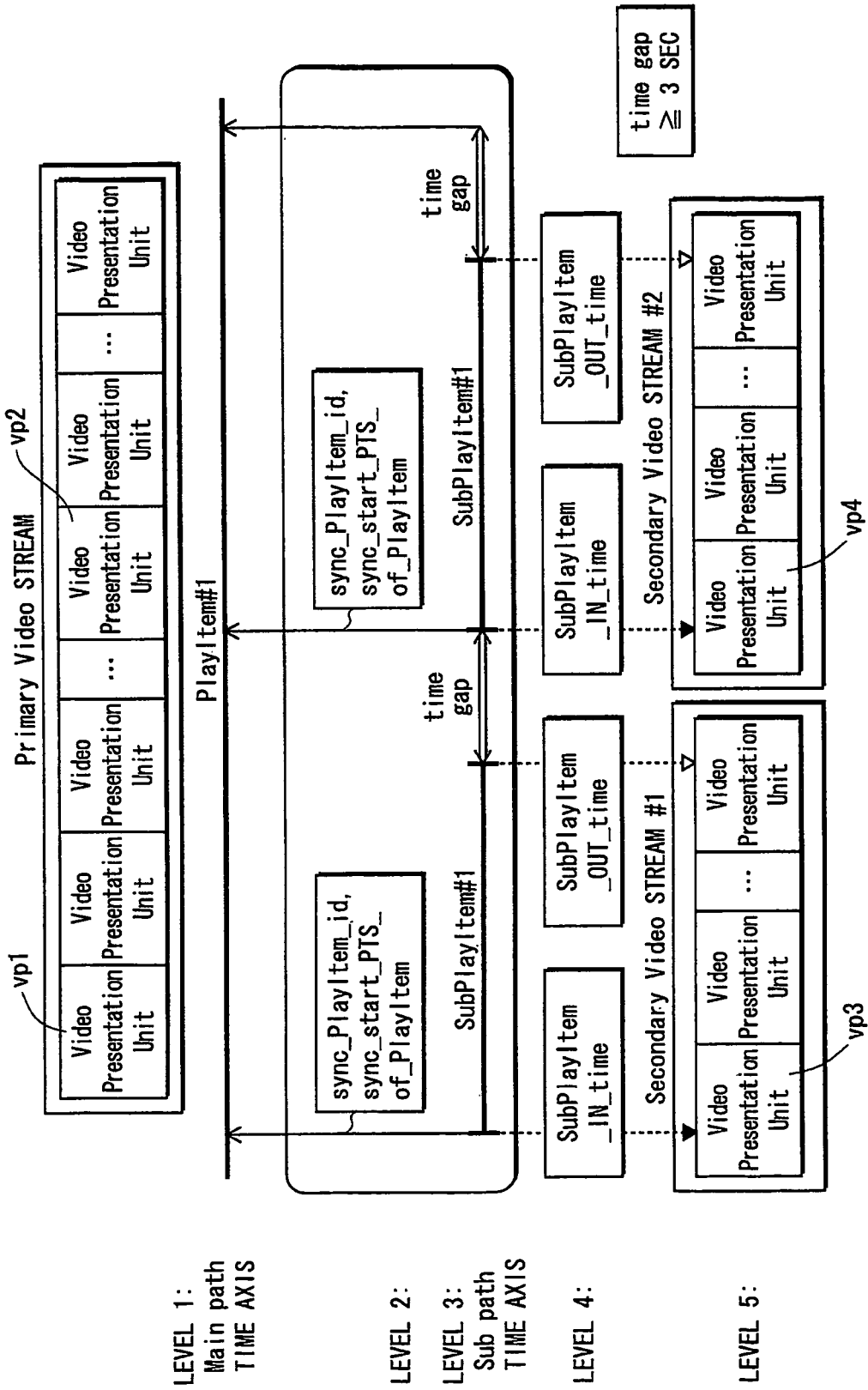
FIG. 37 shows a relationship between a MainPath composed of one PlayItem and a Subpath composed of two SubPlayItem.

FIG. 37 shows a relationship between a MainPath composed of one PlayItem and a Subpath composed of two SubPlayItems. Level 1 shows multiple Video Presentation Units constituting the primary video stream. Level 2 shows groups each composed of a sync_PlayItem_id and a sync_start_PTS_of_PlayItem. Level 3 shows a SubClip time axis and Level 4 shows In_Times and Out_Times of SubPlayItems. Level 5 shows multiple Video Presentation Units constituting the secondary video streams.

The groups of sync_PlayItem_id and sync_start_PTS_of_PlayItem in Level 2 specify times at which SubPlayItem_IN_times take synchronization on the MainPath time axis.

The Video Presentation Units vp1 and vp2 of the secondary video indicated by the SubPlayItem_IN_times in Level 5 and the Video Presentation Units vp3 and vp4 of the primary video indicated by the sync_start_PTS_of_PlayItems are respectively located on the same time points on the Main Path time axis.

Two SubPlayItem (SubPlayItems #1 and #2) are defined on the Subpath time axis in Level 3. Here, a time gap (time gap in the figure) may exist on the Subpath time axis, between the Out_Time of the SubPlayItem#1 and the In_Time of the SubPlayItem#2. If consecutive SubPlayItems in a SubPath are connected without a time gap, the connection condition of the SubPlayItems must be represented by a sp_connection_condition.

In FIG. 37, a three-second time gap is provided between two or more consecutive SubPlayItems as shown in Level 3, and therefore excess load for controlling the secondary video decoder will not be exerted on the controller 22. Such consideration has been given to the Subpath time axis, it is possible to realize the process of performing playback of SubClips based on two consecutive SubPlayItems without increasing the operation clock of the playback apparatus.

Thus concludes the improvement in the recording medium of the present embodiment. Next is described an improvement in the playback apparatus of the present embodiment.

Figure 38:
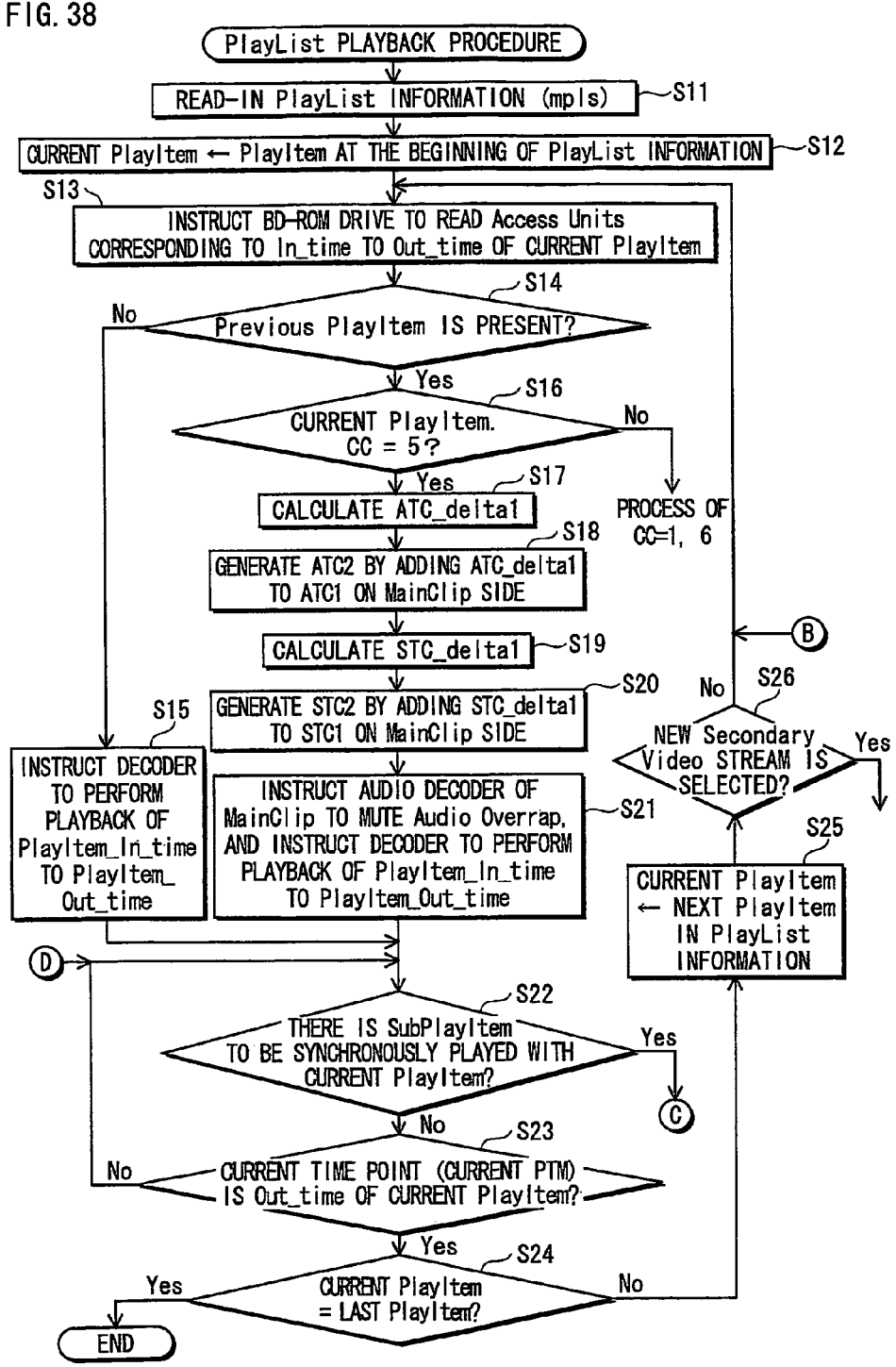
FIG. 38 is a flowchart showing a playback procedure based on PlayList information.
Figure 39:
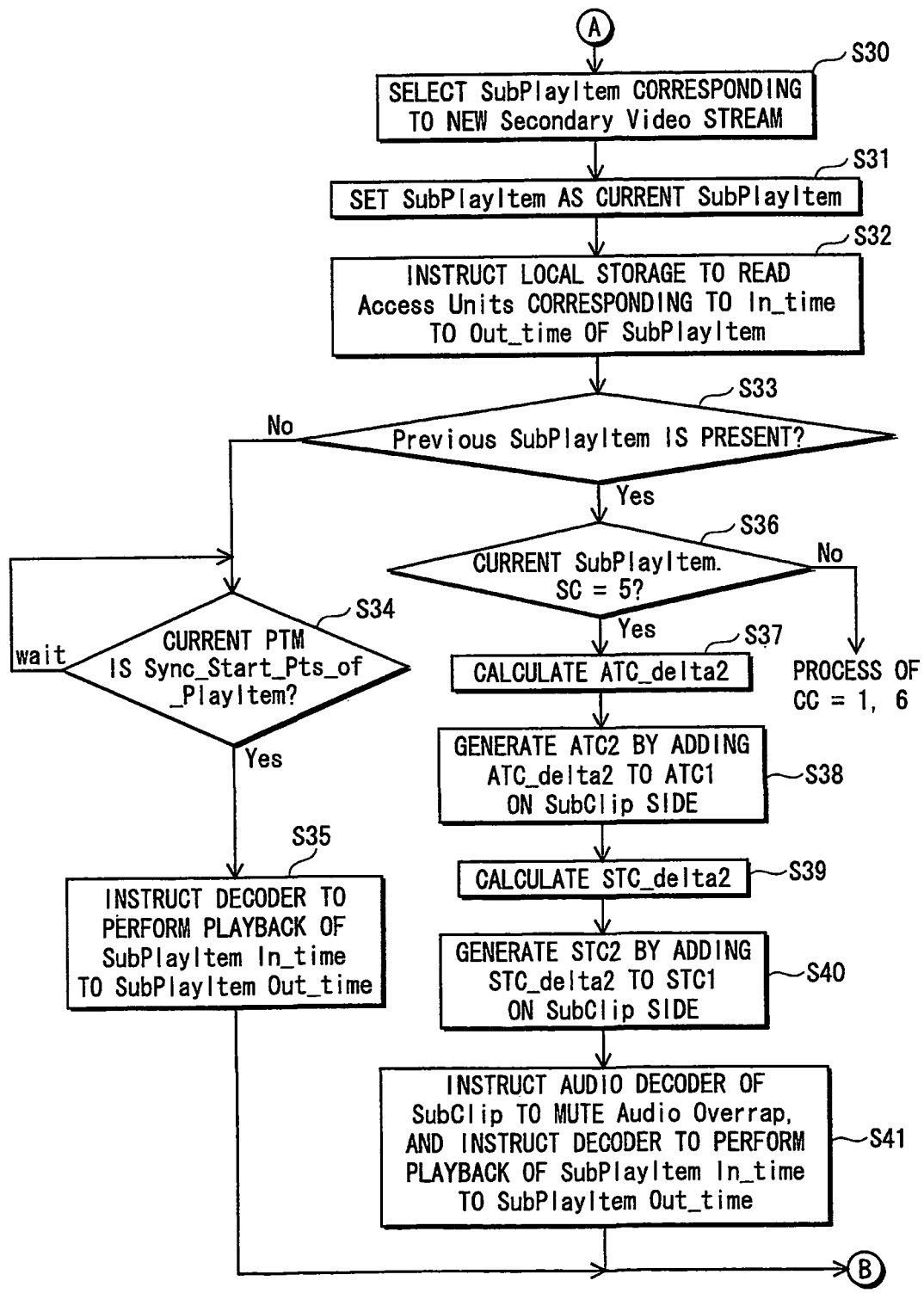
FIG. 39 is a flowchart showing a processing procedure of a seamless connection of SubPlayItems.
Figure 40:
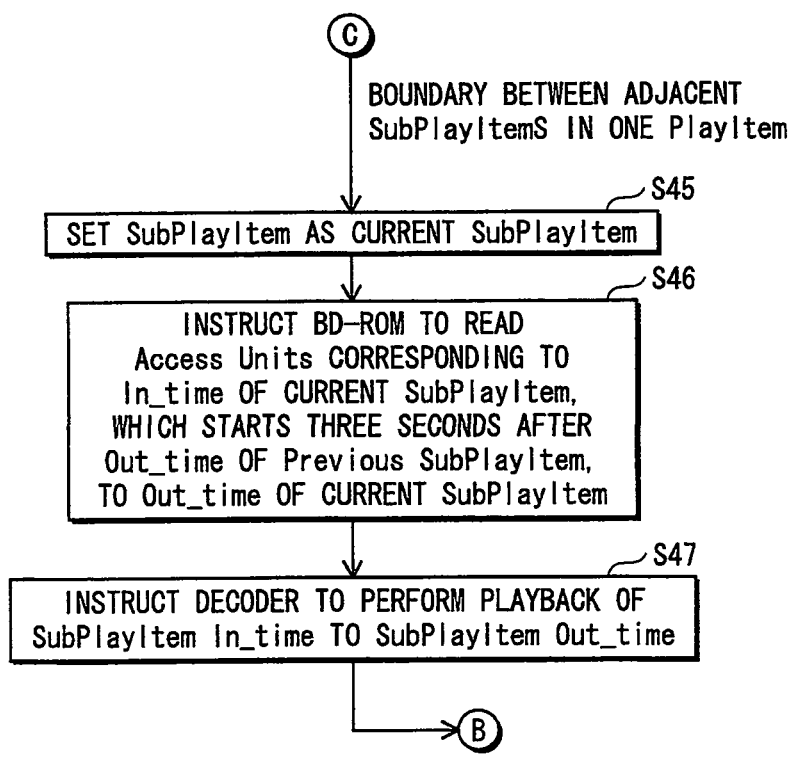
FIG. 40 is a flowchart showing a processing procedure of a seamless connection of SubPlayItems.

The improvement in the playback apparatus of the present embodiment is that the PlayList processing unit 41 executes the processing procedure of the flowcharts shown in FIGS. 38, 39 and 40.

FIG. 38 is a flowchart showing a playback procedure based on PlayList information. The flowchart shows a loop structure in which a .mpls file structuring the PlayList information is read in (Step S11), a PlayItem at the beginning of the PlayList information is set as the current PlayItem (Step S12), and Steps S13 to S25 are repeated for the current PlayItem. This loop structure has Step S23 as an ending condition. The PlayList processing unit 41 instructs the BD-ROM drive to read Access Units corresponding to In_Time to Out_Time of the current PlayItem (Step S13), judges whether a previous PlayItem is present in the current PlayItem (Step S14), and selectively executes processing of Step S15 or Steps S16 to S21 according to the judgment result. To be more specific, if the current PlayItem does not have a previousPlayItem (Step S14: NO), the PlayList processing unit 41 instructs the decoder perform playback of the PlayItem_In_Time to the PlayItem_Out_Time (Step S15).

If the current PlayItem has the previousPlayItem (Step S14: YES), the PlayList processing unit 41 judges whether the value in the Connection Condition field of the current PlayItem is 5 (cc=5) (Step S16). When cc=5 (Step S16: YES), the PlayList processing unit 41 carries out the processing of Steps S17 to S20.

When the previousPlayItem above is present, an ATC_Sequence in the MainClip is switched. For the switch of the ATC_Sequence, the PlayList processing unit 41 calculates an offset value for the MainClip, called ATC_delta1 (Step S17), and obtains an ATC value (ATC2) for a new ATC Sequence by adding the ATC_delta1 to an ATC value (ATC1) of the original ATC_Sequence (Step S18).

In addition, when the previousPlayItem above is present, a STC_Sequence in the MainClip is switched. For the switch of the STC_Sequence, the PlayList processing unit 41 calculates an offset value called STC_delta1 (Step S19), and obtains a STC value (STC2) of a new STC_Sequence by adding the STC_delta1 to a STC value of the original STC_Sequence (Step S20).

After the PlayList processing unit 41 instructs the audio decoder 9 to mute the Audio Overlap, and instructs the decoder to perform playback of the PlayItem_In_Time to the PlayItem_Out_Time (Step S21). When the current PlayItem is not cc=5, the PlayList processing unit 41 performs the processing of cc=1 and cc=6.

After either one of the processing of Step S15 and the processing of Steps S16 to S21 is carried out, the PlayList processing unit 41 executes Steps S22 and S23.

In Step S22, the PlayList processing unit 41 judges whether there is a SubPlayItem that synchronizes the current PlayItem and the current playback time point (current PTM (Presentation TiMe)) has reached a boundary between the SubPlayItem and the next SubPlayItem. If Step S22 is YES, the PlayList processing unit 41 executes Step S30 of the flowchart in FIG. 39.

In Step S23, the PlayList processing unit 41 judges whether the current PTM on the AVClip time axis has reached the Out_Time of the current PlayItem.

If Step S23 is YES, the PlayList processing unit 41 moves to Step S24. In Step S24, the PlayList processing unit 41 judges whether the current PlayItem is the last PlayItem of the PlayList information. If it is not the last PlayItem, the PlayList processing unit 41 causes the next PlayItem of the PlayList information to be the current PlayItem (Step S25), and moves to Step S13 via Step S26. According to the above-mentioned processing, the processes of Steps S13 to S24 are performed on all the PlayItems of the PlayList information.

FIG. 39 is a flowchart showing a processing procedure of a seamless connection of SubPlayItems.

When a new secondary video stream is selected in accordance with the switch of PlayItems in Step S26, the PlayList processing unit 41 selects a SubPlayItem corresponding to the new secondary video stream in Step S30.

Subsequently, in Step S31, the PlayList processing unit 41 sets the SubPlayItem selected in Step S30 as the current SubPlayItem.

Then, the PlayList processing unit 41 performs the processing of Steps S32 to S41 on the current SubPlayItem. First, the PlayList processing unit 41 instructs the local storage 200 to read Access Units corresponding to the In_Time to the Out_Time of the SubPlayItem (Step S32). The PlayList processing unit 41 then judges whether the current PlayItem has a Previous SubPlayItem (Step S33), and selectively performs the processing of Steps S34 and S35 or the processing of Steps S36 to S41 based on the judgment result. To be more specific, if the current PlayItem does not have a Previous SubPlayItem (Step S33: NO), the PlayList processing unit 41 waits until the current PTM has reached the Sync_Start_Pts_of_PlayItem (Step S34). When it has reached the Sync_Start_Pts_of_PlayItem, the PlayLIst processing unit 41 instructs the decoder to perform playback of the SubPlayItem_In_Time to the SubPlayItem_OUt_Time (Step S35).

If the current PlayItem has a Previous SubPlayItem (Step S33: YES), the PlayList processing unit 41 judges whether the current PlayItem is SP_CC=5 (Step S36). When SP_CC=5 (Step S36: YES), the PlayList processing unit 41 performs Steps S37 to S41.

When the current PlayItem has a Previous SubPlayItem, the ATC_Sequence is switched. For the switch of the ATC_Sequence, the PlayList processing unit 41 calculates an offset value for the SubClip, called ATC_delta2 (Step S37), and obtains an ATC value (ATC2) for a new ATC_Sequence by adding the ATC_delta 1 to an ATC value (ATC1) of the original ATC_Sequence (Step S38).

The ATC_delta means an offset value representing an offset from the input time point T1 of the last TS packet of a transport stream (TS1) that has been originally read out to the input time point T2 of the last TS packet of a transport stream (TS2) that has been newly read out. The ATC_delta satisfies "ATC_delta≧N1/TS_recording_rate", where N1 is the count of TS packets following the last video PES packet of the TS1.

In addition, when the previousPlayItem above is present, a STC_Sequence is switched. For the switch of the STC_Sequence, the PlayList processing unit 41 calculates STC_delta2 (Step S39), and obtains a STC value (STC2) of a new STC_Sequence by adding the STC_delta2 to a STC value of the original STC_Sequence (Step S40).

Assume that the display start time of a picture lastly played in the preceding STC_Sequence is PTS1(1stEND), the display time period of the picture is TPP, and the start time of a picture initially displayed in the following STC_Sequence is PTS2 (2ndSTART). Here, for cc=5, since it is necessary to match the time of PTS1(1stEND)+TPP with the time of PTS2 (2ndSTART), the STC_delta2 can be calculated from the following equation:

$$STC\_delta2 = PTS1(1stEND) + TPP - PTS2(2ndSTART).$$

After the PlayList processing unit 41 instructs the audio decoder 9 to mute the Audio Overlap, and instructs the decoder to perform playback of the PlayItem_In_Time to the PlayItem_Out_Time (Step S41).

The controller 22 performs the STC switch process as described above, and this process is performed in a playback apparatus with general implementation when the decoder is in a free-run condition. The free-run condition means the condition where the decoder is not performing synchronous control. Subsequently, when the STC returns to the condition where the STC time axis can be set, the decoder makes the transition from the free-run condition to synchronous control with the STC. On the other hand, when the current PlayItem is judged not being cc=5 in Step S36 (Step S36: NO), the PlayList processing unit 41 performs the processing of cc=1 and cc=6.

Step S26 of FIG. 38 is a judging step for judging whether a new secondary video stream is selected in accordance with the switch of PlayItems. When Step S26 is YES, the PlayList processing unit 41 performs Steps S45 to S47 of FIG. 40.

In Steps S45 to S47, the playback is switched from a SubPlayItem, which is one of two consecutive SubPlayItems in one PlayItem, to the other SubPlayItem, and the PlayList processing unit 41 sets the SubPlayItem after the switch as the current SubPlayItem (Step S45).

Then, the PlayList processing unit 41 instructs the local storage 200 to read Access Units corresponding to the In_Time to the Out_Time of the current SubPlayItem (Step S46), and instructs the decoder to perform playback of the current SubPlayItem_In_Time to the current SubPlayItem_Out_Time (Step S47).

Thus, according to the present embodiment, a time gap is provided, within one PlayItem, between the current SubPlayItem and the preceding SubPlayItem, and such a boundary between SubPlayItems therefore does not require the seamless connection process procedure of Steps S37 to S41. As a result, the number of seamless connection procedure to be carried out can be reduced, which eliminates the need for operating the playback apparatus at a high clock frequency and leads to manufacturing of playback apparatuses at low cost.

Embodiment 4

The present embodiment relates to how to realize audio playback in Picture in Picture. The audio playback is specified in a STN_table in PlayList information. The following describes stream_entries for audio in a STN_table. The primary audio streams and secondary audio streams described above are assigned to primary video stream and secondary video streams, respectively. That is, the primary audio stream is used as audio source of the primary video stream while the secondary audio streams are used as audio sources of the secondary video streams. The stream_entries in the STN_table define which ones from the audios for the primary and secondary video streams are permitted for playback.

Figure 41:
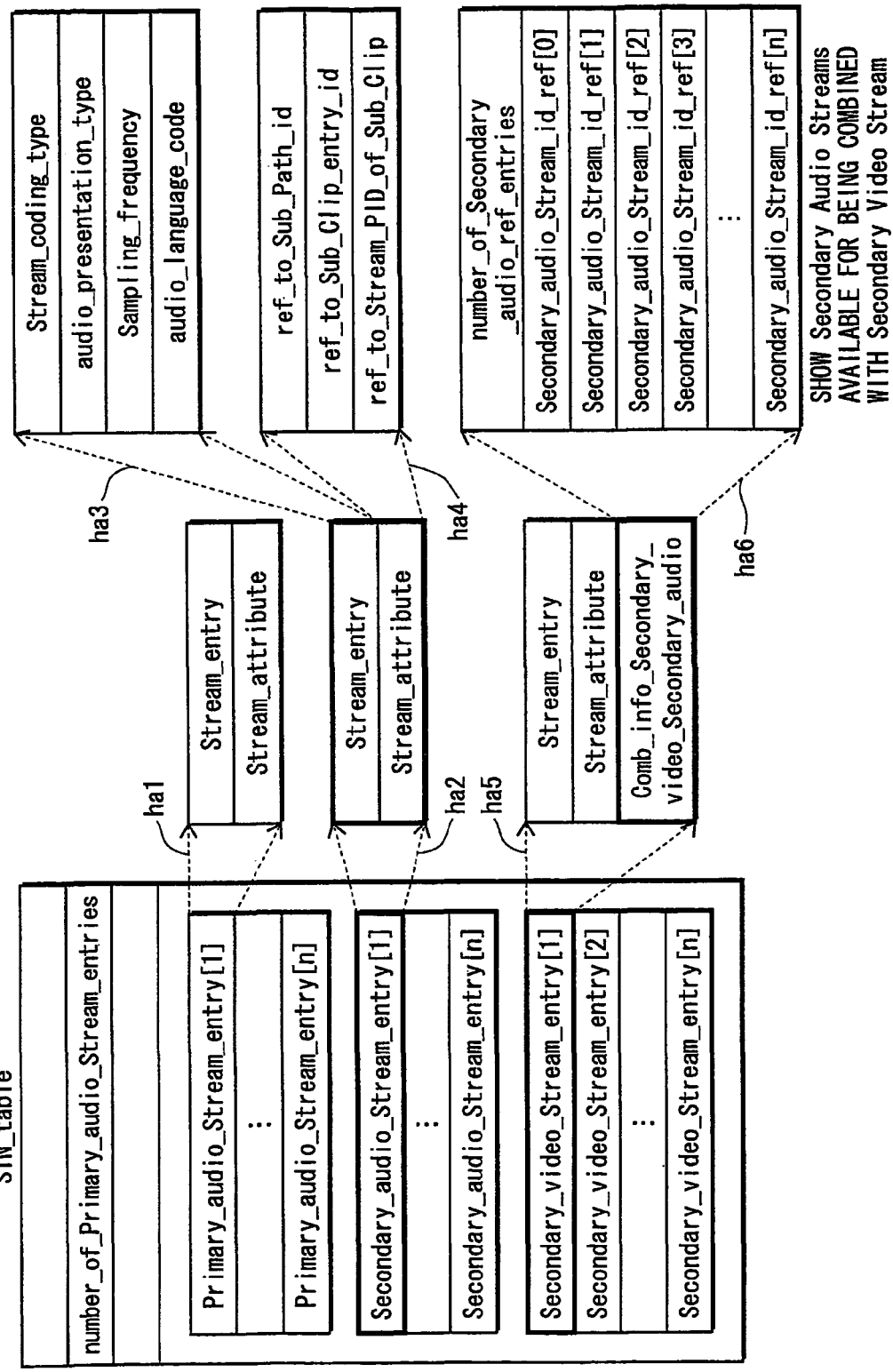
FIG. 41 shows internal structures of a Primary_audio_stream_entry and a Secondary_audio_stream_entry and an internal structure of a Comb_info_Secondary_video_Secondary_audio.

FIG. 41 shows internal structures of a Primary_audio_stream_entry and a Secondary_audio_stream_entry and an internal structure of a Comb_info_Secondary_video_Secondary_audio.

The lead lines ha1 and ha2 in the figure indicate close-ups of the internal structures of the Primary_audio_stream_entry and Secondary_audio_stream_entry. These internal structures are the same and each is composed of a stream_entry and a stream_attribute.

The lead line ha3 indicates a close-up of the internal structure of the Stream_entry. As indicated by the lead line, the Stream_entry of the primary/secondary audio stream includes: "ref_to_Sub_Path_id" indicating SubPath information that refers to the secondary audio stream; "ref_to_Sub_Clip_entry id" indicating a SubClip into which the primary/secondary audio stream is multiplexed; and "ref_to_stream_PID_of_Sub_Clip" indicating a reference value for PIDs of PES packets constituting the primary/secondary audio stream.

The lead line ha1 indicates a close-up of the internal structure of the stream_attribute. As shown by the lead line, the Stream_attribute of the primary/secondary audio stream is composed of: "stream_coding_type" indicating an encoding system of the audio stream; "audio_resentation_type" indicating a channel structure of a corresponding audio stream; "Sampling frequency" indicating a sampling frequency of a corresponding audio stream; and "audio_language code" indicating a language attribute of the audio stream.

The stream_entry for a secondary video stream has, as shown by the lead line ha5, a Comb_info_Secondary_video_Secondary_audio as information corresponding to the secondary audio stream.

The lead line ha6 shows a close-up of the internal structure of the Comb_info_Secondary_video_Secondary_audio. The Comb_info_Secondary_video_Secondary_audio is composed of: "number_of_Secondary_audio_stream_ ref_entries" indicating the total number of secondary audio streams, each of which can be combined with a secondary video stream; and "Secondary_audio_stream_id_ref[0] to [n]" indicating stream numbers of secondary audio streams able to be combined for playback of the secondary video stream.

Thus, it can be seen that the STN_table includes stream_entries for the primary audio streams which are audios of the primary video streams and stream_entries for the secondary audio streams which are audios of secondary video streams. In addition, in the stream_entries of the secondary video streams, secondary audio streams, each to be combined with a secondary video stream, are described with respect to each secondary video stream (Comb_info_Secondary_video_Secondary_audio).

Thus concludes the description of the recording medium's features for audio stream playback. The following describes features of the playback apparatus for audio stream playback.

For audio playback, within the playback apparatus, a stream number of the current primary audio stream and a stream number of the current secondary audio stream are separately stored in the PSR set 23.

<PSR1>

FIG. 42A shows the bit assignment in the PSR1.

As shown in FIG. 42A, the lower eight bits (b0-b7) among 32 bits of the PSR1 represents a stream number, and identifies one of a plurality of primary audio streams whose entries are written in the STN_table of the current Play Item. When the value set in the PSR1 changes, the playback apparatus plays a primary audio stream corresponding to the set value after the change. The PSR1 is set to "0xFF" as the initial value, and then may be set to a value ranging from "1" to "32" by the playback apparatus. The value "0xFF" is an unspecified value and indicates that there is no primary audio stream or that a primary audio stream has not been selected. When the PSR1 is set to a value ranging from "1" to "32", the set value is interpreted as a stream number of a primary audio stream.

<PSR14>

FIG. 42B shows the bit assignment in the PSR14.

As shown in FIG. 42B, the lower eight bits (b0-b7) among 32 bits of the PSR14 represents a stream number, and identifies one of a plurality of secondary audio streams whose entries are written in the STN_table of the current-Play Item. When the value set in the PSR14 changes, the playback apparatus plays a secondary audio stream corresponding to the set value after the change. The PSR14 is set to "0xFF" as the initial value, and then may be set to a value ranging from "1" to "32" by the playback apparatus. The value "0xFF" is an unspecified value and indicates that there is no secondary audio stream or that a secondary audio stream has not been selected. When the PSR14 is set to a value ranging from "1" to "32", the set value is interpreted as a stream number of a secondary audio stream.

Figure 43:
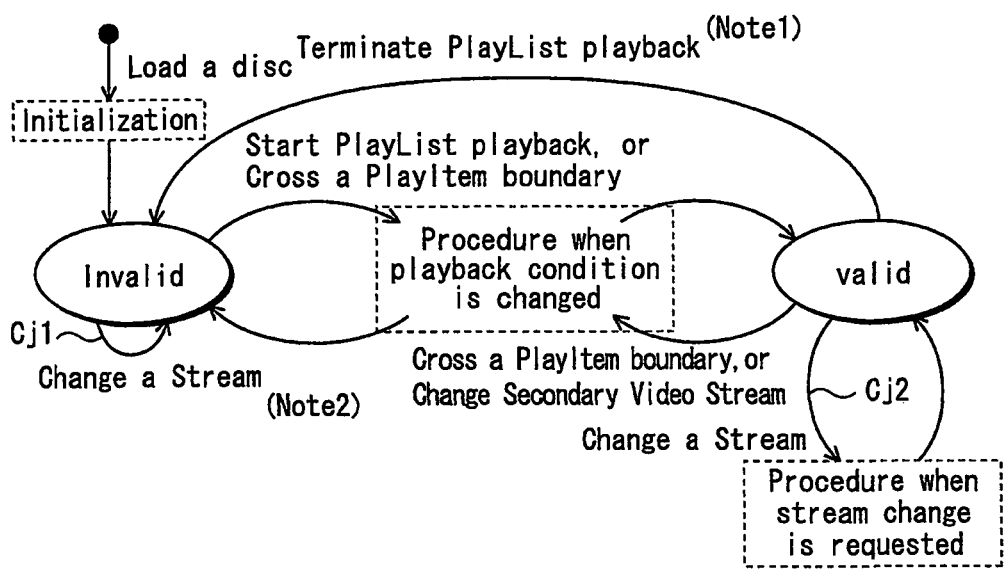
FIG. 43 shows the status transition of the secondary audio stream numbers in the PSR14.

These secondary audio stream numbers are set and updated by the procedure executing unit 42. The secondary audio stream numbers in the PSR14 shows status transition as shown in FIG. 43 by the procedure executing unit 42. FIG. 43 shows the status transition of the secondary audio stream numbers in the PSR14. In the figure, the term "valid" means that the value of the PSR14 is equal to or less than the number of entries written in the STN_table of the Play Item, and is decodable.

The term "Invalid" means that (a) the secondary audio stream number of the PSR14 is "0", (b) the secondary video stream number of the PSR14 is larger than the number of entries written in the STN_table of the Play Item, or (c) decoding is not available even if the number of entries written in the STN_table of the Play Item is in the range from "1" to "32".

The frames drawn with dotted lines in FIG. 43 schematically indicate procedures for determining the value of PSR when the status changes. The procedures for setting the PSR include "Procedure when playback condition is changed" and "Procedure when Stream change is requested". These procedures are the same as those for the secondary video streams in Embodiment 1.

The status transition is triggered by events such as "Load Disk", "Change a Stream", "Start PlayList playback", "Cross a PlayItem boundary" and "Terminate PlayList playback". These events are also the same as those for the secondary video streams in Embodiment 1.

The following describes the procedure of "Procedure when Playback condition is changed" for secondary audio streams.

Figure 44:
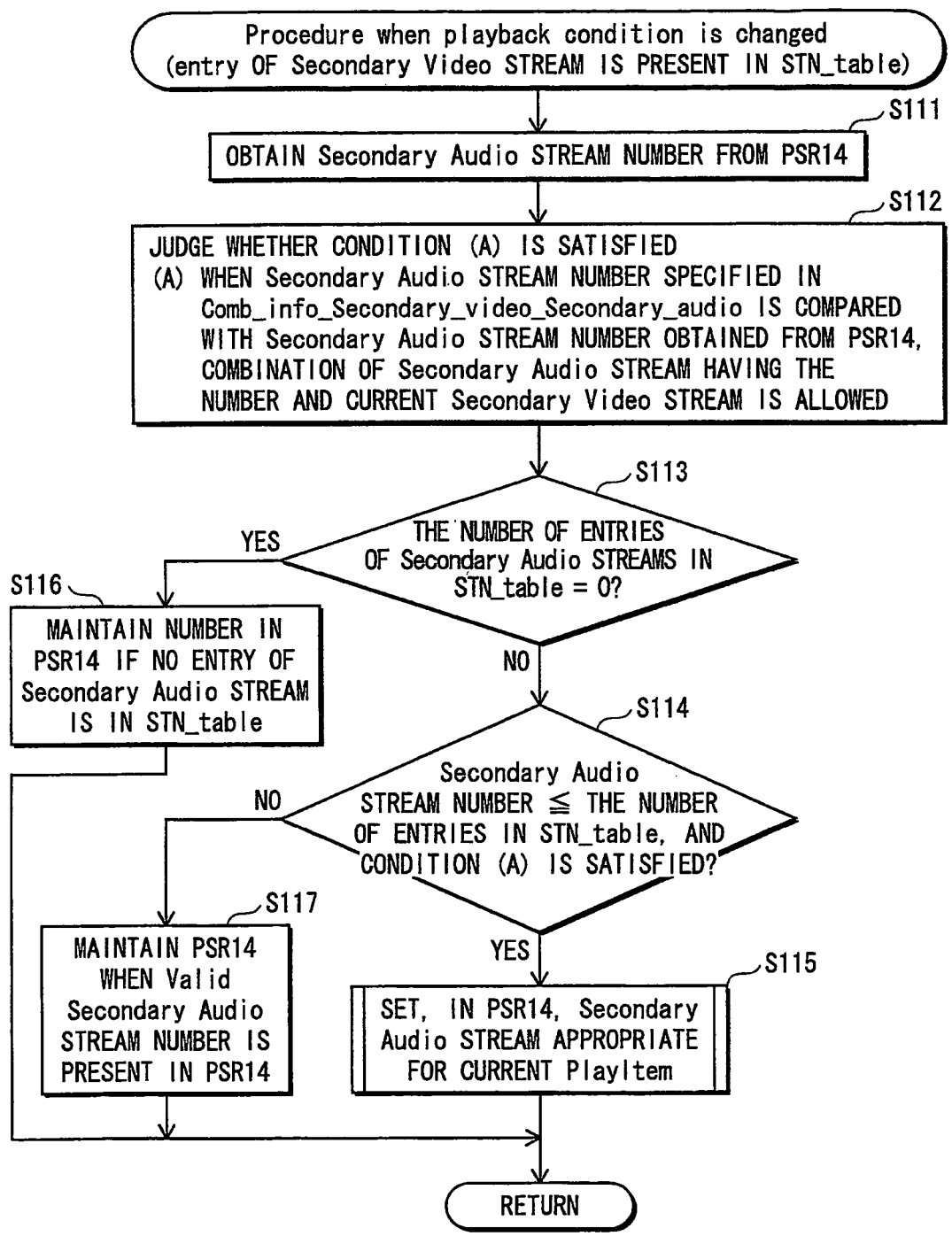
FIG. 44 is a flowchart showing a processing procedure of "Procedure when playback condition is changed" for secondary audio streams.

FIG. 44 is a flowchart showing a processing procedure of "Procedure when playback condition is changed" for secondary audio streams. The procedure executing unit 42 acquires, in Step S111, the secondary audio stream number from the PSR14, and judges, in Step S112, whether the secondary audio stream of the acquired number satisfies the following condition (A).

Condition (A): based on a comparison of the secondary audio stream number specified in the Comb_info_secondary_video_Secondary_audio and the secondary audio stream number acquired from the PSR14, the combination of the secondary audio stream with the number and the current secondary video stream is allowed.

After the judgment, the procedure executing unit 42 executes Step S113. Step S113 is a judgment step for judging whether the number of Stream_entries of the secondary audio streams for the current PlayItem is 0. When the number of Stream_entries in the STN_table is 0, the procedure executing unit 42 maintains the secondary audio stream number in the PSR14 (Step S116). If the number of Stream_entries in the STN_table is not 0, the procedure executing unit 42 performs the judgment of Step S114.

In Step S114, the procedure executing unit 42 judges whether the secondary audio stream number is equal to or less than the number of stream_entries in the STN_table of the current PlayItem and whether a secondary audio stream with the number satisfies the condition (A). If NO in Step S114, it is considered that the number of a valid secondary audio stream is present in the PSR14, and the number is maintained (Step S117). If YES in Step S114, the procedure executing unit 42 selects the most appropriate secondary audio stream for the current PlayItem (Step S115).

Thus concludes the description of "Procedure when playback condition is changed" for secondary audio streams.

Figure 45:
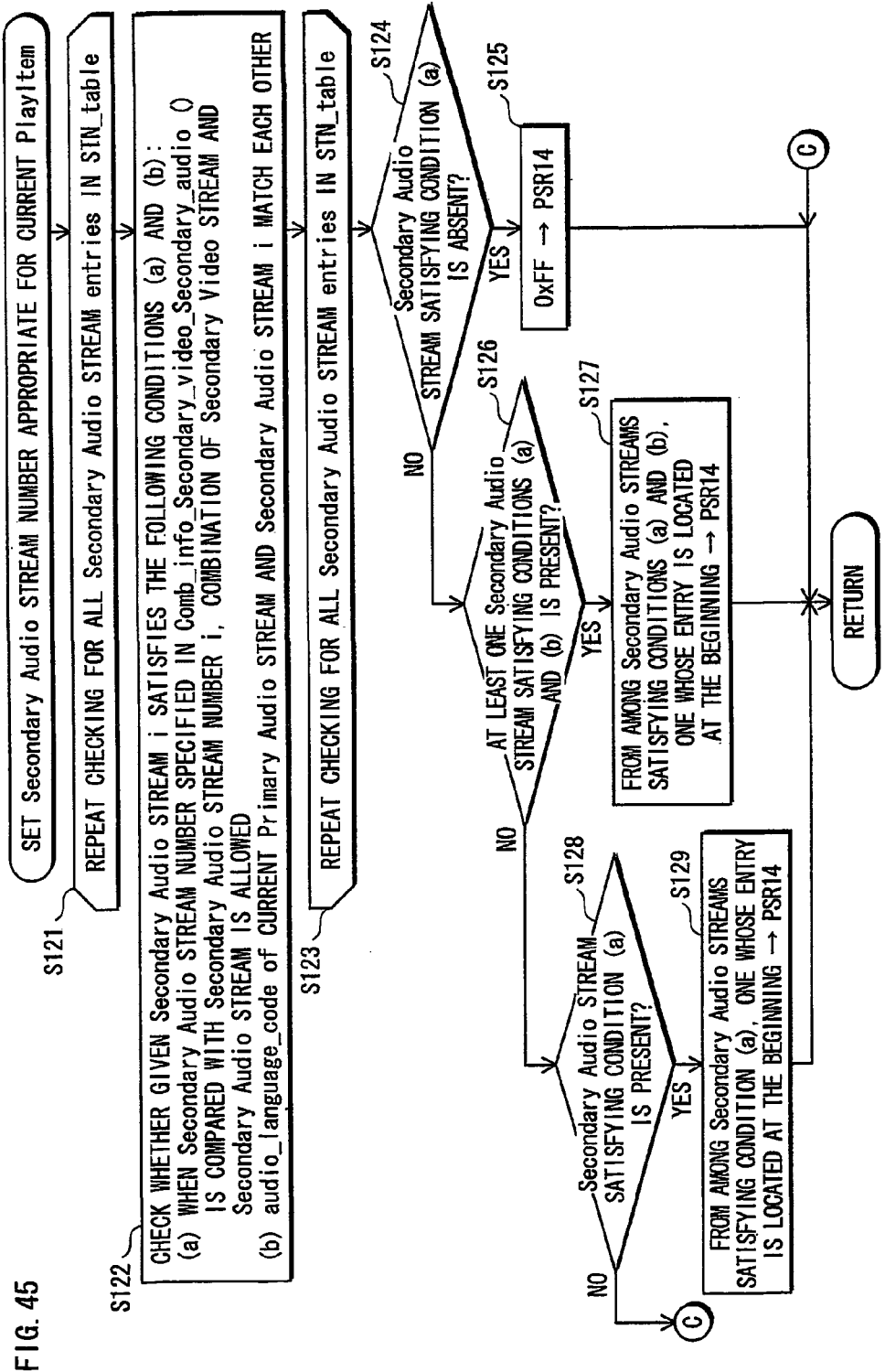
FIG. 45 is a flowchart showing a procedure for selecting the most appropriate secondary audio stream for the current PlayItem.

FIG. 45 is a flowchart showing a procedure for selecting the most appropriate secondary audio stream for the current PlayItem.

In Steps S121 to S123, the procedure executing unit 42 checks all streams written in the stream_entries of the STN_table for whether the following conditions are satisfied.

Condition (a): based on a comparison of the secondary audio stream number specified in the Comb_info_secondary_video_Secondary_audio and the number of secondary audio stream i, the combination of the secondary audio stream i and the current secondary video stream is allowed.

Condition (b): the audio_language_code of the current primary audio stream matches the audio_language_code of the secondary audio stream.

When these checks are completed for all playback-permitted secondary audio streams in the STN_table, the procedure executing unit 42 executes Step S124.

Step S124 is a judgment step for judging whether a secondary audio stream that satisfies the condition (a) is absent. If YES in Step S124, 0xFF is set in the PSR14 as the stream number of a secondary audio stream (Step S125).

When a secondary audio stream that satisfies the condition (a) is present, the procedure executing unit 42 executes the judgement of Step S126. Step S126 is for judging whether there is at least one secondary audio stream that satisfies both conditions (a) and (b). If YES in Step S126, the procedure executing unit 42 selects, from among streams satisfying the conditions (a) and (b), one whose corresponding Stream_Entry is located at the top of the STN_table, and set the stream number of the selected secondary audio stream in the PSR14 (Step S127).

When there is no secondary audio stream satisfying the conditions (a) and (b), the procedure executing unit 42 executes the judgment of Step S128. Step S128 is for judging whether one or more secondary audio streams satisfying the condition (a) is present. When YES in Step S128, the procedure executing unit 42 selects, from among the secondary audio streams satisfying the condition (a), one whose corresponding Stream_Entry comes first in the STN_table, and sets the stream number of the selected secondary audio stream in the PSR14 (Step S129).

Thus concludes the description of the procedure for selecting the most appropriate secondary audio stream.

FIG. 46 is a flowchart showing a processing procedure for secondary audio streams.

In Step S131, the procedure executing unit 42 checks whether a secondary audio stream specified by a number corresponding to the user operation (number x) satisfies the condition (A).

Condition (A): based on a comparison of the secondary audio stream number specified by the Comb_info_secondary_video_Secondary_audio and the secondary audio stream number determined by the number x, the combination of the secondary audio stream with the number x and the current secondary video stream is allowed.

If the condition (A) is satisfied, the procedure executing unit 42 executes the judgment of Step S132. Step S132 is for judging whether the number x is equal to or less than the total number of stream_entries in the STN_table and whether a secondary audio stream corresponding to the number x satisfies the condition (A). When YES in Step S132, the procedure executing unit 42 selects the secondary audio stream determined by the number x, and set the number x in the PSR14 (Step S142). If NO in Step S132, the procedure executing unit 42 performs the judgment of Step S133. Step S133 is for judging whether the number x is 0xFF. The meaning of "0xFF" is the same as that of the number x in Embodiment 1, an "entrustment number". If the number x is not 0xFF, the procedure executing unit 42 maintains the current secondary audio stream number of PSR14 (Step S143).

If the number x is 0xFF, the procedure executing unit 42 checks, in Steps S134 to S136, all secondary audio streams written in the stream_entries of the STN_table for whether the following conditions are satisfied, to thereby select the most appropriate secondary audio stream for the current PlayItem.

When a secondary audio stream to be checked is secondary audio stream i, conditions (a) and (b) are specified as follows.

Condition (a): based on a comparison of the secondary audio stream number specified in the Comb_info_secondary_video_Secondary_audio and the number of the secondary audio stream i, the combination of the secondary audio stream i and the current secondary video stream is allowed.

Condition (b): the audio_language_code of the current primary audio stream matches the audio_language_code of the secondary audio stream i.

After executing the loop processing, the procedure executing unit 42 executes the judgment of Step S137. Step S137 is for judging whether at least one stream satisfying the conditions (a) and (b) is present. When YES in Step S137, the procedure executing unit 42 selects, from among the secondary audio streams satisfying the conditions (a) and (b), one whose corresponding Stream_Entry comes first in the STN_table, and sets the stream number of the selected secondary audio stream in the PSR 14.

If NO in Step S137, the procedure executing unit 42 judges Whether one or more secondary audio streams satisfying the condition (a) are present in Step S139. When YES in Step S139, the procedure executing unit 42 selects in Step S140, from among the secondary audio streams satisfying the condition (a), one whose corresponding Stream_Entry comes first in the STN_table, and sets the stream number of the selected secondary audio stream in PSR14. If NO in Step S139, the procedure executing unit 42 maintains the secondary audio stream number of PSR14 (Step S141).

Thus concludes the description of "Procedure when stream change is requested" for secondary audio streams.

Thus concludes the procedures performed by the procedure executing unit 42 of the present embodiment. The following describes the mixing control unit 45, which is a feature of the audio stream playback.

The mixing control unit 45 controls the mixer 9a to mix the playback outback of the primary audio stream of the audio decoder 8a and the playback output of secondary audio streams of the audio decoder 8b.

When the current playback time point in the PlayItem time axis is in a period from In_time to Out_time of the SubPlayItem information, and when the secondary audio stream is set as "playback permitted" in the STN_Table of the current PlayItem information, the mixing control unit 45 controls the mixer 9a to mix the playback output of the audio decoder 7a with the playback output of the audio decoder 7b because the audio decoder 7b is decoding the secondary audio stream having the stream number stored in PSR14.

If the attribute of the primary audio stream is "surround", the playback output of the secondary audio stream can be mixed after a downmixing is performed such that only desired components are held among components such as L, R, C, LS, RS, LR, RR, and LFE. Here, when the secondary audio stream is, for example, a commentary of the movie director, by changing the channel of the primary audio stream, with which the secondary audio stream is to be mixed, from L to C and to R, it is possible to give the user a sensation as if the director is waking around the user. Such mixing is called panning. In panning, the sound/voice of a secondary audio stream (for example, monaural) with a less number of channels than a primary audio stream is used.

Thus, according to the present embodiment, playback-permitted combinations of primary audio streams for the primary video stream and secondary audio streams for the secondary video streams are defined in the STN_table. Then, the mixing is performed by selecting one from each of the primary audio streams and the secondary audio streams from the stream_entries in the STN_table. As a result, at the execution of Picture in Picture, it is possible to provide composite audio where the commentary of the movie director is added to the audio of the main movie.

For example, assume that the secondary video is a video in which only the movie director and/or cast appear and they are acting, for example, as if pointing at video contents of the primary video. By combining a secondary video of the video contents and a secondary video of the movie director's commentary in Picture in Picture, it is possible to realize an amusing screen effect where the movie director and/or cast are giving commentary while pointing at the contents in the playback video of the movie.

Embodiment 5

The present embodiment relates to an improvement in subtitle playback in Picture in Picture. The subtitle playback is specified in the STN_table of the PlayList information. The following describes stream_entries for subtitles in the STN_table. Although the primary audio streams and secondary audio streams are assigned to primary video stream and secondary video streams, respectively, subtitles are not classified into ones for primary video streams and ones for secondary video streams, yet still can be differentiated into Presentation Graphics streams and textST streams.

Figure 47:
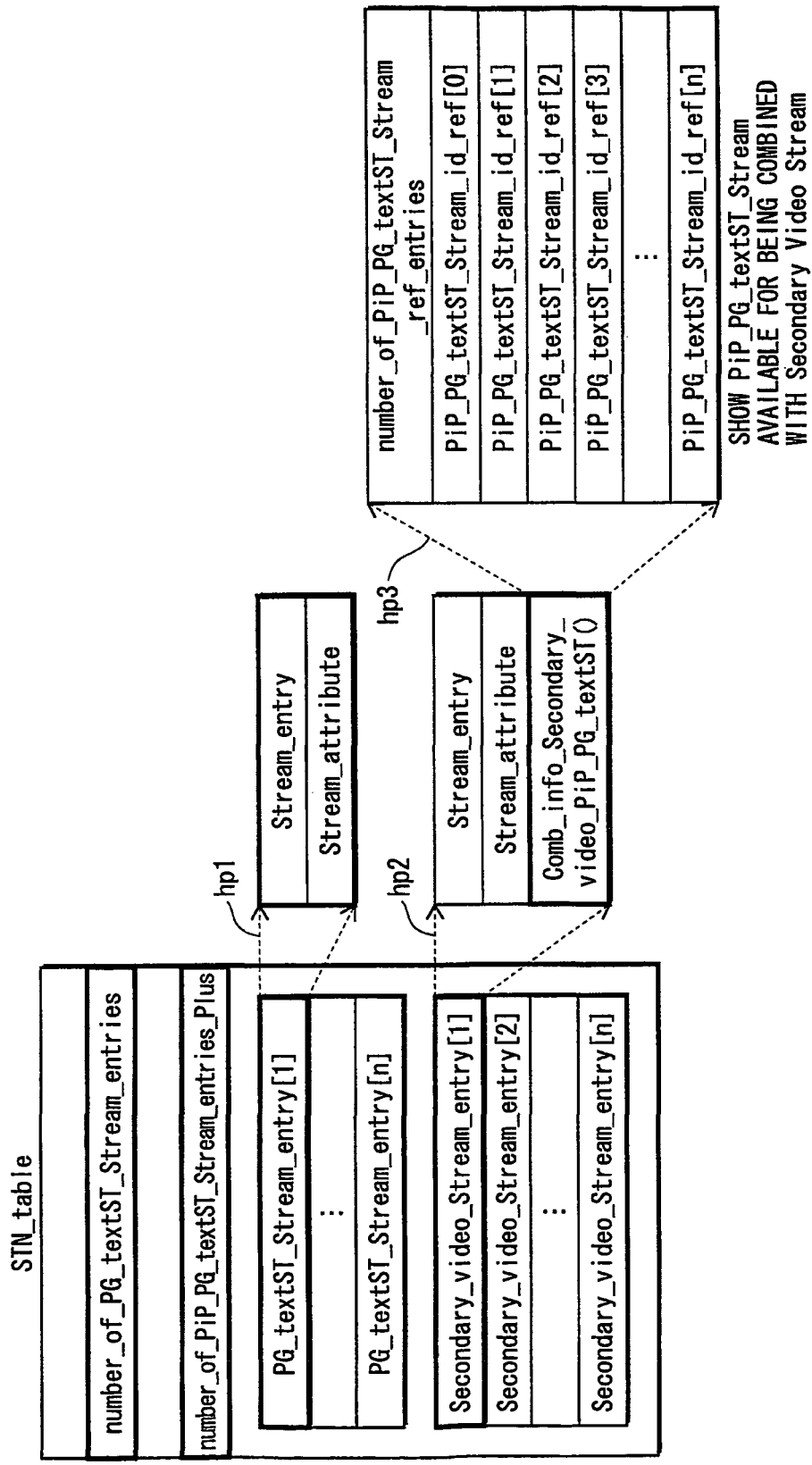
FIG. 47 shows part of the STN_table, especially related to the PGtestST streams.

The following describes stream_entries for PgtestST streams. FIG. 47 shows part of the STN_table, especially related to the PgtestST streams. According to the figure, components of the STN_table especially related to subtitle display are: "number_of_PG_textST_streams_entries[1] to [n]"; "number_of_PiP_PG_textST_stream_entries_plus"; "PgtestST_stream_entry" and "Comb_info_Secondary_video_PiP_PG_textST" in "Secondary_video_Stream_entry".

"number_of_PG_textST_streams_entries" indicates the number of PgtestST streams which are selecting targets when Picture in Picture is not being performed.

"number_of_PiP_PG_textST_stream_entries_plus" indicates the number of Presentation Graphics streams and textST streams that should be added to the number_of_PiP_PG_textST_stream_entries defined in the STN_table for a Picture in Picture application. The sum of the number_of_PG_textST_streams_entries and the number_of_PiP_PG_textST_stream_entries_plus is 255 or less.

Here, when the number_of_PG_textST_streams_entries is n1, the stream numbers from 1 to n1 become the range of the PGtextST streams.

On the other hand, when the number_of_PiP_PG_textST_stream_entries_plus is n2, the stream numbers from 1 to n1+n2 become the range of the PGtextST streams. That is, if the number_of_PiP_PG_textST_stream_entries_plus is written in the STN_table, the range of the stream numbers of the PGTextST streams widens by the number written in the number_of_PiP_PG_textST_stream_entries_plus.

When Picture in Picture is not being performed, 1 to n1 among the stream_entries of the PGtestST streams become selecting targets. When Picture in Picture is being performed, 1 to n1+n2 among the stream_entries of the PGtestST streams become selecting targets. Note that, even if Picture in Picture is performed, it is not that a subtitle for the primary video and a subtitle for the secondary video are separately played. Only one of the primary video subtitle and secondary video subtitle is displayed in Picture in Picture. This is based on two reasons: (i) if the primary video subtitle and the secondary video subtitle are separately recorded on the BD-ROM, the playback apparatus needs to have two decoders for graphics, which leads to an increase in hardware cost; and (ii) if scaled down for the secondary video, the subtitle will be hard to see.

The lead line hp1 indicates a close-up of the internal structure of the PG_testST_Stream_entry. As shown by the lead line, the PG_testST_Stream_entry is composed of a Stream_entry and a Stream_Attribute, and the Stream_entry includes a PID of a playback-permitted PGtestST stream.

The lead line hp2 indicates a close-up of the internal structure of "Secondary_video_Stream_entry[1]". In the Comb_info_Secondary_video_PiP_PG_textST of the internal structure, PGtestST streams which are allowed to be composed with secondary video stream are uniquely indicated.

The lead line hp3 indicates the internal structure of the Comb_info_SEcondary_video_PiP_PG_textST. The Comb_info_SEcondary_video_PiP_PG_textST is composed of: "number_of_PiP_PG_textST_stream_ref_entries" indicating the total number of PiP_PG_textST streams, each of which can be combined with a secondary video stream; and "PiP_PG_textST_stream_id_ref[0] to [n]" indicating stream numbers of the PiP_PG_textST streams which can be combined for playback.

Thus concludes the description of the improvement in the recording medium of the present embodiment. The following describes an improvement in the playback apparatus of the present embodiment. For subtitle playback, within the playback apparatus, a stream number of the current PGTextST stream for Picture in Picture execution and a stream number of the current PGTextST stream for Picture in Picture nonexecution are separately stored in the PSR set 23.

FIG. 48A shows the range of stream numbers that the stream number of the current PGtestST stream can possibly take. If PiP_PG_text_ST_stream_number is n1, the stream number of the current PGtestST stream takes a value ranging from 1 to n1, as shown in the upper part of the figure, when Picture in Picture is not being executed.

On the other hand, the number of the current PGtestST stream for Picture in Picture execution is called PiP_PG_TextST stream number, and if the PG_text_ST_stream_number written in the STN_table is n1 and the number_of_PiP_PG_textST_stream_entries_plus is n2, the PiP_PG_TextST stream number takes a value ranging from 1 to n1+n2, as shown in the lower part of the figure.

FIG. 48B shows the bit assignment in the PSR2. The following explains each bit of the PSR2.

disp_s_flag b31 of the PSR2 is disp_s_flag, and a value set in the one bit is interpreted as follows:

0*b*: display of both "PG textST stream" and "PiP PG textST stream" is disabled; and 1b: display of both "PG textST stream" and "PiP PG textST stream" is enabled.

PiP_PG_textST_valid_flag b30 of the PSR2 is PiP_PG_textST_valid_flag, and a value set in the one bit is interpreted as follows:

0b: when a secondary video stream is displayed during the display of the current PlayItem, the PG TextST Stream Number defined in the PSR2 is used; and 1b: when a secondary video stream is displayed during the display of the current PlayItem, the PiP PG TextST Stream Number defined in the PSR2 is used.

When a secondary video stream is not displayed during the display of the current PlayItem, the PiP_PG_textST_valid_flag does not have an effect on the display of the BD-ROM playback apparatus. In this case, the PG TextST Stream Number defined in the PSR2 is used.

PG TextST Stream Number:

b0 to b11 of the PSR2 are the PG TextST Stream Numbers, and values set in the twelve bits are interpreted as follows:

When a secondary video stream is not displayed during the display of the current PlayItem ("when a secondary video stream is not displayed" means that the disp_v_flag of the PSR14 is set to 0b), the value of the PG TextST Stream Number in the PSR2 is used to determine that either one of the PG stream and the TextST stream out of the PGTextST streams in the STN_table of the current PlayItem is displayed.

PiP PG TextST Stream Number:

b16 to b27 of the PSR2 are the PiP PG TextST Stream Number, and a value set in the twelve bits are interpreted as follows:

When a secondary video stream is displayed during the display of the current PlayItem and the PiP_PG_textST_valid_flag of the PSR2 is set to 1b ("when a secondary video stream is displayed" means that the disp_v_flag of the PSR14 is set to 1b, and the secondary video stream determined by the PSR14 is displayed during the display of the current PlayItem), the value of the PiP PG TextST Stream Number in the PSR2 is used to determine that either one of the PG stream and the TextST stream out of the PGTextST streams in the STN_table of the current PlayItem is displayed.

Stream numbers of the PGtestST streams for Picture in Picture nonexecution and the handling of these are not the focus of the present invention, and their descriptions are therefore omitted here in the present embodiment.

Figure 49:
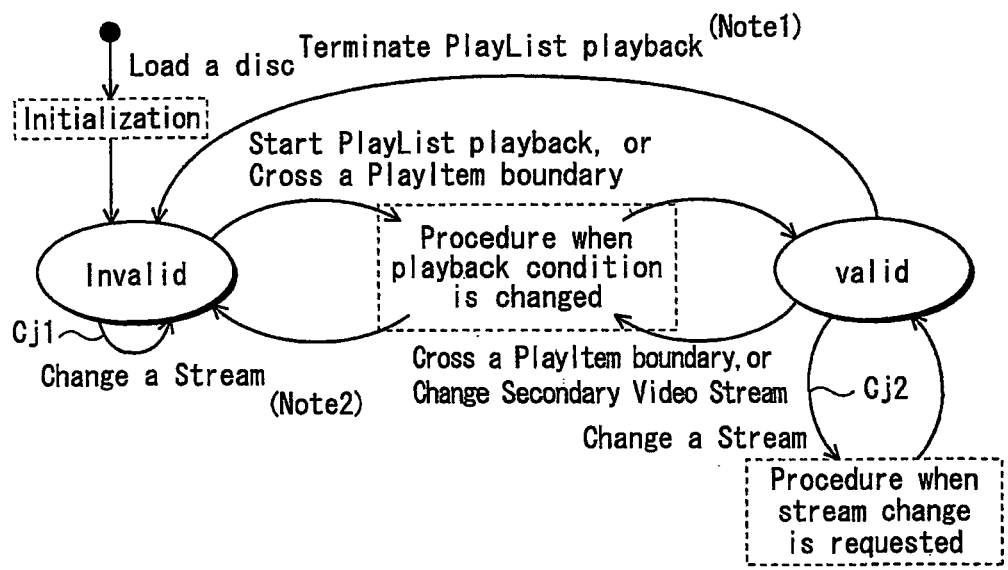
FIG. 49 shows status transition of the PiP_PG_TextST stream numbers which are stream numbers of Picture in Picture PGtestST streams.

FIG. 49 shows the status transition of the PiP_PG_TextST stream numbers which are stream numbers of Picture in Picture PGtestST streams. In the figure, the term "valid" means that the value of the PiP_PG_TextST stream number of the PSR2 is equal to or less than the number of entries written in the STN_table of the Play Item, and is decodable.

The term "Invalid" means that (a) the PiP_PG_TextST stream number of the PSR2 is "0", (b) the PiP_PG_TextST stream number of the PSR2 is more than the number of entries written in the STN_table of the Play Item, or (c) decoding is not available even if the number of entries written in the STN_table of the Play Item is in the range from "1" to "32".

The frames drawn with dotted lines in FIG. 49 schematically indicate procedures for determining the value of PSR when the status changes. The procedures for setting a PGTextST stream number to the PSR2 include "Procedure when playback condition is changed" and "Procedure when Stream change is requested".

The "Procedure when playback condition is changed" and "Procedure when Stream change is requested" as indicated by the frames drawn with dotted lines are the same as those for the secondary video streams in Embodiment 1.

The status transition is triggered by events such as "Load Disk", "Change a Stream", "Start PlayList playback", "Cross a PlayItem boundary" and "Terminate PlayList playback". These events are also the same as those for the secondary video streams in Embodiment 1.

The following describes a processing procedure of "Procedure when stream change is requested".

Figure 50:
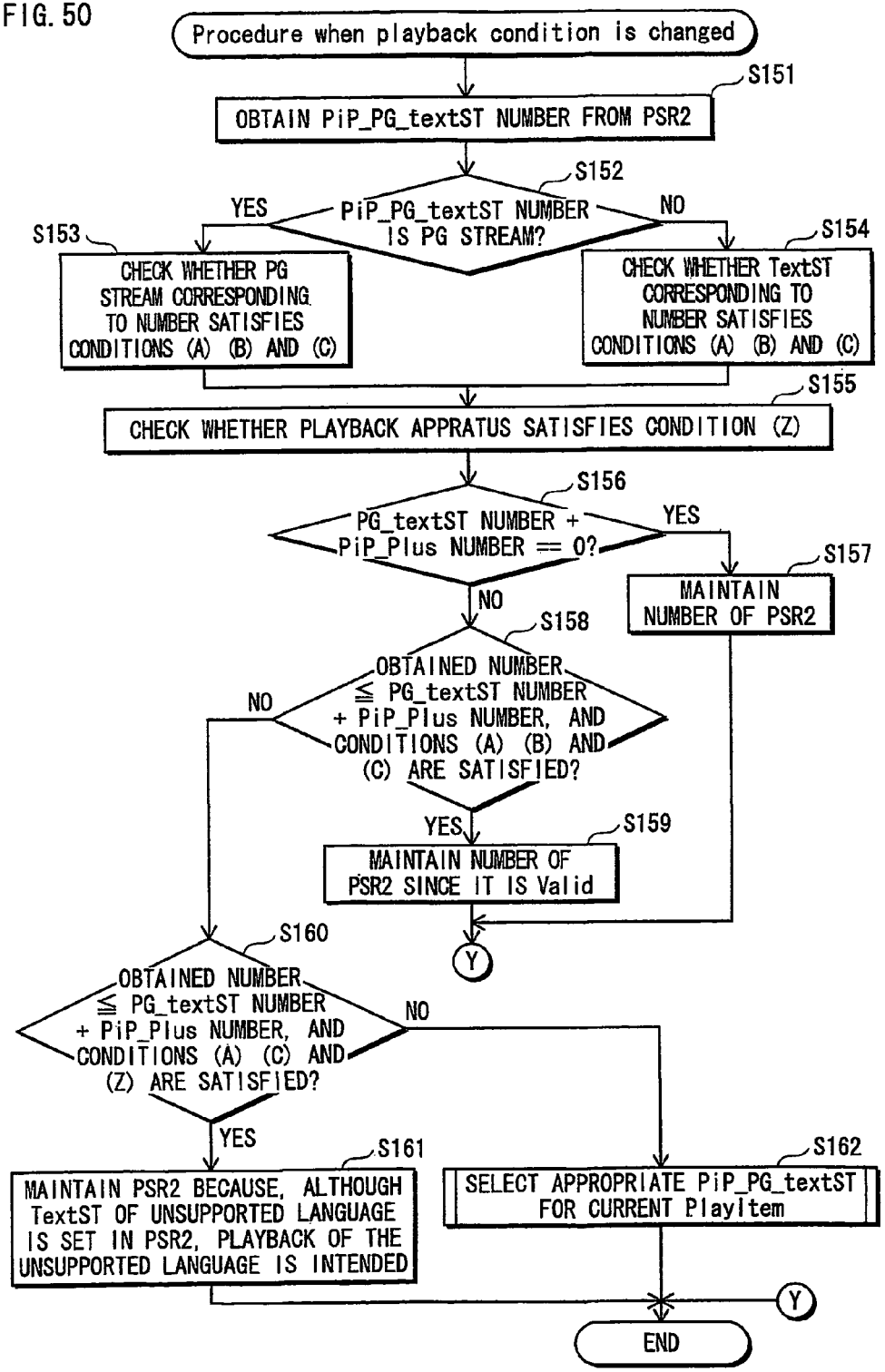
FIG. 50 is a flowchart showing the processing procedure of the "Procedure when stream change is requested" for PGtestST streams.

FIG. 50 is a flowchart showing the processing procedure of the "Procedure when stream change is requested" for PGtestST streams.

The procedure executing unit 42 obtains the current PiP_PG_TextST stream number from the PSR2 in Step S151, and judges whether the current PiP_PG_TextST stream number is for either the Presentation Graphics stream or the textST stream in Step S152. In Step S153, the procedure executing unit 42 judges whether a Presentation Graphics stream corresponding to the current PiP_PG_TextST stream number satisfies conditions (A), (B) and (C).

Here, the conditions (A), (B) and (C) are specified as follows.

Condition (A): the playback apparatus is capable of decoding a Presentation Graphics stream specified by the number of the current PiP_PG_TextST stream number;

Condition (B): the playback apparatus is capable of playing a specified language; and Condition (C): based on a comparison of the secondary video stream number in the PSR14 and, the PGtextST stream number of comb_info_Secondary_video_PiP_textST( ), a combination of the current secondary video stream and a PGtextST stream specified by the current PiP_PG_TextST stream number is allowed.

On the other hand, in Step S154, the procedure executing unit 42 judges whether a textST stream corresponding to the current PiP_PG_TextST stream number satisfies Conditions (A), (B) and (C).

Condition (A): the playback apparatus is capable of converting character codes of the textST stream of the current PiP_PG_TextST stream number into bitmap. Such a playback capability is indicated in the PSR30 of the PSR set 23.

Condition (B): the playback apparatus is capable of supporting language attributes of the textST stream of the current PiP_PG_TextST stream number. Such support capability is indicated in the PSR48 to PSR61 of the PSR set 23.

Condition (C): based on a comparison of the secondary video stream number in the PSR14 and the PGtextST stream number of the comb_info_Secondary_video_PiP_textST( ), a combination of the current secondary video stream stored in the PSR14 and the PGtextST stream specified by the current PiP_PG_TextST stream number is allowed.

Here, when a subtitle in some language is expressed by a textST stream, the playback apparatus must have a capability of converting the character codes into bitmap and a support capability of supporting the language attributes in order to "be able to decode" textST streams in the language.

Here, English, Japanese and Arabic are taken, as examples. Regarding English subtitles, the playback apparatus is considered to support the language attributes only when it has functions of "horizontal writing", "kerning" and "double letter/ligature".

Regarding Japanese subtitles, the playback apparatus is considered to support the language attributes only when it has functions of "horizontal writing", "vertical writing", "line end wrap", and "ruby".

Regarding Arabic subtitles, the playback apparatus is considered to support the language attributes only when it has functions of "right-to-left writing" and "double letter/ligature".

When the playback apparatus is able to convert textST streams in some language into bitmap and support the language attributes, it is considered that the above-mentioned conditions (A) and (B) are satisfied. When the playback apparatus can convert the textST streams in the language into bitmap, yet cannot support the language attributes, it is considered that the condition (B) is not satisfied while only the condition (A) is satisfied.

After completing, the above judgments, the procedure executing unit 42 executes Step S155. Step S155 is a step for judging whether the playback apparatus satisfies condition (Z).

Here, the condition (Z) is that the user intends playback of a subtitle in an unsupported language. This intention is indicated in the PSR30 of the PSR set 23.

Subsequently, the procedure executing unit 42 executes the judgment step of Step S156. This is a step for judging whether the sum of the number_of_PG_textST_streams_entries and, the number_of_PiP_PG_textST_stream_entries_plus in the STN_table of the current PlayItem is "0". When there is no playback-permitted PGTextST stream in the STN_table, the procedure executing unit 42 maintains the PGTextST stream number of the PSR2 (Step S157). When at least one playback-permitted PGTextST stream in the current STN_table is present, the procedure executing unit 42 executes Step S158. This is a step for checking whether the current PiP_PG_TextST stream number is valid, and the procedure executing unit 42 judges whether the current PiP_PG_TextST stream number is equal to or less than the total number of the stream_entries in the STN_table and whether the current PiP_PG_TextST stream number satisfies the conditions (A), (B) and (C).

When YES in Step S158, the procedure executing unit 42 maintains the value in the PSR2, considering that a valid PiP_PG_TextST stream number is already set in the PSR2 (Step S159).

If NO in Step S158, the procedure executing unit 42 executes the judgement step of Step S160. This is a step for judging whether the current PiP_PG_TextST stream number is equal to or less than the total number of the stream_entries in the STN_table and whether the current PiP_PG_TextST stream number satisfies the condition (A). If YES in Step S160, the procedure executing unit 42 maintains the value in the PSR2 because, although a PiP_PG_TextST stream number for a text subtitle in an unsupported language is set in the PSR2, the user intends the playback of the unsupported language (Step S161). When NO in Step S160, the procedure executing unit 42 selects the most appropriate stream for the current PlayItem (Step S162).

Thus concludes the description of "Procedure when playback condition is changed" for PGTextST streams.

Figure 51:
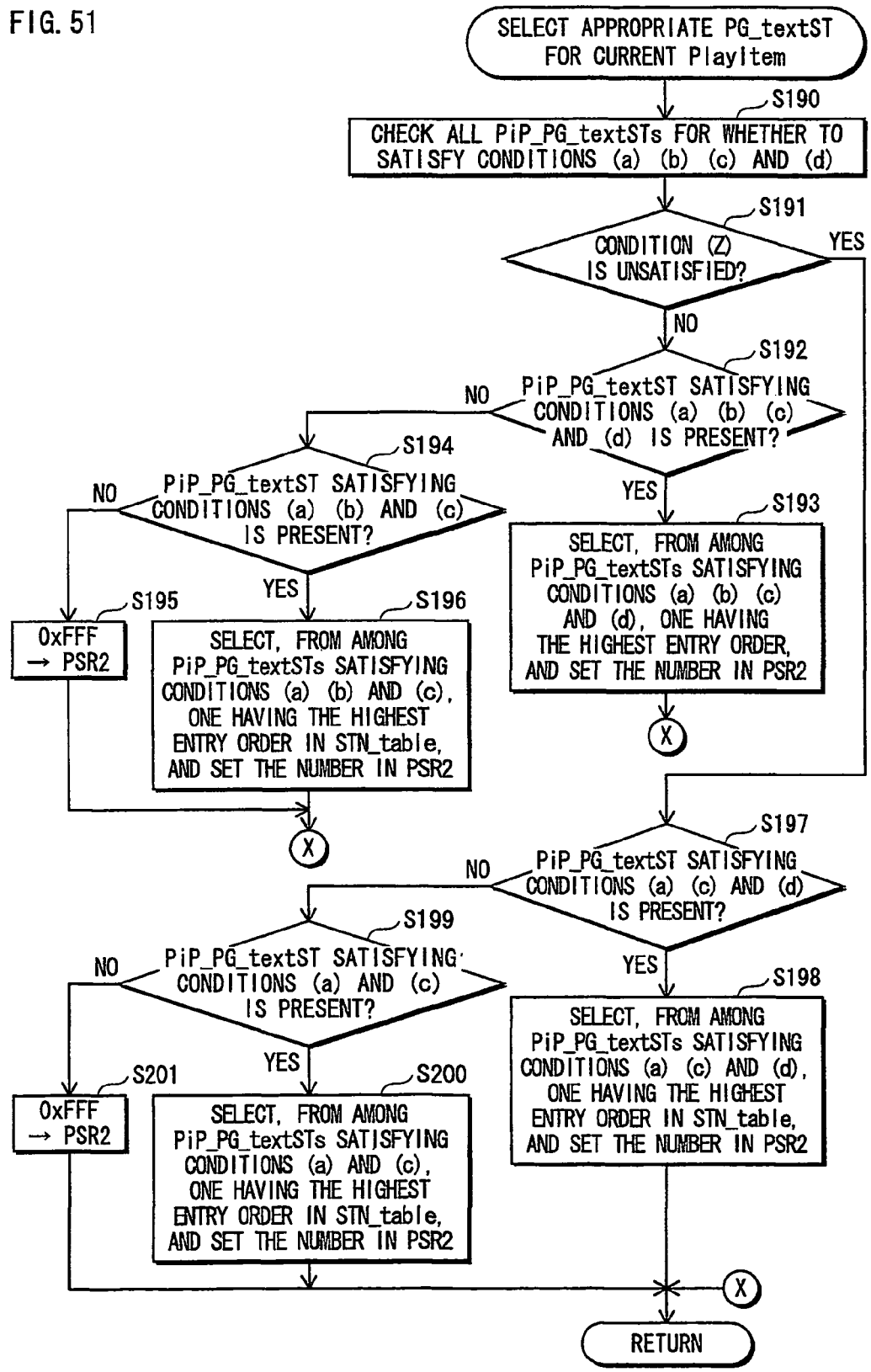
FIG. 51 is a flowchart showing a processing procedure for selecting the most appropriate PGTextST stream for the current PlayItem.

FIG. 51 is a flowchart showing a processing procedure for selecting the most appropriate PGTextST stream for the current PlayItem.

The procedure executing unit 42 checks, in Step S190, all PGTextST streams for whether to satisfy conditions (a) to (d).

When a Presentation Graphics stream to be checked is Presentation Graphics stream i, the conditions (a) to (d) are specified as follows.

Condition (a): the playback apparatus is capable of decoding the Presentation Graphics stream i;

Condition (b): the playback apparatus is capable of playing a language specified by the Presentation Graphics stream i;

Condition (c): based on a comparison of the secondary video stream number in PSR14 and the PGtextST stream number of the comb_info_Secondary_video_PiP_textST( ) a combination of the current secondary video stream and the Presentation Graphics stream i is allowed; and Condition (d): the PG_language_code of the Presentation Graphics stream i matches the language setting on the playback apparatus.

When a textST stream to be checked is Presentation Graphics stream i, the conditions (a) to (d) are specified as follows.

Condition (a): the playback apparatus is capable of converting character codes of the textST stream i into bitmap;

Condition (b): the playback apparatus is capable of supporting language attributes of the textST stream i;

Condition (C): based on a comparison of the secondary video stream number in the PSR14 and the number of the PGtextST stream i of the comb_info_Secondary_video_PiP_textST( ), a combination of the current secondary video stream and the textST stream i specified by the PiP_PG_TextST stream number is allowed.

Condition (d): the textST language_code of the testST stream i matches the language setting on the playback apparatus.

After completing the above judgments, the procedure executing unit 42 judges, in Step S191, whether the playback apparatus satisfies the condition (Z) described in the previous flowchart (i.e. playback of the unsupported language). When NO in Step S191, the procedure executing unit 42 judges, in Step S192, whether there are one or more PGTextST streams that satisfy the conditions (a) to (d). If YES in Step S192, the procedure executing unit 42 selects, from among the PGTextST streams satisfying the conditions (a) to (d), one whose corresponding Stream_Entry comes first in the STN_table, and sets the stream number of the selected PiP_PG_TextST stream number in the PSR2 (Step S193).

When NO in Step S192, the procedure executing unit 42 judges whether there are one or more PGTextST streams satisfying an eased condition. Here, the eased condition means to satisfy the three conditions (a), (b) and (c), and the procedure executing unit 42 judges, in Step S194, whether there are one or more PGTextST streams satisfying the eased condition. If YES in Step S194, the procedure executing unit 42 selects, from among the PiPPGtestST streams satisfying the conditions (a), (b) and (c), one whose corresponding Stream_Entry comes first in the STN_table, and sets the selected PiP_PG_TextST stream number in the PSR2 (Step S196).

When NO in Step S194, the procedure executing unit 42 sets 0xFFF to the PSR2 as the PiP_PG_TextST stream number (Step S195). When judging, in Step S191, that the playback apparatus satisfies the condition (Z), the procedure executing unit 42 judges, in Step S197, whether there are one or more PGTextST streams satisfying another eased condition. Here, another eased condition means to satisfy the conditions (a), (c) and (d), and the procedure executing unit 42 judges, in Step S198, whether there are one or more PGTextST streams satisfying the eased condition.

If YES in Step S197, the procedure executing unit 42 selects, from among the PGTextST streams satisfying the conditions (a), (c) and (d), one whose corresponding Stream_Entry comes first in the STN_table, and sets the stream number of the selected PiP_PG_TextST stream number in the PSR2 (Step S198).

When NO in Step S197, the procedure executing unit 42 judges, in Step S199, whether there are one or more PGTextST streams satisfying the conditions (a) and (c). If YES in Step S199, the procedure executing unit 42 selects, from among the PiP_PGtestST streams satisfying the conditions (a) and (c), one whose corresponding Stream_Entry comes first in the STN_table, and sets the number of the selected PiP_PG_TextST stream in the PSR2 (Step S200). When NO in Step S199, the procedure executing unit 42 sets 0xFFF in the PSR2 (Step S201).

Thus concludes the description of the procedure for selecting the most appropriate PGTextST stream.

Figure 52:
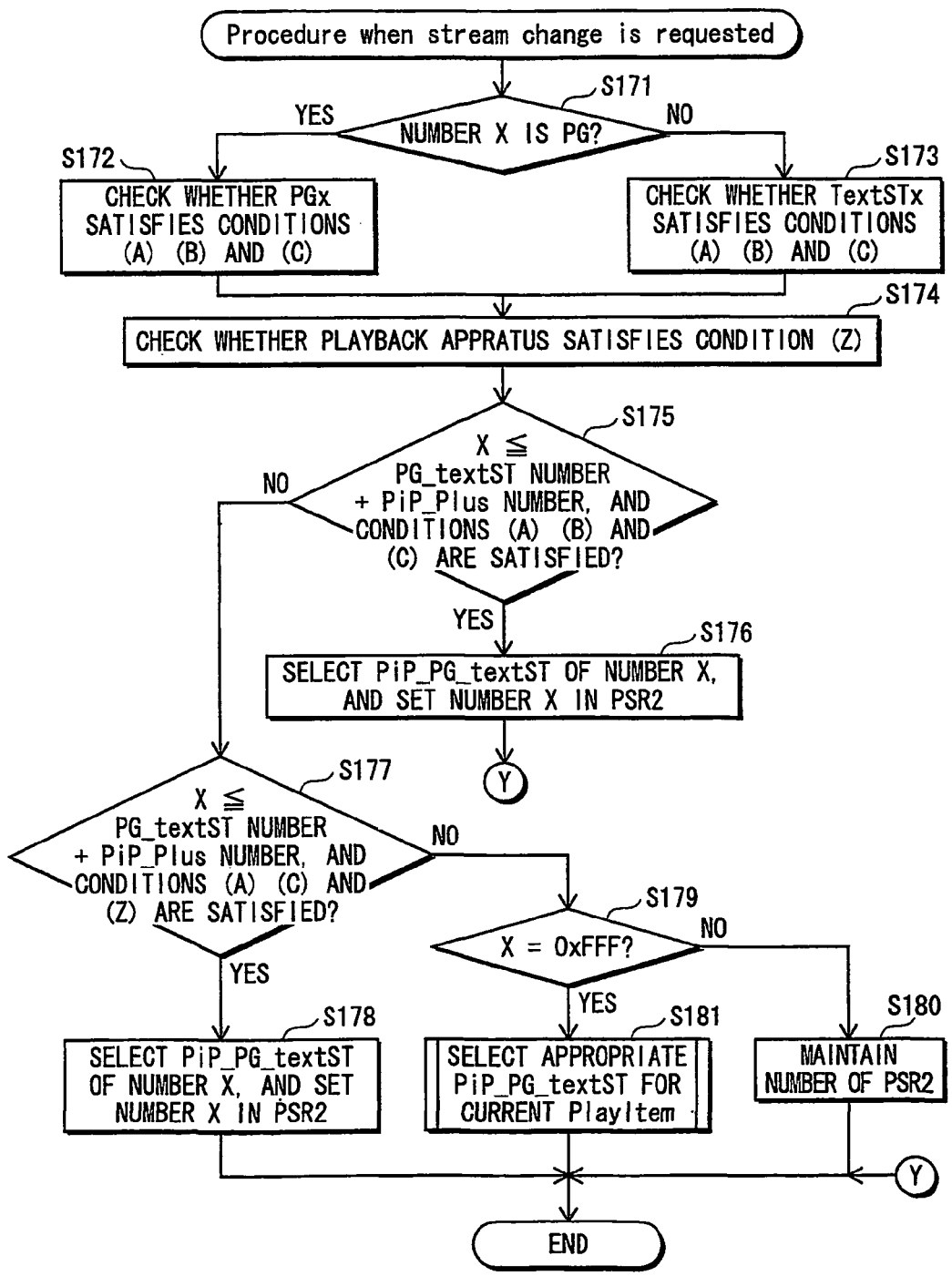
FIG. 52 is a flowchart showing a processing procedure of "Procedure when stream change is requested" for PGTextST streams.

FIG. 52 is a flowchart showing a processing procedure of "Procedure when stream change is requested" for PGTextST streams.

In Step S171, the procedure executing unit 42 judges that the number x obtained in response to the user operation indicates either the PiP_PG_TextST stream number for a Presentation Graphics stream or the PiP_PG_TextST stream number for a textST stream. In Step S172, the procedure executing unit 42 judges whether the presentation Graphics stream corresponding to the number x satisfies the following conditions (A), (B) and (C).

Condition (A): the playback apparatus is capable of decoding the Presentation Graphics specified by the number x;

Condition (B): the playback apparatus is capable of playing a language which is an attribute of the specified Presentation Graphics stream; and Condition (C): based on a comparison of the secondary video stream number in the PSR14 and the PGtextST stream number of the comb_info_Secondary_video_PiP_textST( ), a combination of the current secondary video stream and the PGtextST stream specified by the number x is allowed.

In Step S173, the procedure executing unit 42 checks whether the textST stream corresponding to the number x satisfies the following conditions (A), (B) and (C).

Condition (A): the playback apparatus is capable of converting character codes of the textST stream corresponding to the number x into bitmap;

Condition (B): the playback apparatus is capable of supporting language attributes of the textST stream corresponding to the number x; and Condition (C): based on a comparison of the secondary video stream number in the PSR14 and the PGtextST stream number of the comb_info_Secondary_video_PiP_textST( ), a combination of the current secondary video stream and the PGtextST stream specified by the number x is allowed.

The procedure executing unit 42 checks, in Step S174, whether the playback apparatus satisfies the condition (Z), and performs the judgement of Step S175. This judgment is for judging whether the number is equal to or less than the total number of the stream_entries in the STN_table and whether the number satisfies the condition (A). When YES in Step S175, the procedure executing unit 42 selects a PGTextST stream of the PiP_PG_TextST stream number, which is the number x, and sets the number in the PSR2 (Step S176).

When NO in Step S175, the procedure executing unit 42 performs the judgment of Step S177. This judgment is for judging whether the number is equal to or less than the total number of the stream_entries in the STN_table and whether the number satisfied the condition (A) (C) and (Z). When YES in Step S177, the procedure executing unit 42 selects a PiP_PGTextST stream corresponding to the number x, and sets the PiP_PG_TextST stream number in the PSR2 (Step S178).

If NO in Step S177, the procedure executing unit 42 performs the judgment of Step S179. The judgment is for judging whether the number x is 0xFFF. When NO in Step S179, the procedure executing unit 42 maintains the value in the PSR 2, assuming that there is no PGTextST stream permitted for playback in the STN_table (Step S180).

If the number x is 0xFFF, the procedure executing unit 42 selects the most appropriate PGTextST stream for the current PlayItem (Step S181). The selection of the most appropriate PGTextST stream is the same as shown in FIG. 51.

Thus concludes the description of the "Procedure when stream change is requested" for PGTextST stream.

Thus, according to the present embodiment, when Picture in Picture is valid, a PiP_PG_TextST stream number is selected from the numeric range which is obtained by adding the number_of_PG textST_streams_entries and the number_of_PiP_PG_text_stream_entries_plus, and either the Presentation Graphics stream or the textST stream corresponding to the PiP_PG_TextST stream number is played. As a result, it is possible to play a subtitle suitable for the primary video stream together with videos in one instance and to play a subtitle suitable for the secondary video stream together with videos in another instance, which leads to an expansion of the range of subtitle options.

Embodiment 6

The present embodiment gives a detailed explanation of production and commercial manufacture of the BD-ROM described in the above embodiments.

<Production of BD-ROM>

First, a planning process is carried out. In this process, what scenarios are used to play the BD-ROM is decided.

Next, a material creation process is carried out. In this process, materials for video recording, audio recording and the like are created.

Then, a formatting process is carried out. In this process, an overview of the data to be recorded in the volume area (generally referred to as "volume data") of the BD-ROM is obtained based on the scenarios created in the planning process and the materials.

Instances of a class structure described in a programming language are the format of the application layer of the recording medium according to the present invention. Clip information, PlayList information and the like can be created by describing instances of the class structure based on syntaxes specified in the BD-ROM standard. In this case, data in a table format can be defined using "for" statements of a programming language, and data required under specific conditions can be defined using "if" statements.

Lastly, a press process is carried out. In this press process, volume images are converted into physical data sequences, and master disk cutting is conducted by using the physical data sequences to create a master disk.

A master is created by a press apparatus, and then the BD-ROMs are commercially mass-produced. The production is composed of various processes, mainly including substrate molding, reflective film coating, protective film coating, laminating and printing a label.

By completing these processes, the recording medium (BD-ROM) described in each embodiment above can be created.

<Additional Content Creating Process>

When a motion picture is composed of BD-ROM contents and additional contents, the above-mentioned planning process to formatting process are carried out. Then, AVClips, Clip information and PlayList information making up one piece of volume data are obtained. Ones which will be provided by the BD-ROM are removed from the obtained AVClips, Clip information and PlayList information, and the remaining information is assembled into one file as additional contents by an archiver program or the like. When such additional contents are obtained after these processes, the additional contents are provided to a www server and sent to playback apparatuses upon request.

<Authoring System>

Figure 53:
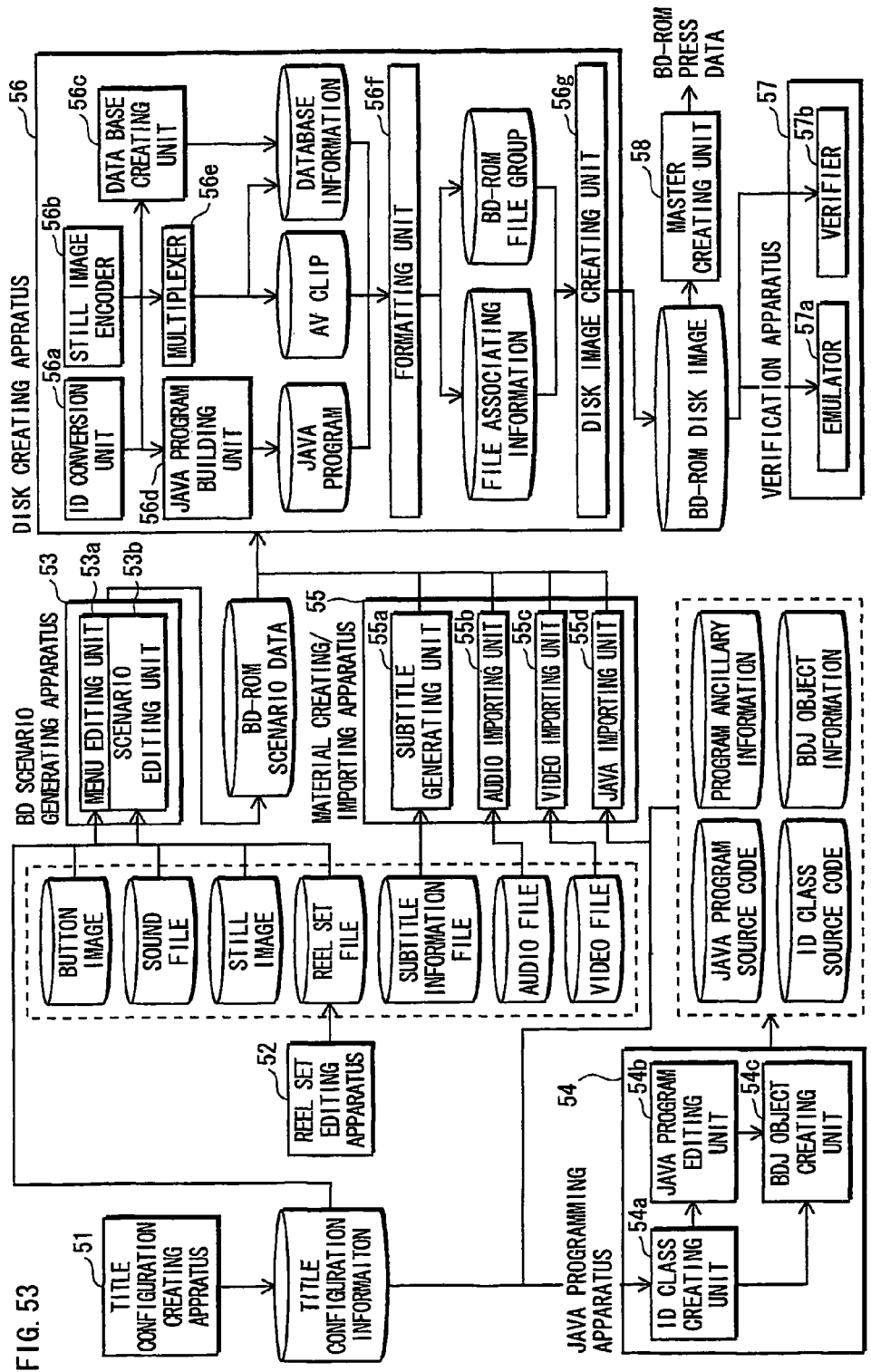
FIG. 53 shows an internal structure of an authoring system of Embodiment 6.

Among the above-mentioned multiple processes, the formatting process is a core of the BD-ROM production, and conducted using a special system called an authoring system. This system is established in a production studio, and provided for the users. FIG. 53 shows an internal structure of an authoring system of Embodiment 6. The following describes the authoring system with reference to the figure.

As shown in the figure, the authoring system is structured by connecting the following apparatuses to one another via an internal network: a title configuration creating apparatus 51; a reel set editing apparatus 52; a BD scenario generating apparatus 53; a Java™ programming apparatus 54; a material creating/importing apparatus 55; a disk creating apparatus 56; a verification apparatus 57; a master creating unit 58.

1) Title Configuration Creating Apparatus 51

The title configuration creating apparatus 51 determines contents that make up each title indicated by Index.bdmv. The decision of the apparatus is made by creating title configuration information. The title configuration information is information that specifies the relationship among titles, Movie objects, BDJ objects and PlayLists using a tree structure. Specifically speaking, the title configuration information specifies a node corresponding to a "disk name" of the BD-ROM to be produced, a node corresponding to a "title" that can be played in Index.bdmv on the BD-ROM, nodes corresponding to "a Movie object and a BDJ object" constituting the title, and nodes of "PlayLists" played by commands constituting the Movie object and BDJ object, and then specifies the relationship among the title, Movie object, BDJ object and PlayLists by connecting these nodes with edges. In the title configuration information, the PlayList information is described not using file names such as 00001.mpls and 00002.mpls but using abstract names such as MainPlaylist and MenuPlaylist. The apparatus makes the title configuration information completed by creating such a tree structure based on interactive operations with the user.

2) Reel Set Editing Apparatus 52

The reel set editing apparatus 52 determines the relationship among multiple elementary streams constituting one complete movie, such as videos, audios, subtitles and buttons. For example, when a single movie is composed of one video stream, two audio streams, three subtitle streams and one button stream, the reel set editing apparatus specifies that one movie is formed with these elementary streams, and have functions to assign, to the main movie, a director's cut having partially different images and to arrange multi-angle scenes having multiple angles. A reel set file output from the reel set editing apparatus 52 is a compilation of the above-mentioned information.

3) BD Scenario Generating Apparatus 53

The BD scenario generating apparatus 53 is composed of a menu editing unit 53a and a scenario editing unit 53b.

<Menu Editing Unit 53a>

The menu editing unit 53a positions buttons constituting Interactive Graphics Streams according to the user operations via GUI and creates functions such as commands to be attached to buttons, button animation and the like.

<Scenario Editing Unit 53b>

The scenario editing unit 53b creates and outputs scenarios by performing an editing process according to the user operations via GUI on the title configuration information created by the title configuration creating apparatus 51. Here, scenarios mean information that causes the playback apparatus to perform playback in a unit of title. In the BD-ROM, information defined as the IndexTable, MovieObject and PlayList is scenarios. The BD-ROM scenario data includes material information constituting streams, playback path information, menu screen arrangement and information on transition from the menu, and the user conducts scenario editing operations using the scenario generating apparatus until the verification of these information is completed. In the scenario editing operations, the scenario editing unit 53b sets the contents of the PlayLists of the title configuration information. By defining the STN_table shown in Embodiments 1, 4 and 5 and the PiP_metadata in Embodiment 2 as components of the PlayList in the scenario editing operations, these components are incorporated in the BD-ROM scenario data.

In addition, the BD-ROM scenario data output by the BD scenario generating apparatus 53 includes parameters for realizing multiplexing in the multiplexer 56e to be hereinafter described.

The BD scenario generating apparatus 53 is able to create scenarios for the above-mentioned data structure of the seamless video menu. The user selects a video desired to seamlessly play as a background video of the menu by using the menu editing unit 53a with operations via GUI. The scenario editing unit 53b creates a PlayList that conforms to the data structure of the seamless video menu. The scenario editing unit 53b adjusts the number of PlayItems of the PlayList to conform the number of the AVClips, and outputs them as BD-ROM scenario data. At this point, the scenario editing unit 53b sets parameters to realize multiplexing in the multiplexer 56e to thereby play each AVClip seamlessly.

4) Java™ Programming Apparatus 54

The Java™ programming apparatus 54 is composed of an ID class creating unit 54a, a Java™ program editing unit 54b, and a BDJ object creating unit 54c.

<ID Class Creating Unit 54a>

The ID class creating unit 54a creates ID class source codes using title configuration information created by the title configuration creating apparatus 51. The ID class source codes are source codes of a Java™ class library for accessing the Index.bdmv and PlayList information by which a Java™ program is ultimately created on the disk. Here, a Java™ class library which is a compilation formed from the ID class source codes is called an ID class library.

The ID class source codes are designed and implemented so that each has a constructor that reads a predefined PlayList file from the disk by specifying a PlayList number and that the playback of the AVClips can be carried out using instances which are created by executing the constructor. Names of variables of the ID class library are defined by using the names of PlayList nodes defined by the title configuration information, such as MainPlaylist and MenuPlaylist. The PlayList number used at this point may be a dummy number.

<Java™ Program Editing Unit 54b>

The Java™ program editing unit 54b creates source codes of a Java™ program in response to the user's request via a user interface such as GUI, and outputs the Java™ program source codes. In a Java™ program, it is the ID class library that makes reference to the Index.bdmv and PlayLists.

<BDJ Object Creating Unit 54c>

The BDJ object creating unit 54c creates BDJ object creating information based on the Java™ program source codes created by the Java™ program editing unit 54b and the ID class source codes created by the ID class creating unit 54a. The BDJ object creating information is information to be a form of BDJ objects which are eventually recorded on the BD-ROM, and specifies PlayLists to be played not by specific file names such as 00001.mpls and 00002.mpls, but by variable names defined in the ID class library.

5) The material creating/importing apparatus 55 is composed of a subtitle creating unit 55a, a audio importing unit 55b, a video importing unit 55c, and a Java™ importing unit 55d. The material creating/importing apparatus 55 converts input video materials, audio materials, subtitle materials, Java™ program source codes and the like into video streams, audio streams, subtitle data, Java™ program source codes and the like compliant with the BD-ROM standard, and sends them to the disk creating apparatus 56.

<Subtitle Creating Unit 55a>

The subtitle creating unit 55a creates subtitle data compliant with the BD-ROM standard based on a subtitle information file including a subtitle, display timing information, and subtitle effects such as fade-in/fade-out.

<Audio Importing Unit 55b>

The audio importing unit 55b, in the case when an audio already compressed into the AC-3 format is input thereto, adds timing information for a corresponding video and/or deletes unnecessary data to/from the input audio and outputs the result. When a noncompressed audio is input, it is converted into a format specified by the user before the output.

<Video Importing Unit 55c>

The video importing unit 55c, in the case when a video stream already compressed into the MPEG2, MPEG4-AVC, or the VC-1 format is input thereto, deletes unnecessary information if required before outputting it. When noncompressed video file is input, such a video file is input to a video encoder, compressed according to parameters specified by the user, and then output.

The Java™ importing unit 55d sends the following data to the disk creating apparatus 56: Java™ program source codes created by the Java™ program creating apparatus 54; program ancillary information; ID class source codes; and BDJ object generating information. The Java™ importing unit 55d, using the title configuration information, associates a file group, which is composed of the imported Java™ program source codes, program ancillary information, ID class source codes and BDJ object generating information, with a corresponding BDJ object, and sets the BDJ object generating information for BDJ object nodes of the title configuration information.

6) Disk Creating Apparatus 56

The disk creating apparatus 56 is composed of an ID conversion unit 56a, a still image encoder 56b, a database generating unit 56c, a Java™ program building unit 56d, a multiplexer 56e, a formatting unit 56f and a disk image creating unit 56g.

<ID Conversion Unit 56a>

The ID conversion unit 56a converts an ID class source code sent to the disk creating apparatus 56 from the Java™ importing unit 55d into a title number and a PlayList number. The ID conversion unit 56a also converts the BDJ object generating information so that PlayList names defined in a BDJ object match actual PlayList numbers on the disk.

<Still Image Encoder 56b>

The still image encoder 56b, in the case when input BD-ROM scenario data includes still images or an area in which still images are stored, selects an appropriate still image from among the input still images, and converts the selected still image into one of the MPEG2, MPEG4-AVC, and VC1 formats compliant with the BD-ROM standard.

<Database Generating Unit 56c>

The database generating unit 56c generates a database for scenario data compliant with the BD-ROM standard based on the input BD-ROM scenario data and the BDJ object generating information sent from the ID conversion unit 56a. Here, the term "database" is a collective term for Index.bdmv, Movie objects, PlayLists and BDJ objects defined in the above-mentioned BD-ROM.

<Java™ Program Building Unit 56d>

The Java™ program building unit 56d performs a compilation process on the ID class source codes converted by the ID conversion unit 56a and the Java™ program source codes, and outputs a Java™ program.

<Multiplexer 56e>

The multiplexer 56e multiplexes multiple elementary streams for realizing videos, audios, subtitles and menus described in the BD-ROM scenario data to obtain a digital stream called an AVClip in the MPEG2-TS format. Additionally, the multiplexer 56e outputs the AVClip together with Clip information which has information related to the AVClip.

Specifically speaking, the multiplexer 56e detects where in the digital stream generated for the BD-ROM (i) an I Picture exists in the case where the included video elementary stream is in the MPEG2, (ii) an I Picture or an IDR Picture exists in the case where the stream is in the MPEG4-AVC, and (iii) an I Picture exists in the case where the stream is in the VC1. Then, the multiplexer 56e generates an EP_map by associating the display time of the above-mentioned Picture with a TS packet, of the AVClip in the MPEG2-TS, in which the top data of the Picture is stored. The multiplexer 56e creates Clip information by paring the EP_map that the multiplexer 56e has generated and attribute information indicating audio and video attributes for each digital stream detected from the reel set file.

The reason why the EP_Map is created by the multiplexer 56e is that the EP_Map is information very closely related to the AVClip in the MPEG2-TS format output from the multiplexer 56e. In addition, the AVClip created for the use in the BD-ROM could have a very large file size, and it therefore requires time for creating the EP_Map because the AVClip with a large file size has to be read again in order to create the EP_Map after the creation of the AVClip. On the other hand, creating the EP_Map during the creation of the AVClip reduces the time for the EP_Map creation since the large AVClip file does not have to be read twice.

The multiplexer 56e also changes the multiplexing method using parameters for the multiplexer 56e included in the BD-ROM scenario data. For example, when the parameters are set so that $1^{st}$ and $2^{nd}$ AVClips to be multiplexed are seamlessly connected, the multiplexer 56e performs multiplexing of the $2^{nd}$ AVClip using, as an initial value, the buffer state after the $1^{st}$ AVClip is decoded so as not to disrupt the buffer model as described above.

<Formatting Unit 56f>

The formatting unit 56f performs a file allocation process using the above-mentioned database, AVClips and Java™ programs as inputs and a data structure appropriate for the BD-ROM format. The formatting unit 56f creates a directory structure specifying the application layer of the BD-ROM, and allocates each file to an appropriate location. At this point, the formatting unit 56f associates the Java™ programs with the AVClips by defining a tree structure. According to the association, multiple files used for playback are categorized into units called blocks. This apparatus makes the association of files completed by creating such a tree structure based on interactive operations with the user.

<Disk Image Creating Unit 56g>

The disk image creating unit 56g obtains volume images by using the above-mentioned database and AVClips and allocating these to addresses appropriate for the BD-ROM format.

For creating volume images, the disk image creating unit 56g allocates related file groups so as to make them physically continuous, which thereby enables efficient readout of the disk at the time of playback. Regarding a block whose seamless flag is "On", the disk image creating unit 56g allocates the file groups so that AVClips belonging to the block are played seamlessly. Specifically speaking, the disk image creating unit 56g makes the allocations in the disk to satisfy the minimum extent size and the maximum jump distance, which are conditions for physical allocation to realize the above-mentioned seamless playback.

7) Verification Apparatus 57

The verification apparatus 57 is composed of an emulator unit 57a and verifier unit 57b.

The emulator unit 57a plays actual movie contents using the volume images as inputs, and verifies, for example, whether operations intended by the producer—e.g. transition from a menu to the main movie—are properly conducted, whether subtitle changes and audio changes operate as intended, and whether videos and audios have intended qualities.

The verifier unit 57b verifies whether the produced data complies with the BD-ROM standard using the above-mentioned volume image.

In order to realize Picture in Picture with Out_of_MUX streams, the total bit rate of TS packets in multiple elementary streams which are permitted, in the STN_table, to be played simultaneously must be limited to 48M bits/second or less. In order to check whether the limitation is met, the verifier unit 57b determines if the bit amount in a discretional period of one second on the ATC time axis is at or less than the limitation. The unit time of one second is called "Window", and can be located at any position on the time axis of the ATC Sequence. That is to say, the bit amount of the decoded elementary streams during any period of one second must be 48M bits or less.

At authoring time, the verifier unit 57b checks whether the bit amount of a TS packet over the period of one second is 48M bits or less while keeping the window shifting on the Source packet sequence by one packet each time. When the limitation is satisfied, the verifier unit 57b shifts the Window to the next TS packet. If the limitation is not satisfied, the verifier unit 57b determines that it violates the BD-ROM standard. When the Out_Time of the Window reaches the last Source packet after the repetition of such shifts, the verifier unit 57b determines that the Source packets conform to the BD-ROM standard.

Thus, the volume images are verified by the emulator unit 57a and verifier unit 57b, which returns to an appropriate process to do the operation again when finding an error. After these two verification processes, the volume image goes through the master creation unit 58, which then creates data for BD-ROM press. In turn, the data for BD-ROM press is sent to a pressing process for disk production.

Figure 54:
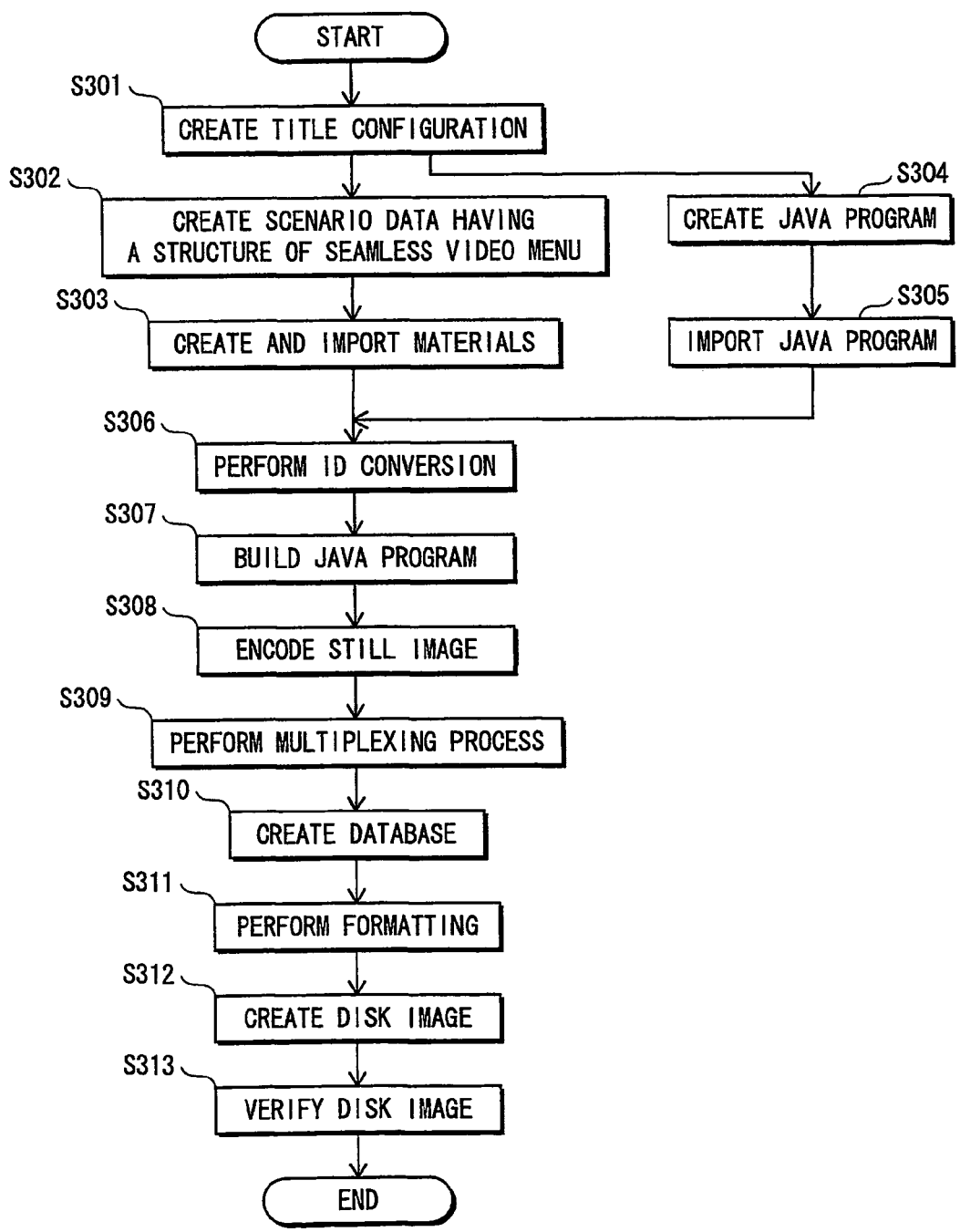
FIG. 54 is a flowchart showing a process flow of a formatting process.

Next, a processing flow of the formatting process is described in reference to FIG. 54.

In Step S301, the user sets a title configuration of the BD-ROM using the title configuration creating apparatus 51.

In Step S302, the user creates scenario data having a structure of a seamless video menu using the BD scenario generating apparatus 53. Herewith, PlayLists for the seamless video menu are created in the BD-ROM scenario data.

In Step S303, the user prepares videos, audios, still images and subtitle information used for a title, and subsequently imports these information into the disk creating apparatus 56 using the material creating/importing apparatus 55.

In Step S304, the user creates Java™ program source codes for a Java™ title, program ancillary information, and ID class source codes using the Java™ programming apparatus 54.

In Step S305, the user imports, into the disk creating apparatus 56, the Java™ program source codes, program ancillary information and ID class source codes created in Step S4 using the Java™ importing unit 55d.

In Step S306, the disk creating apparatus 56 converts the ID class source codes and the description of the BDJ object generating information into title numbers and PlayList numbers on the actual disk using the ID conversion unit 56a.

In Step S307, the Java™ program building unit 56d creates Java™ programs by the compilation process using the source codes output in Step S306. Note that Steps S306 and S307 can be skipped when the title configuration information does not include a Java™ title.

In Step S308, the still image encoder 56b, in the case when the BD-ROM scenario data includes still images or an area in which still images are stored, converts an appropriate still image into one of the MPEG2, MPEG4-AVC and VC1 formats compliant with the BD-ROM standard.

In Step S309, the multiplexer 56e multiplexes multiple elementary streams based on the BD-ROM scenario data and creates AVClips in the MPEG2-TS format.

In Step S310, the database generating unit 56c creates database information compliant with the BD-ROM standard based on the BD-ROM scenario data.

In Step S311, the formatting unit 56f performs file allocation compliant with the BD-ROM standard using the Java™ programs created in Step S307, the AVClip created in Step S309 and the database created in Step S310 as inputs. At this point, the formatting unit 56f associates the Java™ programs with the AVClips and creates file association information.

In Step S312, the disk image creating unit 56g creates volume images appropriate for the BD-ROM format using the file groups created in Step S311 while referencing the file associating information.

In Step S313, the verification unit 57 verifies the disk image created in Step S312. When finding an error; the verification unit 57 returns to an appropriate process to do the operation again.

The following describes multiplexing of the primary and secondary video streams and EP_map creation.

For multiplexing the primary and secondary video streams, a PTS indicating a display time of each picture and a DTS indicating a decoding time of each picture in the respective GOP are compared. Then, the multiplexing is performed so that the pictures constituting the primary video and the pictures constituting the secondary video are roughly positioned at the same position or adjacent to each other.

Next is described how the primary and secondary video streams are multiplexed.

Figure 55:
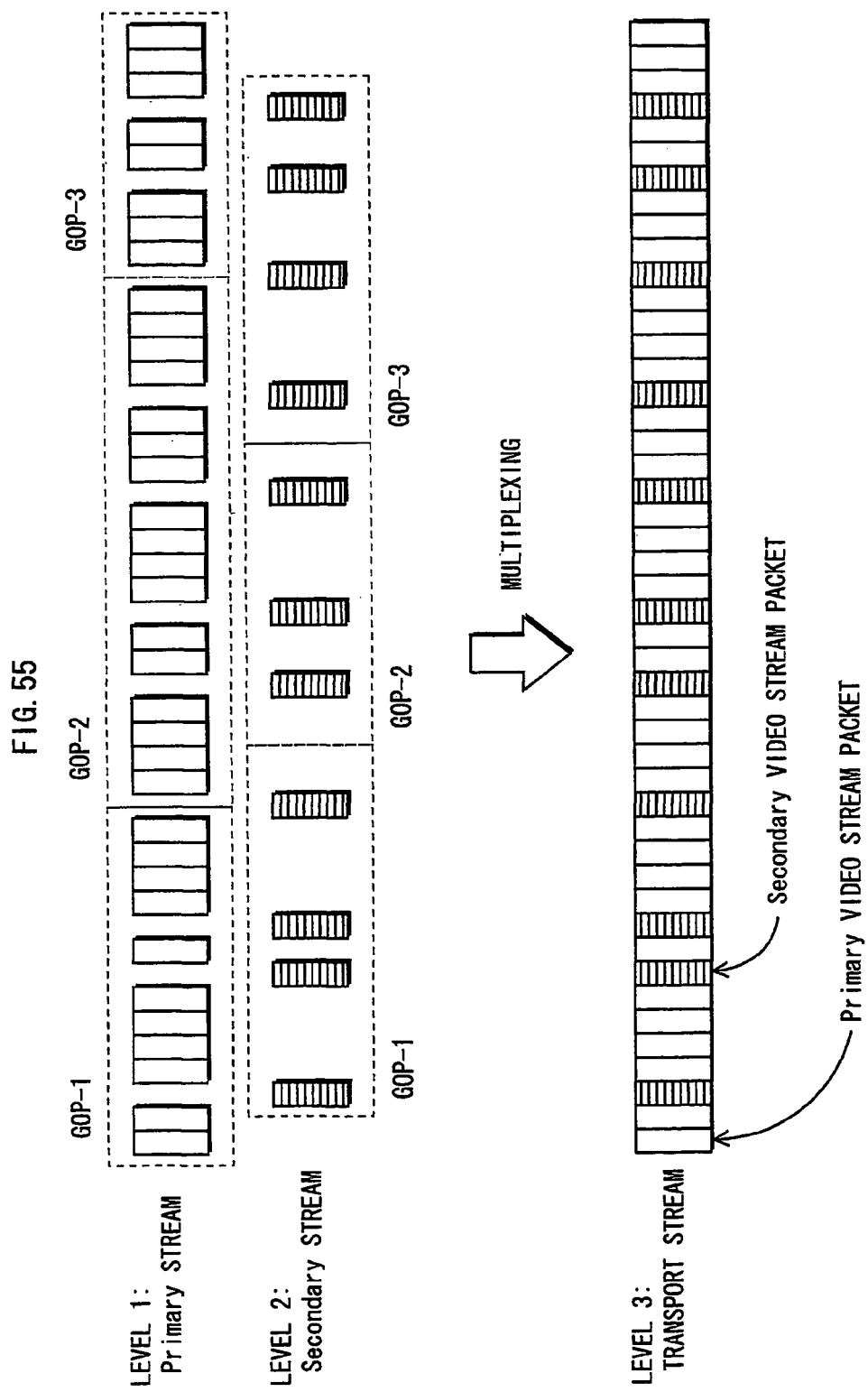
FIG. 55 shows how the primary and secondary video streams are multiplexed.
Figure 56:
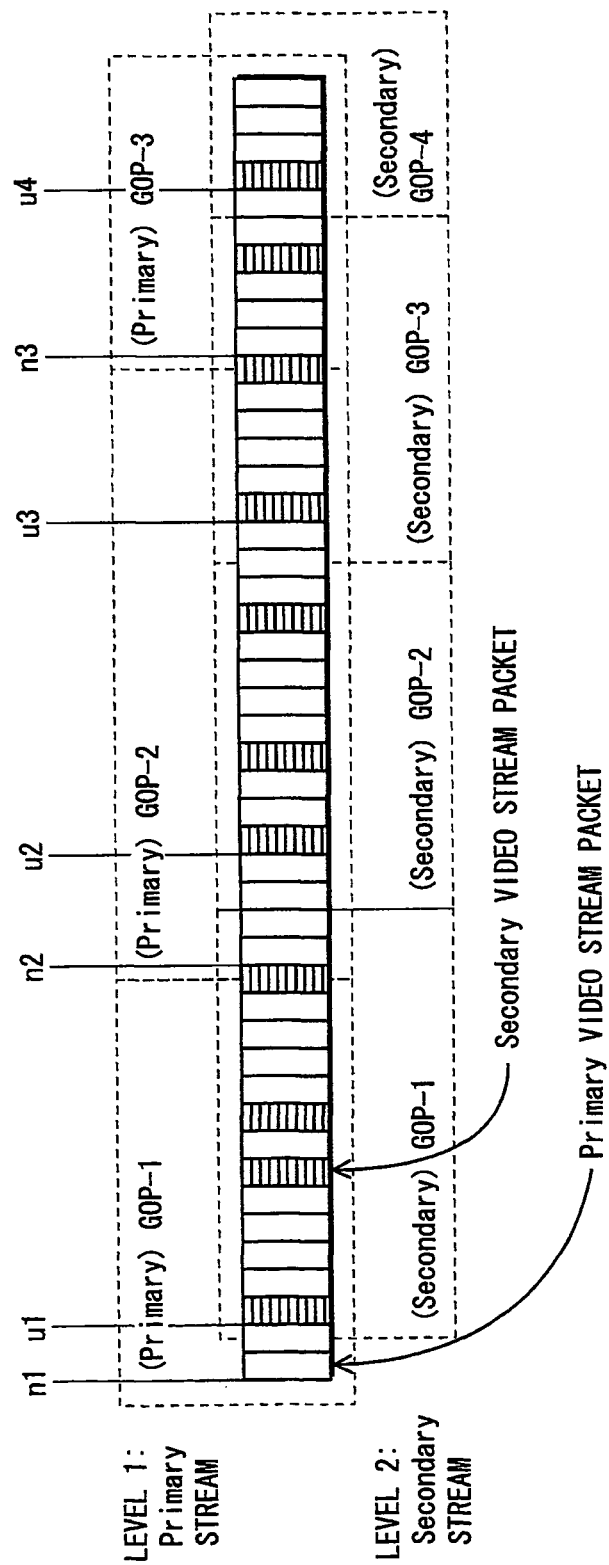
FIG. 56 shows a belong relationship in which multiplexed Source packet sequences belong to which GOPs of the primary and secondary video streams.

Level 1 and Level 2 in FIG. 55 shows a TS packet sequence constituting a primary video stream and a TS packet sequence constituting a secondary video stream allocated on the same ATC time axis.

As described in Embodiment 1, a primary video stream and a secondary video stream are converted into a PES packet sequence and a TS packet sequence, respectively. ATSs are attached to the TS packets so that the TS packet sequences obtained in this way are serially positioned on a single ATS time axis.

Note here that not all coordinates on the ATC time axis are occupied by the TS packets constituting a primary video stream, and coordinates around GOPs are empty. This is because it is designed to position, in the free coordinates, a different type of data which will be played in synchronization with pictures of the primary video. Time stamps are attached to the TS packets so that the TS packets of the secondary video stream are allocated to the free coordinates, i.e. coordinates which are not occupied by the TS packets of the primary video stream. Level 3 indicates a transport stream obtained by the multiplexing.

Thus, by attaching ATSs which indicate unoccupied coordinates on the ATC time axis of the primary video and serially arranging the TS packets, the primary video stream is multiplexed with the secondary video stream. The TS packets serially arranged in the multiplexing are identified by serial numbers. These serial numbers are called SPNs, and the locations of the Source packets in the BD-ROM are indicated by the SPNs.

When the primary and secondary video streams have been multiplexed in this way, required primary and secondary video streams can be taken out at a necessary time by reading the single transport stream in order from the top. However, when playback needs to start not from the top, of the stream but in the middle of the stream according to a skip operation or a jump operation with a time specification, GOP boundaries, of the primary and secondary videos have to be taken into consideration.

<Synchronized Playback>

Primary and secondary videos are separate streams as elementary streams, however, when the secondary video stream is an IN-MUX stream, required primary and secondary video streams can be taken out at a necessary time by reading the single transport stream in order from the top at the time of playback. However, when playback needs to start not from the top of the stream but in the middle of the stream according to a skip operation or a jump operation with a time specification, GOP boundaries of the primary and secondary videos have to be taken into consideration.

Figure 58:
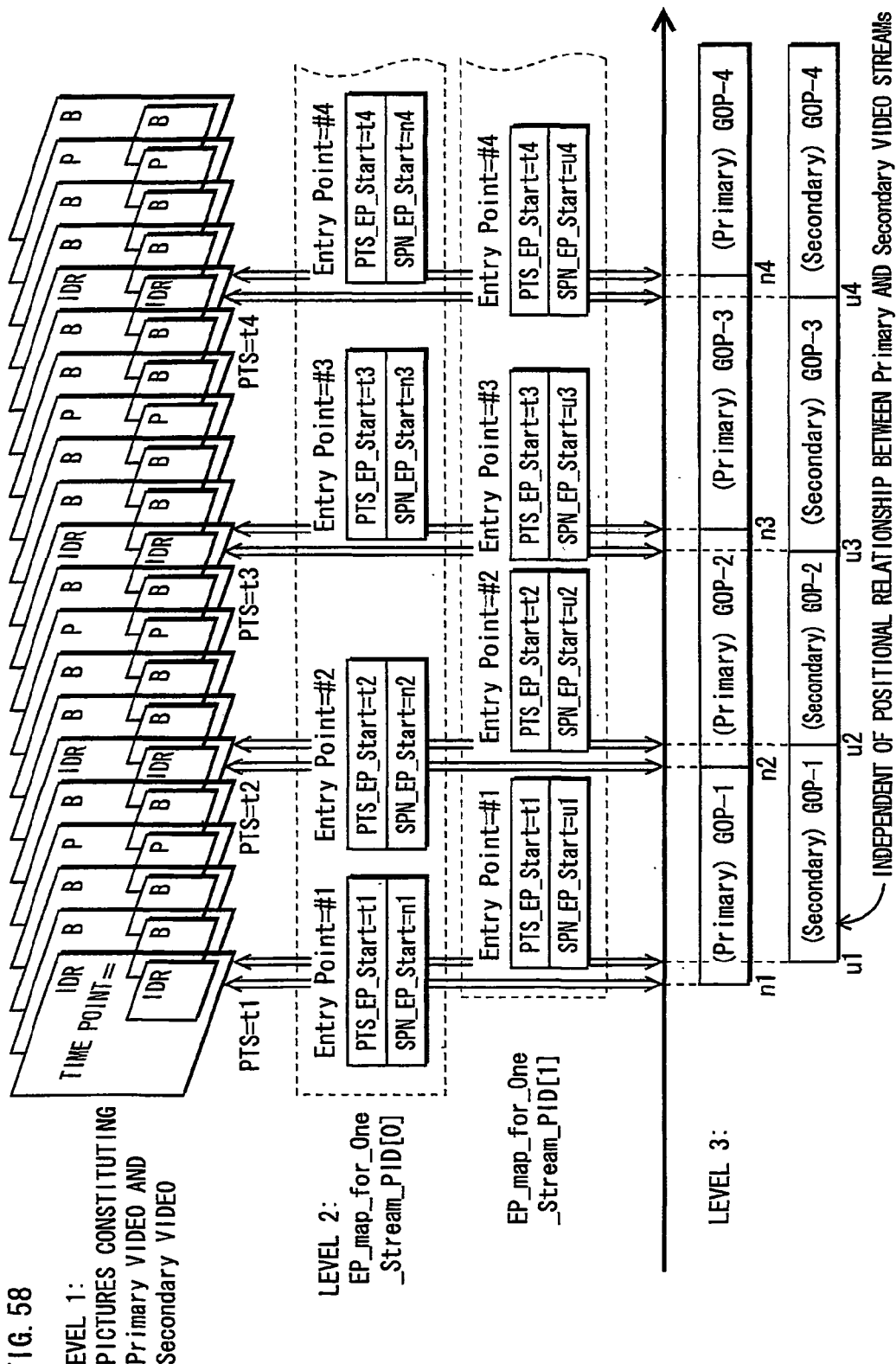
FIG. 58 shows EP_maps each set for the primary video and the secondary video.

FIG. 58 shows a belong relationship indicating that each of the multiplexed Source packets belong to which GOP of the primary video stream or the secondary video stream. The boxes in Level 1 of the figure shows a belong relationship indicating that each TS packet of an AVClip belongs to which one of the multiple GOPs included in the primary video stream. It can be seen that, with these boxes, Source packets from the address n1 to immediately before the address n2 belong to the GOP-1, Source packets, from the address n2 to immediately before the address n3 belong to the GOP-2, and Source packets from the address n3 onward belong to the GOP-3.

The boxes in Level 2 shows a belong relationship indicating that each TS packet of the AVClip belongs to which one of the multiple GOPs included in the secondary video stream. It can be seen that, with these boxes, Source packets from the address u1 to immediately before the address u2 belong to the GOP-1, Source packets from the address u2 to immediately before the address u3 belong to the GOP-2, and Source packets from the address n3 onward belong to the GOP-3.

In this case, when Source packets are read from the SPNn1 and SPNn2, the top of GOPs SPNu1 and SPNu2 of the secondary video stream come after the SPNn1 and SPNn2 and therefore not only the GOPs of the primary video but also the GOPs of the secondary video can be read out to thereby complete Picture in Picture. That is, when playback is to be started from the (primary) GOP-2 which is the second GOP of the primary video, if the playback is started from the SPNn2 which is the first packet included in the (primary) GOP-2, the (secondary) GOP2—the second GOP of the secondary video synchronizing the primary video—is also read. Therefore, it is possible to play the primary video in synchronization with the secondary video from the start of the playback without difficulty.

However, when Source packets are read from the SPNn3, the GOP of the secondary video comes before the n3, and therefore the GOP of the secondary video cannot be read. That is, when the playback is to be started from SPNn3 because the playback is desired to start from the (primary) GOP-3, if the (secondary) GOP-3 comes before the (primary) GOP-3, the data in the GOP included in the (secondary) GOP-3 cannot be read from the top even if the transport stream is read from the SPNn3 onward. As a result, the video included in the GOP may not be fully decoded. In this case, although the playback of the primary video starts from the video of the GOP-3, the playback of the secondary video belatedly starts from the video of the GOP-4, or the playback of the video of the primary video's GOP-3 starts with the playback of the mistimed secondary video.

Two methods can be considered for starting the playback of the primary and secondary video in accordance with each other from a specified time or GOP: imposing controls on the order of multiplexing; and determining a start point in the playback apparatus.

When GOP boundaries are aligned on the streams, it is important from which point the playback starts. In the case where the start point of the playback is specified with a clock time, the playback apparatus converts the time information into a SPN and determines the starting point for the playback by referring to the EP_map.

Figure 57:
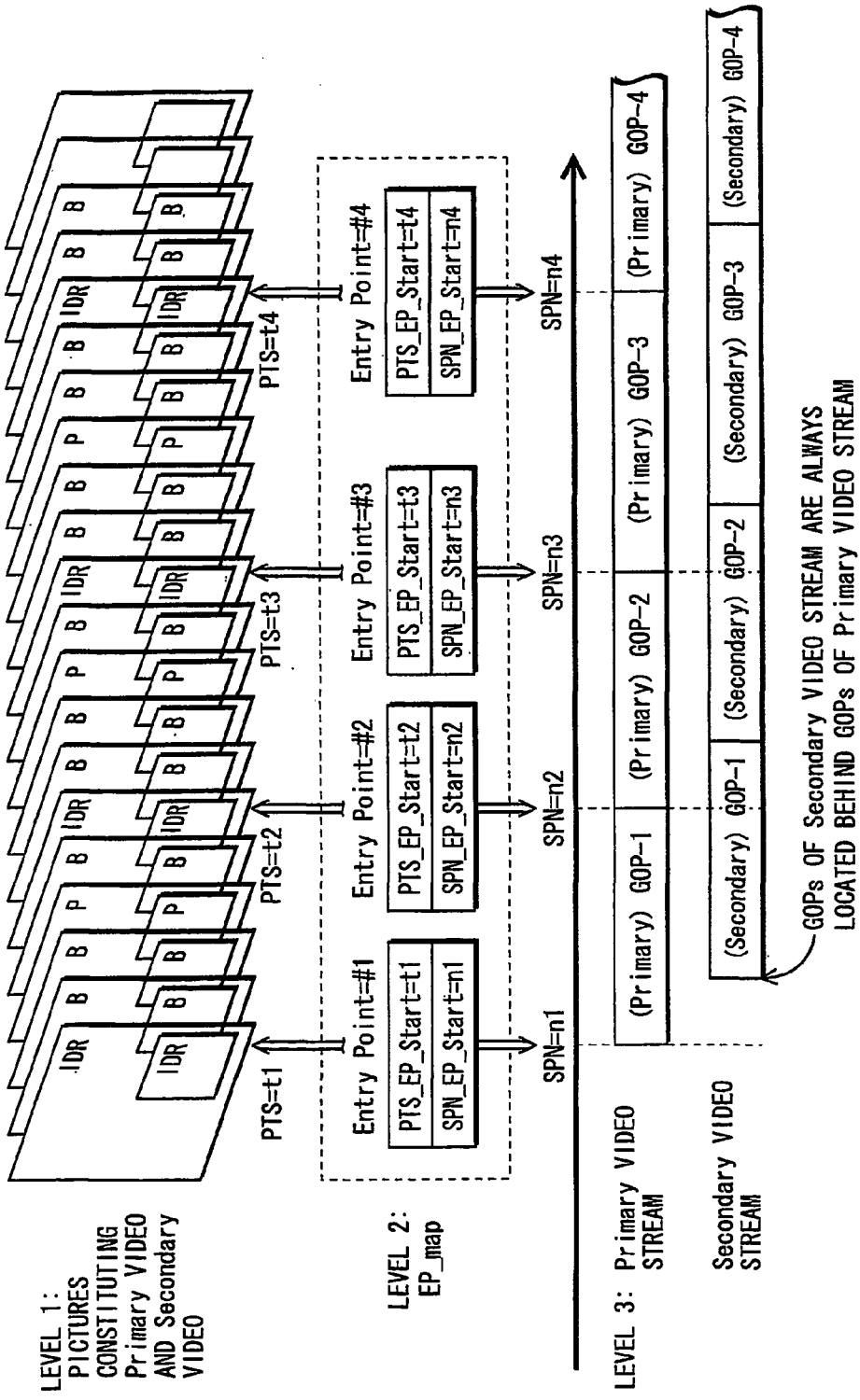
FIG. 57 shows an EP_map set only for the primary video.

FIG. 57 shows an EP_map set only for the primary video. Level 1 shows pictures constituting the primary and secondary videos and Level 2 shows the EP_map. Level 3 shows GOPs of the primary and secondary video streams. In this case, the time information is a playback start time of a primary video's GOP and a SPN is an address of the top of the GOP. Since the playback apparatus reads data from a point indicated by the address, the data of the secondary video needs to start after the GOP of the primary video. This is the method of imposing controls on the order of multiplexing.

In the case where the playback is started from a time stored in the EP_map, by making both primary and secondary videos' GOPs have the same time durations and always positioning the start of the primary video's GOP before the start of the secondary video's GOP, it is possible to, even if playback is made to jump to any time point, display the primary video and secondary video together from that time point to which the jump was made.

FIG. 58 shows EP_maps each set for the primary video and the secondary video. Level 1 and Level 3 are the same as for the previous figure. Level 2 indicates the EP_maps individually set for the primary video stream and secondary video stream. By setting the EP_maps as shown in the figure, when the playback start point is provided in the clock time, corresponding EP_maps for the primary and secondary videos can be found. The playback is then started from, among the SPNs corresponding to time information, an address of the preceding point, and whereby it is possible to read the primary and secondary videos' GOPs of the specified time from their beginning. This is the method of determining the start point on the playback apparatus side. By registering the same time information to the respective EP_maps, a start address corresponding to the primary and secondary videos can be obtained when a time is specified.

To be more specific, the playback apparatus converts the time information into SPNs on the primary video stream using the EP_map for the primary video stream and also converts the time information into SPNs on the secondary video stream using the EP_map for the secondary video stream.

Subsequently, the SPNs obtained in this way are compared. When the SPN1 is smaller than the SPN2, the SPN1 is converted into an address of the BD-ROM. When the SPN2 is smaller than the SPN1, the SPN2 is converted into an address of the BD-ROM.

Thus, a single piece of time information is converted into SPNs on the primary and secondary video streams and a smaller one of these SPNs is converted into an address. Therefore, if the GOP of the primary video stream precedes that of the secondary video stream, or if the GOP of the secondary video stream precedes that of the primary video stream, both GOPs can be read out.

Note that, when there are multiple primary and secondary videos, a start address with the earliest point can be selected from among playback start points of video streams required to be displayed, and it is not necessary to perform an address search on streams not to be displayed.

Embodiment 7

The present embodiment relates to an improvement for causing the playback apparatus to realize chapter-by-chapter playback. It is often the case that, sections called chapters—created by dividing a movie according to its scenes or contents—are defined in a movie title
, and playback can be started from the beginning of a chapter selected by the user. It is considered to apply this chapter selecting application to Picture in Picture.

The beginning of a chapter is a break in scenes or a change in the content, and it is preferable that, when a chapter is played from its beginning, playback of not only the primary video but also the secondary video starts at the time of the starting scene.

Figure 59:
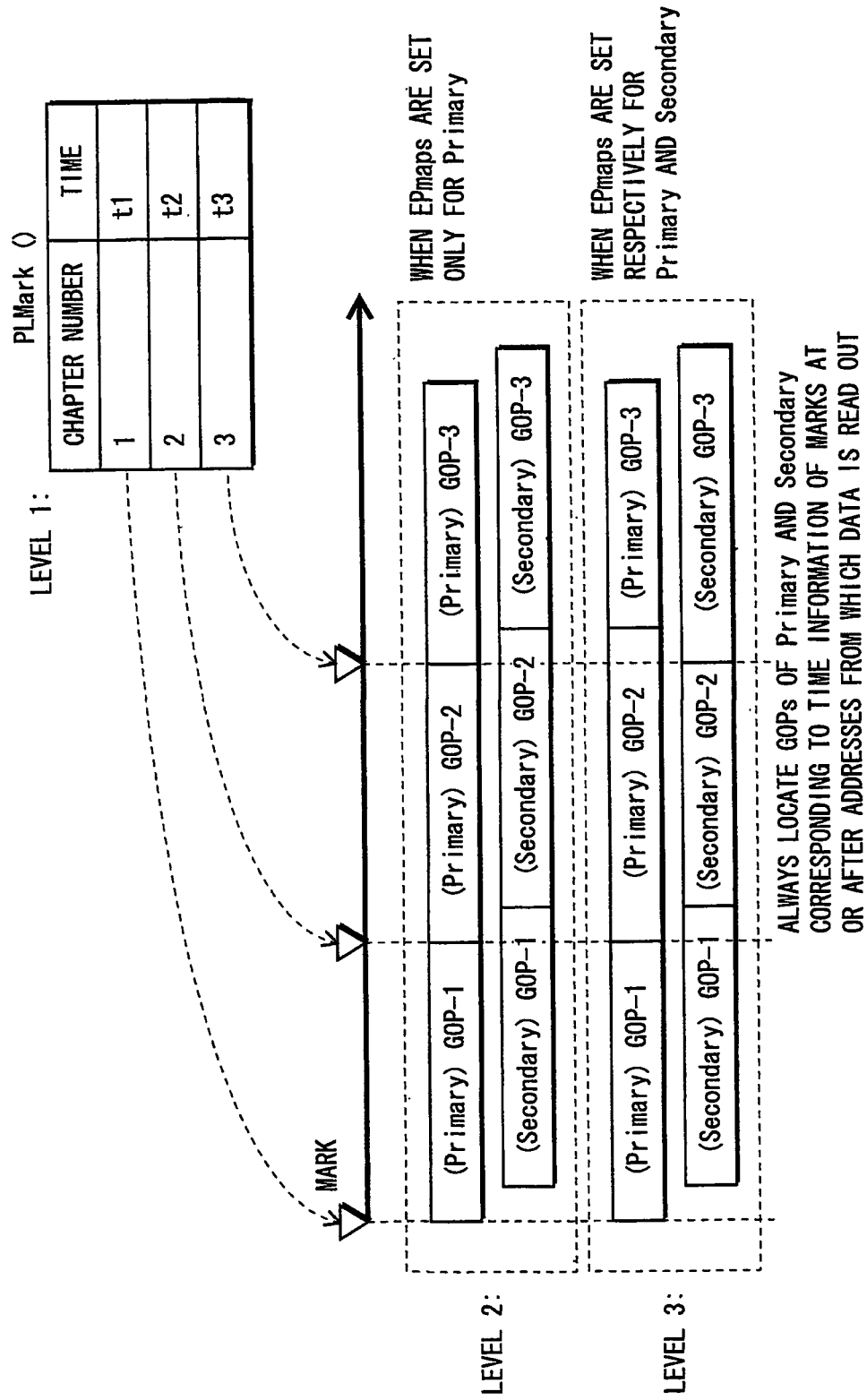
FIG. 59 shows PlayListMark information of the PlayList information.

FIG. 59 shows PlayListMark information of the PlayList information. Level 2 and Level 3 in the figure show GOPs of the primary and secondary video streams, and Level 1 shows the PlayListMark information. The PlayListMark information is established by associating each of multiple chapter numbers with time information.

The position of a chapter is represented by the time information. Therefore, in order to determine a playback start address based on the chapter, the playback apparatus can identify the address by the above-mentioned method using the EP_map and start readout of data from the address.

When the EP_map is set only for the primary video, the marks are provided for the primary video, and the start point of the secondary video to be played in synchronization should be placed later than the start point of the primary video.

<Skip Point>

Similarly to chapter boundaries, a jump point can be specified by a skip operation made by the user by using a mark that can specify one point on a time axis of a title. The control on GOP positioning for a skip point and the playback method from a skip point are the same as for the beginning of a chapter.

Now the case is considered where skip points are individually set for multiple secondary videos.

It is possible that, when skip points are set for the primary video, the user can specify the skip point and make the playback point jump thereto no matter whether secondary videos are displayed or not. This is used, for example, when skip points are provided at points where scenes change in a main movie. On the other hand, regarding skip points of a secondary video, which is for example a video of a director's commentary, the user would be confused if these skip points are active except when a corresponding video is being displayed.

Figure 60:
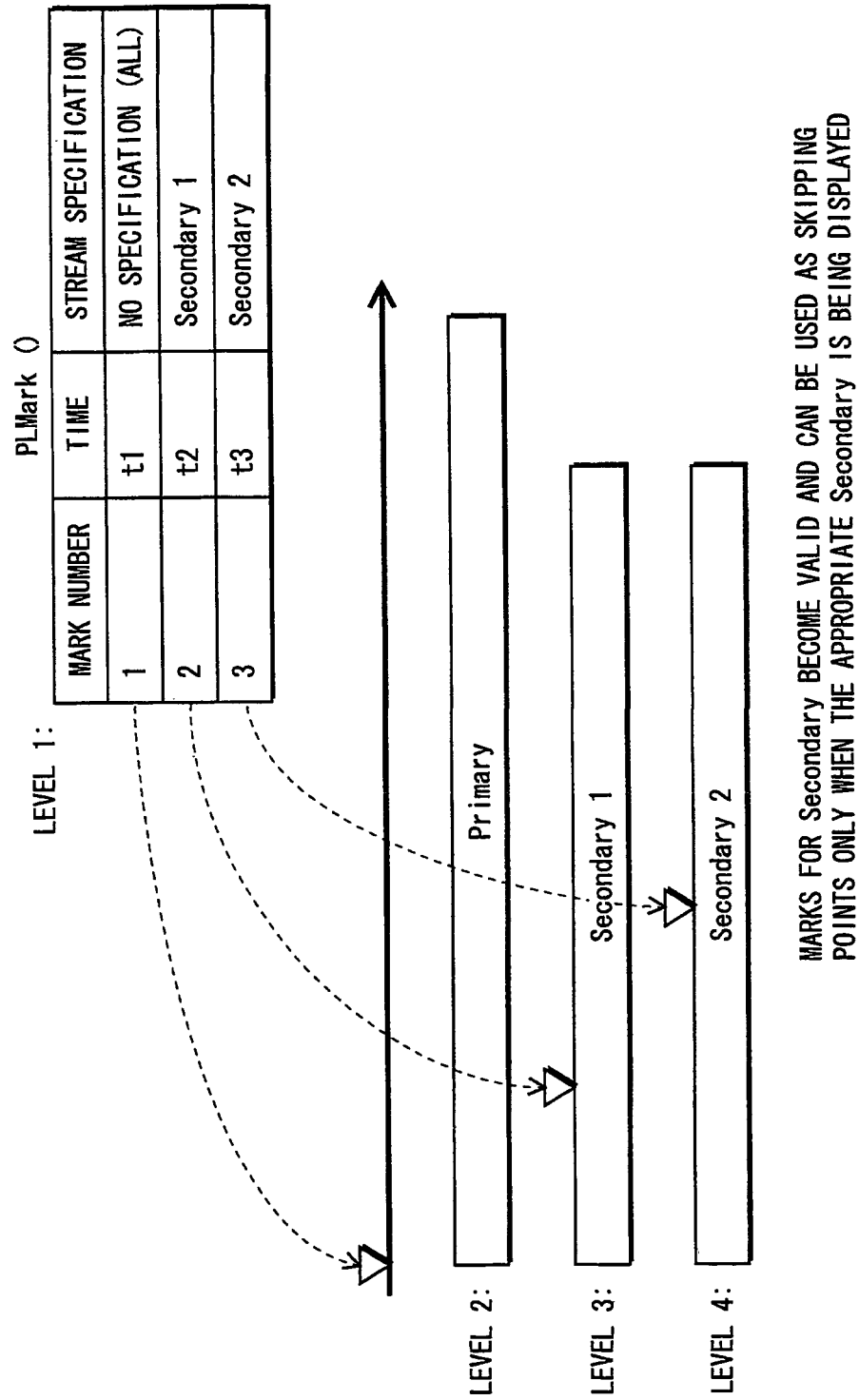
FIG. 60 shows PlayListMark information specifying, as chapters, positions where secondary video streams exist.

FIG. 60 shows PlayListMark information specifying, as chapters, positions where secondary video streams exist. In the figure, Levels 2, 3 and 4 show a primary video stream and two secondary video streams, respectively while Level 1 shows the content of the PlayListMark information.

The secondary video stream #1, which is a video of a director's commentary, has a skip point since the content of the commentary changes in the middle. In this case, if the secondary video stream #1 is being displayed, the user can make a jump by specifying the skip point (Mark Number 2). However, it should be designed so that the user cannot make this jump when the secondary video stream #1 is not being displayed or when the secondary video stream #2 is being displayed.

Accordingly, in the present embodiment, each piece of the mark information of the PlayListMark information is associated, with a field called "stream specification". Each piece of the mark information originally includes a mark number and a corresponding time information, and now a stream specification field is provided to the mark information.

If the stream specification field is set as "no specification (all)", a chapter jump for the mark information point is allowed independently of the display of secondary video streams. If "secondary video stream #1" is set in the stream specification field, the chapter jump for the mark information point is allowed only when the secondary video stream #1 is played.

If "secondary video stream #2" is set in the stream specification field, the chapter jump for the mark information point is allowed only when the secondary video stream #2 is played. Herewith, the playback apparatus enables the user to use skip points appropriate to the content of the displayed video.

Thus, by setting skip points on individual streams, a mechanism allowing the user to make a jump to an appropriate position in accordance with the displayed content can be offered.

Note that in the case where it is desired to move the playback start point to the position of Mark 2 by forcedly specifying the mark number using GUI, the display can be forcibly changed to the secondary video stream #1 and the playback point is moved to the skip point even if the secondary video stream #1 is not being displayed or another secondary video stream is being displayed.

Embodiment 8

The present embodiment relates to an improvement for the case where the primary and secondary videos are interlaced videos. The picture data is composed of a TOP field and a Bottom field to be hereinafter described. The TOP field is a compilation of odd-numbered lines out of the lines constituting a frame. The Bottom field is a compilation of even-numbered lines out of the line constituting a frame.

FIG. 61A shows video fields constituting primary and secondary videos. In Picture in Picture, the video fields structuring the primary video and those structuring the secondary video are composed in a one-to-one fashion. Accordingly, the video fields of the primary and secondary videos to be composed may be in-phase or antiphase to one another.

FIG. 61B shows combinations where the video fields to be composed are in-phase to one another. The in-phase combination means that, as shown in the figure, both primary and secondary videos are TOP fields, or alternatively Bottom fields.

FIG. 61C shows combinations where the video fields to be composed are antiphase to one another. The antiphase combination means that, as shown in the figure, the primary video is a TOP field While the secondary video is a Bottom field, or alternatively the primary video is a Bottom field while the secondary video is a TOP field.

Two different types of combinations are thus possible, and when the primary and secondary videos are composed, two kinds of Picture in Picture images, as shown in FIGS. 62A and 62B, can be created. FIG. 62A shows a Picture in Picture image in which the even-numbered lines of the primary video's video field match the even-numbered lines of the secondary video's video field. Such a Picture in Picture image can be output and played on a TV.

FIG. 62B shows a Picture in Picture image in which the even-numbered lines of the primary video's video field match the odd-numbered lines of the secondary video's video field. Such a Picture in Picture image cannot be output and played on a TV.

In order to avoid getting an unplayable Picture in Picture image, i.e. the composite image of FIG. 62B, in the recording medium of the present embodiment, the position and display point of the secondary video are adjusted in the following manner.

Figure 63:
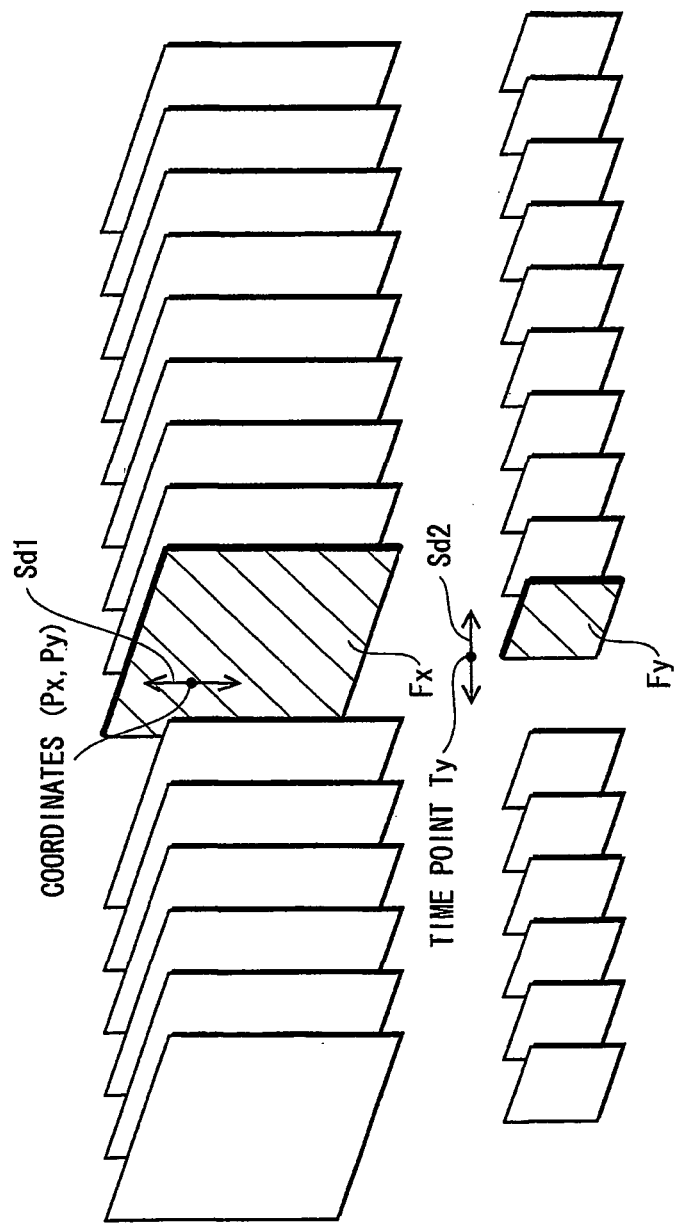
FIG. 63 shows, in the case where a given video field Fx from among multiple video fields constituting the primary video and a given video field Fy from among multiple video fields constituting the secondary video are to be composed and output, how to adjust the position and display time of the video field Fy.

FIG. 63 shows, in the case where a given video field Fx from among multiple video fields constituting the primary video and a given video field Fy from among multiple video fields constituting the secondary video are to be composed and output, how to adjust the position and display time of the video field Fy.

Here, when the coordinates specified by the PiP_horizontal_position and PiP_vertical_position in the PiP_metadata_block are (Px, Py), the position of Py is adjusted by sliding the coordinates (Px, Py) Upward or downward, as shown by the arrow sd1.

When the display timing of the primary video's field data on the playback time axis is Ty, the display point specified by the PiP_metadata_time_stamp is adjusted by sliding the display timing in the future or past direction of time, as shown by the arrow sd2.

Figure 64:
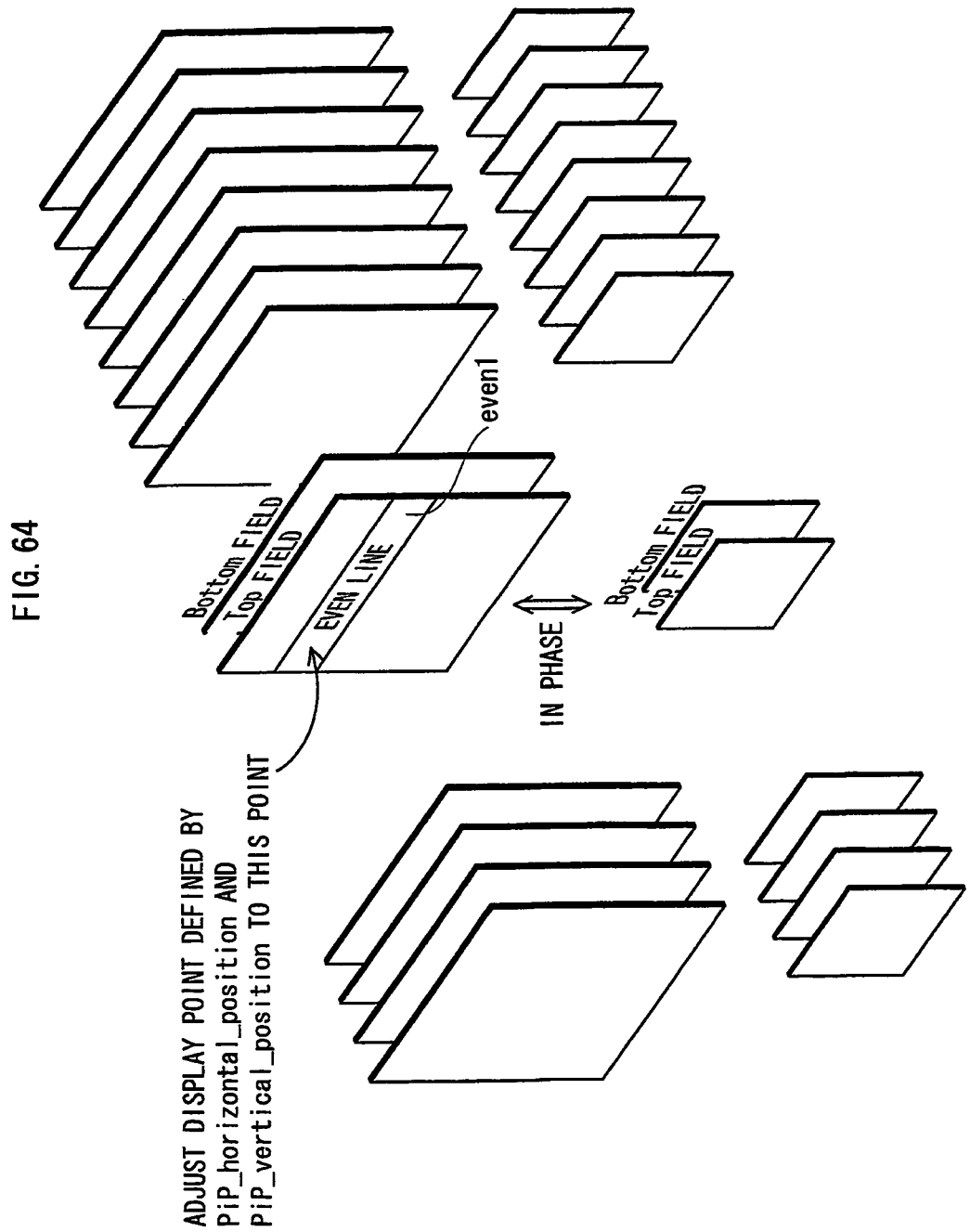
FIG. 64 shows the case where the field Fy of the secondary video is displayed together with an in-phase field of the primary video.

FIG. 64 shows the case where the field Fy of the secondary video is displayed together with an in-phase field of the primary video. Here, Py of the coordinates (Px, Py), which should be specified by the PiP_horizontal_position and the PiP_vertical_position of the PiP_metadata_block, is selected from one (even1 in the figure) among the multiple even-numbered lines in the primary video's field. Thereby, a playable Picture in Picture image can be obtained.

Figure 65:
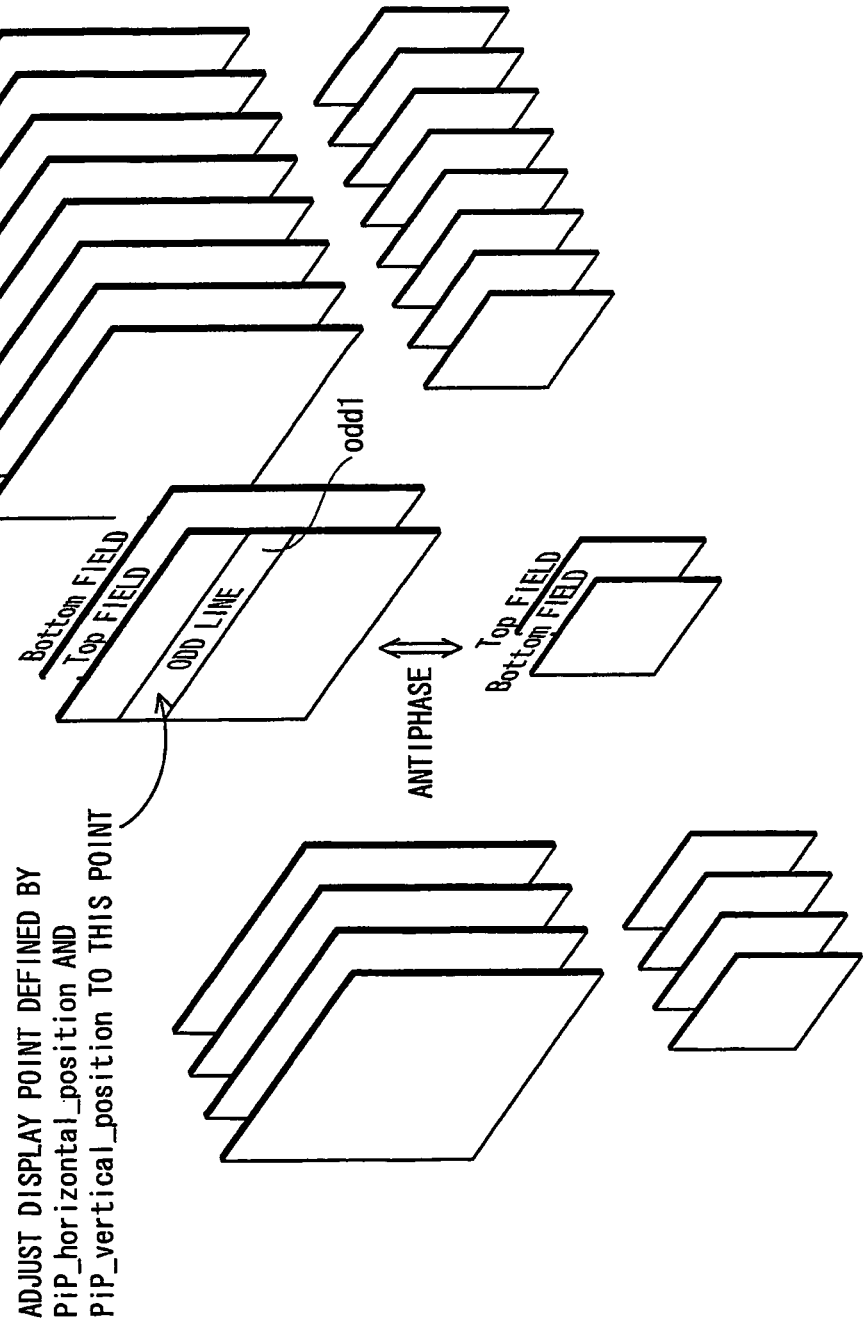
FIG. 65 shows the case where the field Fy of the secondary video is displayed together with an antiphase field of the primary video.

FIG. 65 shows the case where the field Fy of the secondary video is displayed together with an antiphase field of the primary video. Here, Py of the coordinates (Px, Py), which should be specified by the PiP_horizontal_position and the PiP_vertical_position of the PiP_metadata_block, is selected from one (odd1 in the figure) among the multiple even-numbered lines in the primary video's field. Thereby, a playable Picture in Picture image can be obtained.

Figure 66:
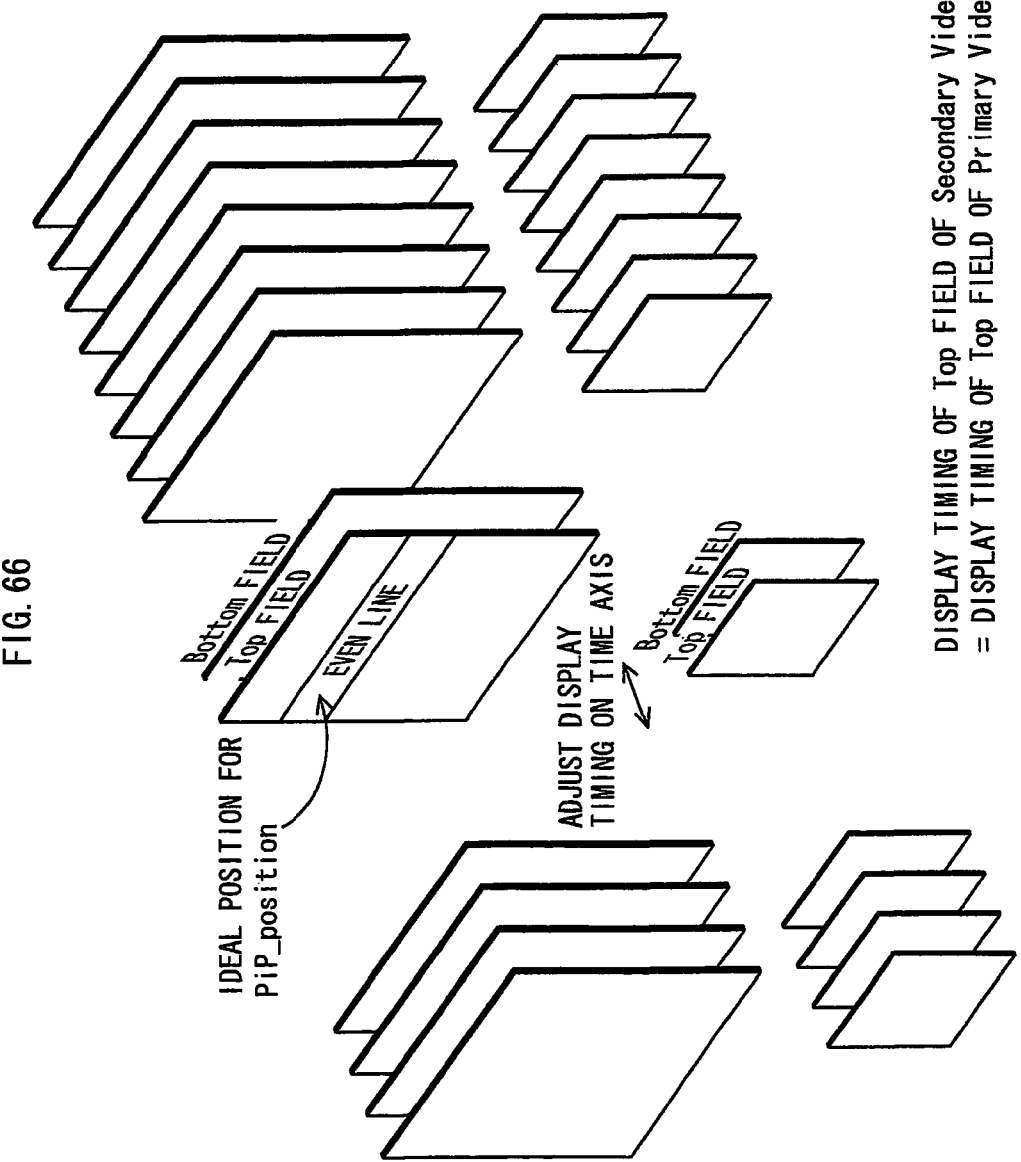
FIG. 66 shows the case where a secondary video field is displayed on an even-numbered line of the primary video.

FIG. 66 shows the case where a secondary video field is displayed on an even-numbered line of the primary video. Here, a time point Ty, which should be specified by the PiP_metadata_time_stamp of the PiP_metadata_block is selected from time points at which in-phase fields of the primary video should be displayed. Herewith, a playable Picture in Picture image can be obtained.

FIG. 67 shows the case where a secondary video field is displayed on an odd-numbered line of the primary video. Here, a time point Ty, which should be specified by the PiP_metadata_time_stamp of the PiP_metadata_block is selected from time points at which antiphase fields of the primary video should be displayed. Herewith, a playable Picture in Picture image can be obtained.

A playable combination can be created based on what is desired to idealize—a time point of the secondary video or coordinates of the secondary video. Herewith, at the stage of authoring, it is assured that the playback output will be properly carried out.

Embodiment 9

The present embodiment relates to making compensation on the playback apparatus side in the case when adjustment for the PiP_metadata_block, which is described in the previous embodiment, has not been made at the stage of authoring.

The playback apparatus in the present embodiment checks whether the composite pattern of Picture in Picture is one shown in FIG. 62A or one shown in FIG. 62B. When it is one shown in FIG. 62B, the playback apparatus makes adjustments illustrated in FIGS. 64 to 67. Thereby, Picture in Picture can be implemented even if the PiP_metadata_time_stamp, PiP_horizontal_position, and PiP_vertical_position used for creating a Picture in Picture with instances have not been adjusted during the authoring.

According to the present embodiment, even if adjustments for realizing Picture in Picture have not been made at the time of authoring, the playback apparatus is able to make compensation for this.

Embodiment 10

The present embodiment relates to an improvement for the case where a Java™ platform is structured by mounting the Java™ 2 Micro Edition (J2ME) Personal Basis Profile (PBP 1.0) and the Globally Executable MHP specification (GEM1.0.2) for package media targets on the playback apparatus of each embodiment, and the playback apparatus is caused to execute a BD-J application.

PlayList information includes MainPath information and Subpath information as described in Embodiment 1, and the MainPath information specifies a primary video stream and SubPlayItem of the Subpath information specifies a secondary video stream. Accordingly, a Java application can cause the playback apparatus to perform Picture in Picture playback by instructing a Java Virtual Machine to generate JMF player instances which play PlayLists. The generation of JMF player instances is preferably conducted by using a method called JMF A"BD://00001.mpls".

Note that the Java Virtual Machine may be caused to generate a JMF player instance of PlayItem information specifying a playback section in the primary video stream and a JMF player instance of SubPlayItem information specifying a playback section in the secondary video stream, and then the playback apparatus may be caused to perform playback based on these two player instance.

<Supplementary Notes>

The best modes for carrying out the invention, as far as known to the applicant at the time of filing the present application, have been described. However, further improvements or modifications can be made on the present invention in terms of the following technical topics. It should be noted here that whether or not to make such improvements or modifications is optional, and depends on the implementer of the invention.

<Title>

It is preferable to create a "module manager" in the playback apparatus, which selects a title according to the mount of the BD-ROM, a user operation, or a state of the apparatus. The decoder in the BD-ROM playback apparatus performs playback of an AVClip based on the PlayList information according to the title selection by the "module manager".

When the "module manager" selects a title, the application manager executes signaling using an application management table (AMT) corresponding to a previous title and an AMT corresponding to the current title. The signaling takes control that terminates the operation of an application described in the AMT of the previous title but not described in the AMT of the current AMT while commences the operation of an application not described in the AMT of the previous title but described in the AMT of the current title.

<Directory Structure in Local Storage>

Individual areas in the local-storage described in each embodiment are preferably created under a directory corresponding to a disk's root certificate of the BD-ROM.

The disk's root certificate is a root certificate that is distributed by the root certificate authority and assigned to the BD-ROM by the creator of the BD-ROM. The disk's root certificate is encoded in, for example, the X.509. The specifications of the X.509 have been issued by the International Telegraph and Telephone Consultative Committee, and described in CCITT Recommendation X.509 (1988), "The Directory—Authentication Framework".

In addition, it is preferable that the contents recorded in the BD-ROM and local storage be encoded using the Advanced Access Content System (AACS), a signature information be attached thereto, and a use authorization be specified in a permission file.

<Realization of Control Procedure>

Both the control procedures explained in the above-described embodiments using the flowcharts and the control procedures of the functional components explained in the above-described embodiments satisfy the requirements for the "program invention" since the above-mentioned control procedures are realized concretely using the hardware resources and are the creation of a technical idea utilizing natural laws.

Production of Program of Present Invention

The program of the present invention is an object program that can execute, on a computer. The object program is composed of one or more program codes that cause the computer to execute each step in the flowchart or each procedure of the functional components. There are various types of program codes such as the native code of the processor, and JAVA™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

The program of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language s/he uses.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way.

The program of the present invention can be used as follows. When the program of the present invention is used as an embedded program, the load module as the program is written into an instruction ROM, together with the Basic Input/Output System (BIOS) program and various pieces of middleware (operation systems). The program of the present invention is used as the control program of the playback apparatus 300 as the instruction ROM is embedded in the control unit and is executed by the CPU.

When the playback apparatus is a bootstrap model, the Basic Input/Output System (BIOS) program is embedded in an instruction ROM, and various pieces of middleware (operation systems) are preinstalled in a secondary recording medium such as a hard disk. Also, a boot ROM for activating the system from the secondary recording medium is provided in the playback apparatus. In this case, only the load module is supplied to the playback apparatus via a transportable recording medium and/or a network, and is installed in the secondary recording medium as one application. This enables the playback apparatus to perform the bootstrapping by the boot ROM to activate an operation system, and then causes the CPU to execute the installed load module as one application so that the program of the present application can be used.

As described above, when the playback apparatus is a bootstrap model, the program of the present invention can be used as one application. Accordingly, it is possible to transfer, lend, or supply, via a network, the program of the present invention separately.

<Controller 22>

The controller 22 can be realized as one system LSI.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus 300.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by mounting the instruction ROM therein, in which the load module as the program is stored, as the bear chip.

A specific production procedure is as follows. First, based on the structure diagram shown in each embodiment, a circuitry diagram for parts to be a system LSI is created, and components in the structure diagram are actualized using circuit elements and ICs or LSIs.

Each component is thus actualized, and then buses connecting between the circuit elements and ICs or LSIs, peripheral circuitry, an interface with the outside and the like are specified. Besides, connecting lines, power lines, ground lines, clock signal lines and the like are also specified. In these specifications, an operational timing of each component is adjusted in view of the specification of the LSIs, and the circuitry diagram is completed by making adjustments such as allocating a required bandwidth to each component.

After the circuitry diagram is complete, a implementation design is made. The implementation design is a work for creating a substrate layout to decide where on the substrate the components (circuit elements and ICs or LSIs) of the circuitry diagram created in the circuitry design are positioned, or how the connecting lines on the circuitry diagram are wired on the substrate.

Here, the implementation design includes an automatic placement and an automatic wiring.

In the case of using a CAD apparatus, this automatic placement can be realized by using a special algorithm called the "centroid method". The automatic wiring defines connecting lines for connecting pins of components of the circuitry diagram using metal foils and vias. When the CAD apparatus is used, the wiring process can be realized by using special algorithm called the maze method and the line search method.

The implementation design is conducted in this way, and once the layout on the substrate is decided, the result of the implementation design is converted into CAM data and output to equipments such as NC machine tools. The NC machine tools perform the SoC implementation or SiP implementation based on the CAM data. The SoC (System on chip) implementation is a technique that burns multiple circuits onto one chip. The SiP (System in package) implementation is a technique that puts multiple chips in one package using resin. By the above procedure, the system LSI of the present invention can be produced based on the internal structure diagrams of the playback apparatus described in each embodiment.

It should be noted here that although the term LSI is used here, it may be called IC, LSI, super LSI, ultra LSI or the like, depending on the level of integration.

Further, part or all of the components of each playback apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

<Architecture>

Since the system LSI of the present invention is assumed to be built into the BD-ROM playback apparatus, the system LSI preferably conforms to the UniPhier architecture.

The system LSI complying to the Uniphier architecture is composed of the following circuitry block.

Data Parallel Processor DPP

This is a SIMD processor in which multiple element processors operate concurrently, and parallelizes decode processing of multiple pixels constituting a picture by concurrently operating computing units built in the individual element processors with one instruction. Realizing such parallelization achieves decoding of video streams. The above-mentioned-video decoder is implemented as this data parallel processor.

Instruction Parallel Processor

This is composed of: an instruction RAM; an instruction cache; a data RAM; a "Local Memory Controller" made up of a data cache; an instruction fetch unit; a decoder; an execution unit; a "Processing Unit" made up of register files; and a "Virtual Multi Processor Unit" that causes the Processing Unit to execute parallelization of multiple applications. The graphics decoder and audio decoder other than the video decoder are implemented in the system LSI as the instruction parallel processor IPP.

CPU Block

This is composed of: an ARM core; an external bus interface (BUS Control Unit: BCU); a DMA controller; a timer; a peripheral circuitry, such as a vector interrupt controller; an UART; a GPIO (General Purpose Input Output); and a peripheral interface, such as a synchronous serial interface. The above-mentioned controller is implemented in the system LSI as this CPU block.

Stream I/O Block

This performs data input and output with a BD-ROM drive apparatus, a hard disk drive apparatus and a SD memory card drive apparatus on the external bus connected via a USB interface or an ATA packet interface.

AV I/O Block

This is composed of audio input and output, video input and output, and an OSD controller, and performs data input and output of TV and AV amplifiers.

Memory Control Block

This is a block which realizes reading and writing of a SD-RAM connected via the external bus, and is composed of: an internal bus connecting unit that controls the internal connection between each block; an access control unit that performs data transfer with the SD-RAM connected to the outside of the system LSI; and an access schedule unit that adjusts a request of each block for accessing the SD-RAM.

As to the production of the system LSI conforming to such architecture, it is desirable to adopt a bottom-up layout technique that completes one chip layout by making layout design for each circuitry block, such as an IPP and a DPP, and building up each block after the performance of each circuitry block is optimized.

INDUSTRIAL APPLICABILITY

The recording medium and playback apparatus of the present invention can be mass-produced based on the internal structures of them shown in the embodiments above. As such, the and playback apparatus of the present invention has the industrial applicability.

The invention claimed is:

1. A non-transitory computer-readable recording medium on which a plurality of video streams and a table are recorded, wherein each of the plurality of video streams is a secondary video stream to be played together with a primary video stream, and includes picture data representing a child image to be displayed in Picture in Picture that is composed of a parent image and the child image, each secondary video stream is a TS packet sequence composed of a plurality of packets, a packet identifier assigned to the plurality of packets constituting the TS packet sequence includes an upper field and a lower field, the upper field indicating that the TS packet sequence is a secondary video stream and storing a value that is different from a value stored in an upper field of a packet identifier of TS packets constituting a corresponding primary video stream, and the table includes entries of secondary video streams that are permitted to be played among the plurality of secondary video streams.

2. A playback apparatus for playing primary video streams and secondary video streams according to play list information which defines main playback sections for the primary video streams and sub playback sections for the secondary video streams, each primary video stream and each secondary video stream being a TS packet sequence composed of a plurality of packets, each packet identifier assigned to the plurality of packets constituting each secondary video stream including an upper field and a lower field, the upper field storing a value that is different from a value stored in an upper field of a packet identifier of packets constituting a corresponding primary video stream, the play list information defining playback sections for each of a plurality of video streams, and containing main-path information and sub-path information, the main-path information defining a main playback section for a stream specified as a primary video stream from among the plurality of video streams and including a table, the table including entries of secondary video streams that are permitted to be played among the plurality of secondary video streams, a packet identifier of TS packets constituting each secondary video stream being written in a corresponding one of the entries, the sub-path information defining a sub playback section for a stream specified as a secondary video stream from among the plurality of video streams, the playback apparatus comprising:

a reading unit operable to read out primary video streams and secondary video streams from a recording medium;

a first decoder operable to decode the primary video streams;

a second decoder operable to decode the secondary video streams;

a selecting unit operable to select a secondary video stream to be played among a plurality of secondary video streams read out from the recording medium, by performing a predetermined procedure;

a composing unit operable to realize Picture in Picture by composing a picture represented by the secondary video stream selected by the selecting unit with a picture represented by the primary video stream, a stream number register operable to store a stream member of the selected secondary video stream, and a demultiplexing unit operable to compare a packet identifier written in an entry included in the table that corresponds to the stream number stored in the stream number register, with packet identifiers of packets constituting the secondary video streams read out by the reading unit, and output the packets constituting the secondary video streams read out by the reading unit to the second video decoder if the comparison shows that the packet identifiers match, wherein the table included in the main-path information is referred to by the selecting unit when the selecting unit selects the secondary video stream to be played by performing the predetermined procedure.

3. The playback apparatus of claim 2, wherein the play list information includes metadata for Picture in Picture, the metadata being composed of data blocks each corresponding to any one of main playback sections, the data blocks including a header and a plurality of entries, the header including references to main playback sections, the plurality of entries define a plurality of display compositions when the corresponding main playback sections are played back, and each entry defines a time stamp indicating time of a display composition, horizontal and vertical coordinates of a secondary video when a display is composed, and a scale rate of the secondary video, the composing unit displays a secondary video scaled in accordance with the scale rate included in an entry having a time stamp corresponding to a current playback point among the entries at a position indicated by the horizontal and vertical coordinates of the entry, the predetermined procedure includes judging for each of the secondary video streams whether or not the playback apparatus has a capability to decode the secondary video stream, and selecting a secondary video stream that corresponds to an entry having a highest priority in the table, from among secondary video streams for which it was judged that the playback apparatus has the capability to decode.

4. The playback apparatus of claim 2, wherein the capability to decode the secondary video stream is to decode a video stream at a rate of 50 frames per second or 25 frames per second, and output a result of the decoding for playback.

5. The playback apparatus of claim 2, wherein the capability to decode the secondary video stream is to decode a picture conforming to an HDTV method, and play a result of the decoding.

6. A recording method for recording a plurality of video streams and a table onto a recording medium, comprising the steps of:

generating play list information including the table;

creating a plurality of video streams;

multiplexing, after converting a plurality of video streams into TS packet sequences, the TS packet sequences and other TS packet sequences so as to obtain a transport stream, and writing the transport stream and the table to the recording medium, wherein each of the plurality of video streams is a secondary video stream to be played together with a primary video stream, and includes picture data representing a child image to be displayed in Picture in Picture that is composed of a parent image and the child image, in the step of multiplexing, each packet identifier assigned to the plurality of packets constituting each secondary video stream includes an upper field and a lower field, the upper field indicating that the TS packet sequence is a secondary video stream and storing a value that is different from a value stored in an upper field of a packet identifier of packets constituting a corresponding primary video stream, and in the step of generating entries of secondary video streams that are permitted to be played among the plurality of secondary video streams are written in the table.

7. A playback method for performing, on a computer, processing for playing primary video streams and secondary video streams according to play list information which defines main playback sections for the primary video streams and sub playback sections for the secondary video streams, each primary video stream and each secondary video stream being a TS packet sequence composed of a plurality of packets, each packet identifier assigned to the plurality of packets constituting each secondary video stream including an upper field and a lower field, the upper field storing a value that is different from a value stored in an upper field of a packet identifier of packets constituting a corresponding primary video stream, the play list information defining playback sections for each of a plurality of video streams, and containing main-path information and sub-path information, the main-path information defining a main playback section for a stream specified as a primary video stream from among the plurality of video streams and including a table, the table including entries of secondary video streams that are permitted to be played among the plurality of secondary video streams, a packet identifier of TS packets constituting each secondary video stream being written in a corresponding one of the entries, the sub-path information defining a sub playback section for a stream specified as a secondary video stream from among the plurality of video streams, the computer comprising:

reading unit operable to read out primary video streams and secondary video streams from a recording medium;

a first decoder operable to decode the primary video streams;

a second decoder operable to decode the secondary video streams;

composing unit operable to realize Picture in Picture by composing a picture represented by the secondary video stream selected by the selecting unit with a picture represented by the primary video stream;

a stream number register operable to store a stream number of the selected secondary video stream; and a demultiplexing unit, the playback method comprising the steps of:

performing a predetermined procedure to select a secondary video stream among the secondary video streams read out from the recording medium, and determining the selected secondary video stream as a target of the Picture in Picture; and controlling a demultiplexing unit to compare a packet identifier written in an entry included in the table that corresponds to the stream number stored in the stream number register, with packet identifiers of packets constituting the secondary video streams read out by the reading unit, and output the packets constituting the secondary video streams read out by the reading unit to the second video decoder if the comparison shows that the packet identifiers match, wherein the table included in the main-path information is referred to when the predetermined procedure is performed to select the secondary video stream.

8. A system LSI implemented into a playback apparatus for playing primary video streams and secondary video streams according to play list information which defines main playback sections for the primary video streams and sub playback sections for the secondary video streams, each primary video stream and each secondary video stream being a TS packet sequence composed of a plurality of packets, each packet identifier assigned to the plurality of packets constituting each secondary video stream including an upper field and a lower field, the upper field storing a value that is different from a value stored in an upper field of a packet identifier of packets constituting a corresponding primary video stream, the play list information defining playback sections for each of a plurality of video streams, and containing main-path information and sub-path information, the main-path information defining a main playback section for a stream specified as a primary video stream from among the plurality of video streams and including a table, the table including entries of secondary video streams that are permitted to be played among the plurality of secondary video streams, a packet identifier of TS packets constituting each secondary video stream being written in a corresponding one of the entries, the sub-path information defining a sub playback section for a stream specified as a secondary video stream from among the plurality of video streams, the system LSI comprising:

a first decoder operable to decode the primary video streams;

a second decoder operable to decode the secondary video streams;

a selecting unit operable to select, by performing a predetermined procedure, a secondary video stream to be played from among secondary video streams that are read out from a recording medium together with primary video streams;

a composing unit operable to realize Picture in Picture by composing a picture represented by the secondary video stream selected by the selecting unit into a picture represented by a primary video stream, a stream number register operable to store a stream number of the selected secondary video stream, a demultiplexing unit operable to compare a packet identifier written in an entry included in the table that corresponds to the stream number stored in the stream number register, with packet identifiers of packets constituting the secondary video streams read out by the reading unit, and output the packets constituting the secondary video streams read out by the reading unit to the second video decoder if the comparison shows that the packet identifiers match, and the selecting unit refers to the table included in the main-path information when the selecting unit selects the secondary video stream by performing the predetermined procedure.

9. A non-transitory computer-readable recording medium that stores therein a program that causes a computer to execute processing for playing primary video streams and secondary video streams according to play list information which defines main playback sections for the primary video streams and sub playback sections for the secondary video streams:

each primary video stream and each secondary video stream being a TS packet sequence composed of a plurality of packets, each packet identifier assigned to the plurality of packets constituting each secondary video stream including an upper field and a lower field, the upper field storing a value that is different from a value stored in an upper field of a packet identifier of packets constituting a corresponding primary video stream, the play list information defining playback sections for each of a plurality of video streams, and containing main-path information and sub-path information, the main-path information defining a main playback section for a stream specified as a primary video stream from among the plurality of video streams and including a table, the table including entries of secondary video streams that are permitted to be played among the plurality of secondary video streams, a packet identifier of TS packets constituting each secondary video stream being written in a corresponding one of the entries, the sub-path information defining a sub playback section for a stream specified as a secondary video stream from among the plurality of video streams, the computer comprising:

a reading unit operable to read primary video streams and secondary video streams from a recording medium;

a first decoder operable to decode the primary video streams;

a second decoder operable to decode the secondary video streams;

a composing unit operable to realize Picture in Picture by composing a picture represented by the secondary video stream selected by the selecting unit with a picture represented by the primary video stream;

a stream number register operable to store a stream number of the selected secondary video stream; and a demultiplexing unit, wherein the program performs a predetermined procedure to select a secondary video stream among the secondary video streams read out from the recording medium, and determining the selected secondary video stream as a target of the Picture in Picture, controls a demultiplexing unit to compare a packet identifier written in an entry included in the table that corresponds to the stream number stored in the stream number register, with packet identifiers of packets constituting the secondary video streams read out by the reading unit, and output the packets constituting the secondary video streams read out by the reading unit to the second video decoder if the comparison shows that the packet identifiers match, the table included in the main-path information is referred to when the predetermined procedure is performed to select the secondary video stream.

* * * * *